US012750623B2

(12) United States Patent
Lovchinsky et al.

(10) Patent No.: US 12,750,623 B2
(45) Date of Patent: Sep. 29, 2026

(54) EAR-WORN DEVICE WITH NEURAL NETWORK-BASED NOISE MODIFICATION AND/OR SPATIAL FOCUSING

(71) Applicant: Fortell Research Inc., New York, NY (US)

(72) Inventors: Igor Lovchinsky, New York, NY (US); Israel Malkin, Manhattan Beach, CA (US); Nathan Agmon, New York, NY (US); Philip Meyers, IV, San Francisco, CA (US); Nicholas Morris, Brooklyn, NY (US)

(73) Assignee: Fortell Research Inc., New York, NY (US)

( * ) Notice: Subject to any disclaimer, the term of this patent is extended or adjusted under 35 U.S.C. 154(b) by 142 days.

(21) Appl. No.: 18/794,843

(22) Filed: Aug. 5, 2024

(65) Prior Publication Data

US 2025/0048043 A1 Feb. 6, 2025

Related U.S. Application Data

(63) Continuation-in-part of application No. 18/592,720, filed on Mar. 1, 2024, now Pat. No. 12,581,250, (Continued)

(51) Int. Cl.
*H04R 25/00* (2006.01)
*H04S 7/00* (2006.01)

(52) U.S. Cl.
CPC ......... *H04R 25/507* (2013.01); *H04R 25/405* (2013.01); *H04R 25/407* (2013.01); (Continued)

(58) Field of Classification Search
CPC ....... G10L 2021/02166; G10L 21/0208; G10L 25/78; G10L 17/18; G10L 25/30; (Continued)

(56) References Cited

U.S. PATENT DOCUMENTS 8,175,291 B2 * 5/2012 Chan .................. G10L 21/0208 381/94.7
10,304,475 B1 5/2019 Wang et al.
(Continued)

FOREIGN PATENT DOCUMENTS

EP 3598777 A2 1/2020
WO 2023136835 A1 7/2023

OTHER PUBLICATIONS

Notification of Transmittal of the International Search Report and the Written Opinion of the International Searching Authority, or the Declaration, dated Jan. 15, 2025.
(Continued)

*Primary Examiner* — Norman Yu
(74) *Attorney, Agent, or Firm* — Shih IP Law Group, PLLC.

(57) ABSTRACT

An ear-worn device includes two or more microphones and noise reduction circuitry including neural network circuitry. The neural network circuitry is configured to: receive multiple audio signals wherein at least two of the multiple audio signals each originate from a different one of the two or more microphones and/or at least one of the multiple audio signals is a beamformed audio signal originating from the two or more microphones; and implement one or more neural network layers trained to perform background noise modification and spatial focusing based on the multiple audio signals, such that the neural network circuitry generates, based on the multiple audio signals, one or more neural network outputs. The noise reduction circuitry is configured to output, based on the one or more neural network outputs, an output audio signal comprising a background noise-modified and spatially-focused version of a first audio signal of the multiple audio signals.

19 Claims, 31 Drawing Sheets

Related U.S. Application Data which is a continuation of application No. 18/477,087, filed on Sep. 28, 2023, now Pat. No. 11,937,047.

(60) Provisional application No. 63/643,957, filed on May 8, 2024, provisional application No. 63/571,150, filed on Mar. 28, 2024, provisional application No. 63/517,755, filed on Aug. 4, 2023.

(52) U.S. Cl.
CPC ........... *H04S 7/303* (2013.01); *H04S 2400/11* (2013.01); *H04S 2400/13* (2013.01); *H04S 2400/15* (2013.01)

(58) Field of Classification Search
CPC ...... H04R 3/005; H04R 1/406; H04R 25/407; H04R 2225/43; H04R 25/505; H04R 25/405; H04R 2460/01; H04R 25/507; H04R 2430/20; H04R 2225/41; H04S 2420/01; H04S 2400/15; H04S 2400/11; H04S 2400/13; H04S 7/303
USPC ... 381/312, 313, 92, 23.1, 71.1, 74, 317, 58, 381/56
See application file for complete search history.

(56) References Cited

U.S. PATENT DOCUMENTS 11,134,351 B1 9/2021 Lunner
11,646,009 B1 * 5/2023 Chhetri .................. G10L 15/16 704/232
11,678,111 B1 6/2023 Messingher Lang et al.
11,711,648 B2 * 7/2023 Lopatka ............... G06N 3/0499 381/92
11,792,570 B1 10/2023 Govindaraju
2003/0063759 A1 4/2003 Brennan et al.
2008/0212810 A1 9/2008 Pedersen
2010/0027820 A1 2/2010 Kates
2010/0123785 A1 * 5/2010 Chen .................... H04N 23/611 382/118
2012/0250916 A1 10/2012 Hain et al.
2013/0070935 A1 3/2013 Hui et al.
2013/0343549 A1 12/2013 Vemireddy et al.
2014/0219471 A1 8/2014 Deshpande et al.
2015/0195641 A1 * 7/2015 Di Censo ............. H04R 1/1083 381/71.6
2016/0111113 A1 4/2016 Cho
2017/0213565 A1 7/2017 Makinen et al.
2017/0295439 A1 * 10/2017 Xu ........................ H04R 25/507
2018/0063654 A1 3/2018 Kuriger
2018/0146285 A1 5/2018 Benattar et al.
2018/0330726 A1 * 11/2018 Song ........................ G10L 15/20
2019/0208317 A1 7/2019 Woodruff et al.
2019/0320260 A1 10/2019 Alders et al.
2019/0335288 A1 10/2019 Latypov et al.
2020/0213728 A1 * 7/2020 Lopatka .............. G10L 21/0232
2020/0322735 A1 10/2020 Mosgaard et al.
2021/0125625 A1 4/2021 Huang
2021/0281958 A1 9/2021 Diehl et al.
2022/0058773 A1 2/2022 Chou et al.
2022/0070585 A1 3/2022 Chen
2022/0124444 A1 4/2022 Andersen
2022/0232331 A1 7/2022 Zuzana
2023/0034525 A1 2/2023 Scheller
2024/0414483 A1 12/2024 Pedersen

OTHER PUBLICATIONS

D. Markovic, et al. "Implicit Neural Spatial Filtering for Multichannel Source Separation in the Waveform Domain", Meta, Reality Labs Research, Pittsburgh PA, USA, Metal AI Research, Paris, France, Jun. 30, 2022, 5 pages.

* cited by examiner

EAR-WORN DEVICE WITH NEURAL NETWORK-BASED NOISE MODIFICATION AND/OR SPATIAL FOCUSING

CROSS-REFERENCE TO RELATED APPLICATIONS

This application is a Continuation-in-Part of U.S. Ser. Nos. 18/592,720, filed Mar. 1, 2024; which is a Continuation of U.S. application Ser. No. 18/477,087, filed Sep. 28, 2023; now U.S. Pat. No. 11,937,047, issued Mar. 19, 2024; which claims priority to U.S. Provisional Application No. 63/517,755, filed Aug. 4, 2023; this application claims priority to U.S. Provisional Application No. 63/643,957, filed May 8, 2024; and U.S. Provisional Application No. 63/571,150, filed Mar. 28, 2024; all in which are incorporated herein by reference.

BACKGROUND

Field

The present disclosure relates to ear-worn devices. Some aspects relate to ear-worn devices with neural network-based noise modification and/or spatial focusing.

Related Art

Ear-worn devices, such as hearing aids, may be used to help those who have trouble hearing to hear better. Typically, ear-worn devices amplify received sound. Some ear-worn devices may attempt to reduce noise in received sound.

SUMMARY

Reducing noise in the output of ear-worn devices (e.g., hearing aids, cochlear implants, and earphones) is a difficult challenge. Reducing noise in scenarios in which the wearer is listening to one speaker while there are other interfering speakers in the vicinity is a particularly difficult challenge. The inventors have recognized that neural networks may be used in ear-worn devices to improve noise reduction and the reduction of sound from interfering speakers. Recently, neural networks for separating speech from noise have been developed. Further description of such neural networks for reducing noise may be found in U.S. Pat. No. 11,812,225, titled "Method, Apparatus and System for Neural Network Hearing Aid," issued Nov. 7, 2023, which is incorporated by reference herein in its entirety.

For background noise reduction, the inventors have recognized that if, at a previous time step, the neural network heard noise coming from a certain direction-of-arrival (DOA), the neural network may have a prior to cancel out noise from that DOA on the current time step. From another perspective, sound sources may tend to move slowly with time so if the neural network has identified a particular segment of sound as speech and knows its DOA, the neural network may reasonably infer that other sounds from the same direction are also speech.

For reducing sound from interfering speakers, conventional ear-worn devices may use beamforming to attenuate sounds received from certain directions. This may involve processing sounds from different microphones in different ways (e.g., applying different delays to the signals received at different microphones). Conventional beamforming (both adaptive and non-adaptive) may provide an intelligibility boost, because it may enable focusing on sounds coming from in front of the wearer (from where it is assumed that sounds of interest originate) and attenuate sounds (e.g., background noise and interfering speakers) on the sides and back of the wearer.

However, conventional beamforming patterns (e.g., cardioids, supercardioids, hypercardioids, and dipoles) may also have shortcomings, including: 1. A theoretical beamforming pattern may become warped once it is implemented by microphones placed on a device located behind the ear (e.g., hearing aid), due at least in part to interference from the head, torso, and ear of the wearer; this may cause performance to suffer. 2. In reverberant environments, the indirect path may come through from the front-facing direction. For example, in a reverberant room, when a speaker is talking from directly behind the wearer, that speaker's voice may reverberate all around the room and enter the ear-worn device's microphones from in front of the wearer; such sounds may not be attenuated by a front-facing beamforming pattern. 3. Conventional beamforming may work better on high-frequency sounds than low-frequency sounds. In other words, conventional beamforming may be better at using high-frequency sounds for sound localization than low-frequency sounds. 4. Generally, there is a limit to how much sound reduction conventional beamforming patterns can provide. 5. In quiet environments, beamforming may add noise.

The inventors have addressed these shortcomings by developing neural networks trained to perform spatial focusing, which may be implemented in certain embodiments. Spatial focusing may include applying different weights to audio signals based on locations of the sources of the sounds or directions from which the audio signals were generated relative to the device. The locations and/or directions of the sounds may be derived by a neural network from differences in timing of the sounds arriving at multiple microphones. The inventors have recognized that with a single microphone, speakers from different directions may not be sufficiently distinguishable by a neural network; in other words, a neural network may not be able to distinguish whether a speaker is in front of the wearer or behind the wearer (or, in general, where a wearer is located). A neural network using inputs from multiple microphones may break this ambiguity. Thus, the neural network may accept multiple input audio signals originating from two or more microphones on an ear-worn device and be trained to perform spatial focusing. Spatial focusing may help to focus on sounds coming from a target direction and reduce sound coming from other directions. As one particular example, focusing on sounds originating from in front of the ear-worn device wearer may help to reduce sound from interfering speakers located behind and to the sides of the ear-worn device wearer; other target directions may be used as well. This approach may enable application of weights to sounds coming from different directions with greater differentials than possible with conventional beamforming.

It should be appreciated that while certain spatial focusing patterns may focus on sounds coming from in front of the wearer of the ear-worn device, some may focus on sounds coming from other directions, such as the sides and/or back of the wearer. Certain scenarios may benefit from such focusing, for example, when the wearer of the ear-worn device is driving a ear with passengers to their side and/or back.

Certain embodiments of the technology described herein may additionally generate a target speech signal, a background noise signal, and an interfering speech signal, and these signals may be mixed together using modified levels of the target speech, interfering speech, and/or background noise. For example, the level of interfering speech and background noise may be reduced, and the level of the target speech may be kept the same or increased. Mixing some noise and some interfering speech back into the target speech signal may help to reduce distortion and increase environmental awareness for the wearer of the ear-worn device. Generally, the change in volume of the background noise signal may be different from the change in volume of the target speech signal by a first volume change difference amount, the change in volume of the interfering speech signal may be different from the change in volume of the target speech signal by a second volume change difference amount, and the first volume change difference amount and the second volume change difference amount may be independently controllable.

Independent control of the volume of the background noise and interfering speech may be helpful, for example, to enable different levels of reduction of background noise and interfering speech based on different preferences of different wearers. Following are non-limiting examples of scenarios illustrating how independent control of the volume of background noise and interfering speech may be helpful. In a first scenario, a wearer may be sitting with multiple conversation partners at a table in a busy restaurant. Reducing background noise significantly, but not reducing any speech significantly (i.e., not reducing interfering speech significantly), may be helpful. In a second scenario, a wearer may be sitting with one conversation partner at a table in a busy restaurant, but there may be a loud conversation at a table nearby. Reducing background noise significantly and reducing interfering speech significantly may be helpful. In a third scenario, a wearer may be sitting at a quiet cafe with a distracting conversation occurring nearby. Reducing background noise moderately and reducing interfering speech significantly may be helpful.

DETAILED DESCRIPTION

The aspects and embodiments described above, as well as additional aspects and embodiments, are described further below. These aspects and/or embodiments may be used individually, all together, or in any combination of two or more, as the disclosure is not limited in this respect.

Ear-Worn Devices

Figure 1:
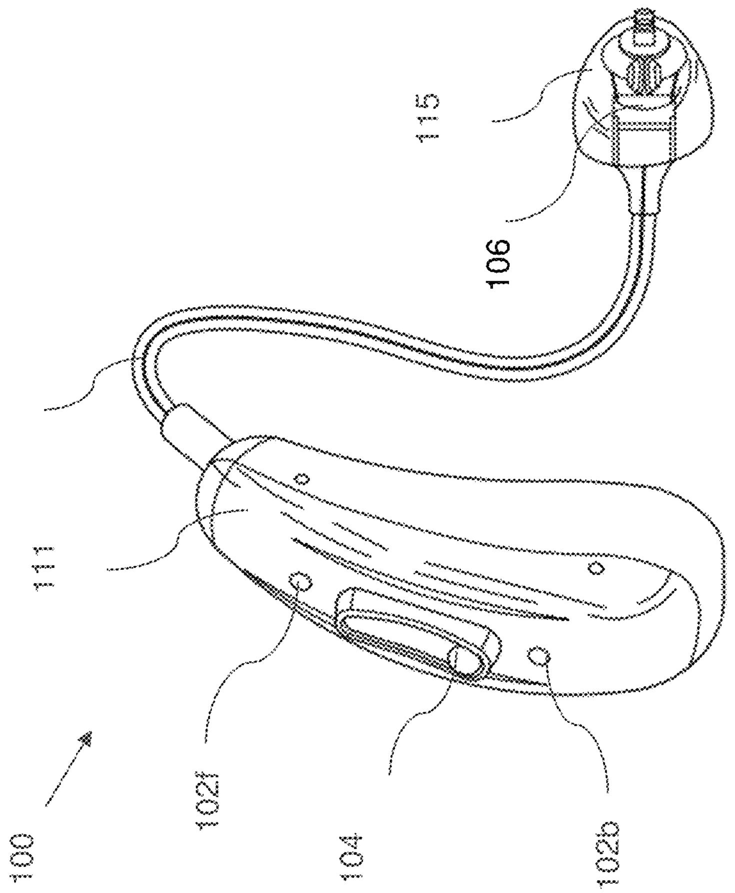
FIG. 1 illustrates a view of a hearing aid, in accordance with certain embodiments described herein.

FIG. 1 illustrates a view of a hearing aid 100, in accordance with certain embodiments described herein. The hearing aid 100 may be any of the ear-worn devices or hearing aids described herein. The hearing aid 100 is a receiver-in-canal (RIC) (also referred to as a receiver-in-the-ear (RITE)) type of hearing aid. However, any other type of hearing aid (e.g., behind-the-ear, in-the-ear, in-the-canal, completely-in-canal, open fit, etc.) may also be used. The hearing aid 100 includes a body 111, a receiver wire 113, a receiver 106, and a dome 115. The body 111 is coupled to the receiver wire 113 and the receiver wire 113 is coupled to the receiver 106. The dome 115 is placed over the receiver 106. The body 111 includes a front microphone **102*f*, a back microphone 102*b*, and a user input device 104. The body 111 additionally includes circuitry (e.g., any of the circuitry described hereinafter, aside from the receiver 106) not illustrated in FIG. 1. When the hearing aid 100 is worn, the front microphone 102*f* may be closer to the front of the wearer and the back microphone 102*b* may be closer to the back of the wearer. The front microphone 102*f* and the back microphone 102*b* may be configured to receive sound signals and generate audio signals based on the sound signals. Any of the two or more microphones described herein may be the front microphone 102*f* and the back microphone 102*b* of the hearing aid 100. The user input device 104 (e.g., a button) may be configured to control certain functions of the hearing aid 100**, such as level, activation of neural network-based denoising, etc.

The receiver wire 113 may be configured to transmit audio signals from the body 111 to the receiver 106. The receiver 106 may be configured to receive audio signals (i.e., those audio signals generated by the body 111 and transmitted by the receiver wire 113) and generate sound signals based on the audio signals. The dome 115 may be configured to fit tightly inside the wearer's ear and direct the sound signal produced by the receiver 106 into the ear canal of the wearer.

In some embodiments, the length of the body 111 may be equal to 2 cm, equal to 5 cm, or between 2 and 5 cm in length. In some embodiments, the weight of the hearing aid 100 may be less than 4.5 grams. In some embodiments, the spacing between the microphones may be equal to 5 mm, equal to 12 mm, or between 5 and 12 mm. In some embodiments, the body 111 may include a battery (not visible in FIG. 1), such as a lithium ion rechargeable coin cell battery.

Figure 2:
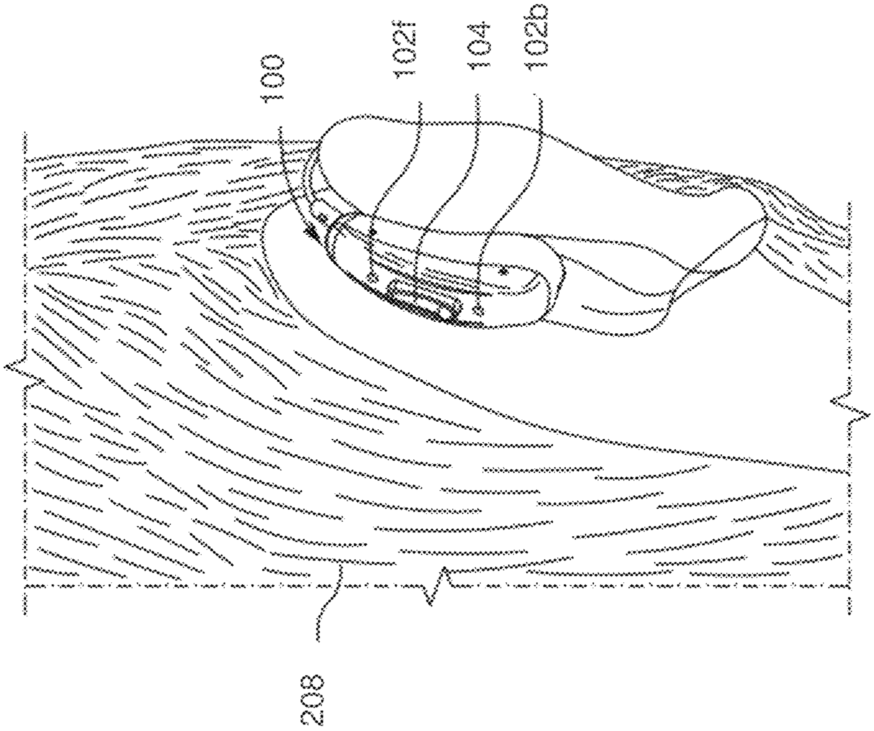
FIG. 2 illustrates the hearing aid of FIG. 1 on a wearer, in accordance with certain embodiments described herein.

FIG. 2 illustrates the hearing aid 100 on a wearer 208, in accordance with certain embodiments described herein. FIG. 2 shows the wearer 208 from the back, and as illustrated, the front microphone **102*f* is closer to the front of the wearer 208 and the back microphone 102*b* is closer to the back of the wearer 208. While FIGS. 1 and 2** illustrate a RIC hearing aid, hearing aids with other form factors may be used as well.

Figure 3:
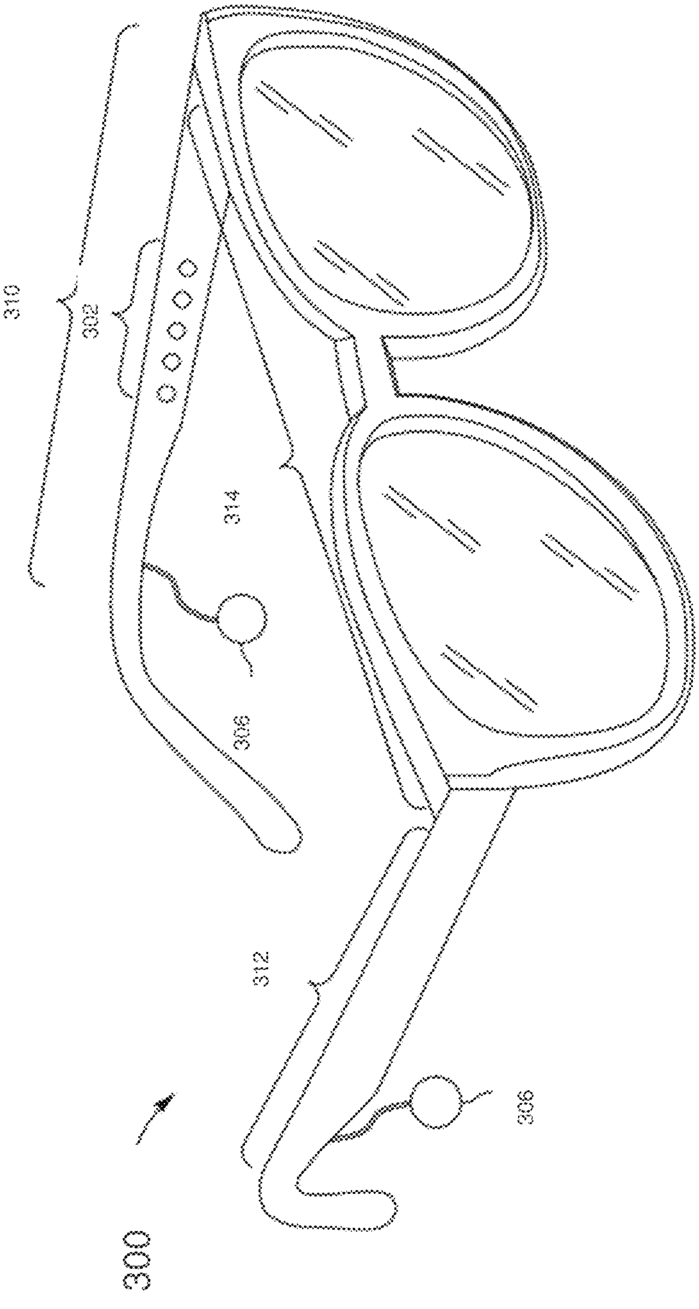
FIG. 3 illustrates eyeglasses with built-in hearing aids, in accordance with certain embodiments described herein.

FIG. 3 illustrates eyeglasses 300 with built-in hearing aids, in accordance with certain embodiments described herein. The eyeglasses 300 may be any of the ear-worn devices or hearing aids described herein. The eyeglasses 300 have a left temple 310, a right temple 312, and a front rim 314. The eyeglasses 300 further include receivers 306 connected to each of the left temple 310 and the right temple 312. FIG. 3 illustrates microphones 302 disposed on the left temple 310. It should be appreciated that microphones 302 may also be disposed on the right temple 312 (but not visible in the figure). It should be appreciated that microphones 302 may also be disposed on the front rim 314 (but not visible in the figure). While FIG. 3 illustrates five microphones 302 on the left temple 310, more or fewer microphones may be disposed on a temple or rim. In some embodiments (such as that of FIG. 3), the inlets for the microphones 302 may be disposed on the inner side of the temples and/or rim (i.e., the side facing toward the wearer's face), thereby reducing visibility of the inlets to other people. In some embodiments, the inlets for the microphones 302 may be disposed on the upper side of the temples and/or rim, thereby reducing visibility of the inlets to other people. In some embodiments, the inlets for the microphones 302 may be disposed on the outer side of the temples and/or rim (i.e., the side facing away from the wearer's face). Any of the two or more microphones described herein may be any of the microphones 302 of the eyeglasses 300 It should be appreciated that while FIGS. 1-3 illustrate a hearing aid and eyeglasses, other ear-worn devices such as cochlear implants or earphones may be used as well.

Figure 4:
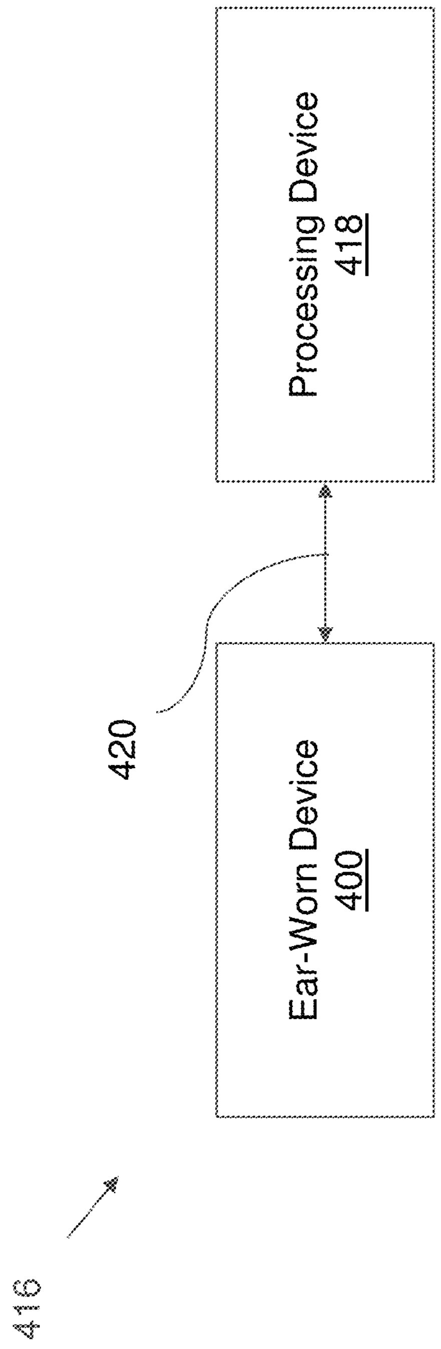
FIG. 4 illustrates a system for operating an ear-worn device, in accordance with certain embodiments described herein.

FIG. 4 illustrates a system 416 for operating an ear-worn device 400, in accordance with certain embodiments described herein. The system 416 includes an ear-worn device 400, a processing device 418, and a wireless communication link 420. The ear-worn device 400 may be, for example, a hearing aid (e.g., the hearing aid 100 or the eyeglasses 300), a cochlear implant, earphones, or any other ear-worn device. The processing device 418 may be, for example, a smartphone, tablet, or laptop. The wireless communication link 420 may be, for example, a Bluetooth or NFMI communication link. The processing device 418 may be in communication with the ear-worn device 400 (i.e., over the wireless communication link 420). The processing device 418 may be configured to transmit, over the wireless communication link 420, commands to the ear-worn device 400 (e.g., to configure the ear-worn device 400 in a particular mode). The ear-worn device 400 may be configured to transmit, over the wireless communication link 420, information (e.g., usage data) to the processing device 418. It should be appreciated that, while not illustrated, the system 416 may include multiple ear-worn devices, such as an ear-worn device for wearing on the right ear and an ear-worn device for wearing on the left ear, and the processing device 418 may communicate with each device over a wireless communication link.

Figure 5:
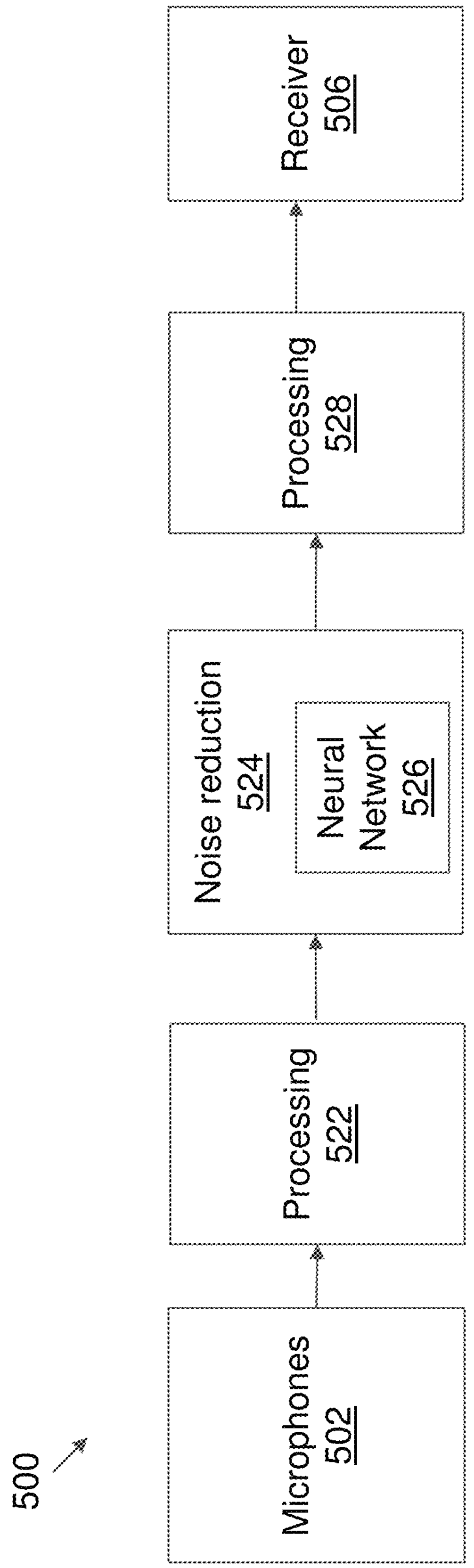
FIG. 5 illustrates circuitry in an ear-worn device, in accordance with certain embodiments described herein.

FIG. 5 illustrates circuitry in an ear-worn device 500, in accordance with certain embodiments described herein. The ear-worn device may be, for example, the hearing aid 100, the eyeglasses 300, and/or the ear-worn device 400. The ear-worn device 500 includes microphones 502, processing circuitry 522, noise reduction circuitry 524, processing circuitry 528, and a receiver 506. The noise reduction circuitry 524 includes neural network circuitry 526. It should be appreciated that the ear-worn device 500 may include more circuitry and components than shown (e.g., anti-feedback circuitry, calibration circuitry, etc.) and such circuitry and components may be disposed before, after, or between certain of the circuitry and components illustrated in FIG. 5.

In the ear-worn device 500, the processing circuitry 522 is coupled between the microphones 502 and the noise reduction circuitry 524. The noise reduction circuitry 524 is coupled between the processing circuitry 522 and the processing circuitry 528. The processing circuitry 528 is coupled between the noise reduction circuitry 524 and the receiver 506. As referred to herein, if element A is described as coupled between element B and element C, there may be other elements between elements A and B and/or between elements A and C. It should be appreciated that in the ear-worn device 500, the neural network circuitry 526 may be downstream of beamforming circuitry in the processing circuitry 522.

The microphones 502 may include two or more (e.g., 2, 3, 4, or more) microphones. For example, the microphones 502 may include two microphones, a front microphone that is closer to the front of the wearer of the ear-worn device and a back microphone that is closer to the back of the wearer of the ear-worn device (e.g., the microphones **102*f* and 102*b* in the hearing aid 100). As another example, the microphones 502 may include more than two microphones in an array (e.g., the microphones 302 in the eyeglasses 300). As another example, one microphone may be on a first ear-worn device and one microphone may be on a second ear-worn device coupled wirelessly to the first ear-worn device. The microphones 502 may be configured to receive sound signals and generate audio signals from the sound signals. The audio signals may represent multiple individual audio signals, each generated by one of the microphones 502. Thus, each of the audio signals may originate from one of the microphones 502**.

In some embodiments, the processing circuitry 522 may include analog processing circuitry. The analog processing circuitry may be configured to perform analog processing on the audio signals received from the microphones 502. For example, the analog processing circuitry may be configured to perform one or more of analog preamplification, analog filtering, and analog-to-digital conversion. Thus, the analog processing circuitry may be configured to generate analog-processed audio signals from the audio signal received from the microphones 502. The analog-processed audio signals may include multiple individual signals, each an analog-processed version of one of the audio signals received from the microphones 502. As referred to herein, analog processing circuitry may include analog-to-digital conversion circuitry, and an analog-processed signal may be a digital signal that has been converted from analog to digital by analog-to-digital conversion circuitry.

In some embodiments, the processing circuitry 522 may include digital processing circuitry. The digital processing circuitry may be configured to perform digital processing on the analog-processed audio signals received from the analog processing circuitry. For example, the digital processing circuitry may be configured to perform one or more of wind reduction, input calibration, and anti-feedback processing. Thus, the digital processing circuitry may be configured to generate digital-processed audio signals from the analog-processed audio signals. The digital-processed audio signals may include multiple individual signals, each a digital-processed version of one of the analog-processed audio signals In some embodiments, the processing circuitry 522 may include beamforming circuitry. The beamforming circuitry may be configured to generate one or more beamformed audio signals from two or more of the digital-processed audio signals. The beamformed audio signals may include one or more individual signals, each a beamformed version of two or more digital-processed audio signals. In some embodiments, the multiple beamformed audio signals may each have a different beamformed directional pattern. Beamforming will be described in further detail below.

The noise reduction circuitry 524 includes the neural network circuitry 526. The neural network circuitry 526 may be configured to implement one or more neural network layers which may be trained to perform noise modification and/or spatial focusing, as will be described below. The term "noise modification" may be used herein to encompass both a process that results in less noise in an output signal than in an input signal (i.e., noise reduction), as well as a process that results in less speech in an output signal than in an input signal. (As will be described below, in certain embodiments, neural network circuitry may be used to obtain a speech-isolated version of a signal, and in certain embodiments, neural network circuitry may be used to obtain a noise-isolated version of a signal). Thus, in some embodiments, the one or more neural network layers implemented by the neural network circuitry 526 may be trained to modify noise. (Further description of what may be considered noise may be found below). In such embodiments, an output from the neural network circuitry 526 may be a version of an audio signal input to the neural network circuitry 526 that has less noise (or just speech, such as the speech signal 603 described below), an output (e.g., a mask or sound map) configured to generate the version of the audio signal input to the neural network circuitry 526 that has less noise, a version of an audio signal input to the neural network circuitry 526 that has less speech (or just noise, such as the background noise signal 601 described below), or an output (e.g., a mask or sound map) configured to generate a version of an audio signal input to the neural network circuitry 526 that has less speech. In some embodiments, the one or more neural network layers implemented by the neural network circuitry 526 may be trained to perform spatial focusing. In such embodiments, an output from the neural network circuitry 526 may be a spatially-focused version of an audio signal input to the neural network circuitry 526, or an output (e.g., a mask or sound map) configured to generate the spatially-focused version of the audio signal input to the neural network circuitry 526. In some embodiments, the one or more neural network layers implemented by the neural network circuitry 526 may be trained to both modify noise and perform spatial focusing. In such embodiments, an output from the neural network circuitry 526 may be a noise-modified and spatially-focused version of an audio signal input to the neural network circuitry 526 (e.g., the target speech signal 605 or the interfering speech signal 607 described below), or an output (e.g., a mask or sound map) configured to generate the noise-modified and spatially-focused version of the audio signal input to the neural network circuitry 526. It should be appreciated that in some embodiments, one neural network layer may be trained to modify noise, perform spatial focusing, or both modify noise and perform spatial focusing. In some embodiments, multiple neural network layers may be trained to modify noise, perform spatial focusing, or both modify noise and perform spatial focusing.

This description may describe one or more neural network layers that are trained to perform a certain action, or to generate output for use in performing that action. As referred to herein, one or more neural network layers may be considered trained to perform a certain action if the one or more neural network layers perform that action themselves, or if they generate output for use in performing that action. Thus, it should be appreciated that one or more neural network layers may be considered trained to perform noise modification even if the neural network itself does not generate a noise-modified audio signal; a neural network that generates an output configured to be used to generate a noise-modified audio signal may still be considered trained to perform noise modification. For example, the neural network may generate a mask configured to generate a noise-modified audio signal. It should also be appreciated that a neural network may be considered trained to perform spatial focusing even if the neural network itself does not generate a spatially-focused audio signal; a neural network that generates an output configured to be used to generate a spatially-focused audio signal may still be considered trained to perform spatial focusing. The output may be, as non-limiting examples, a mask configured to generate a spatially-focused audio signal, a sound map, a mask configured to generate a sound map, or values calculated for a metric from audio from multiple beams (each of the multiple beams pointing at a different angle around a wearer of the ear-worn device). In some embodiments, the one or more neural network layers may be configured to output a single output based on the multiple input audio signals.

Any neural network layers described herein may be, for example, of the recurrent, vanilla/feedforward, convolutional, generative adversarial, attention (e.g. transformer), or graphical type. Generally, a neural network made up of such layers may include an input layer, a plurality of hidden layers, and an output layer, and the layers may be made up of a plurality of neurons/nodes to which neural network weights can be applied.

The processing circuitry 528 may be configured to perform further processing on the output of the noise reduction circuitry 524. For example, the processing circuitry 52628 may include digital processing circuitry configured to perform one or more of wide-dynamic range compression and output calibration.

The receiver 506 (which may be, for example, the same as the receivers 106 and/or 306) may be configured to play back the output of the processing circuitry 528 as sound into the ear of the user. The receiver 506 may also be configured to implement digital-to-analog conversion prior to the playing back.

In some embodiments, portions of the circuitry in the ear-worn device 500 may be configured to process audio signals in the frequency domain. In such embodiments, the processing circuitry 522 may include short-time Fourier transform (STFT) circuitry configured to convert short windows of audio signals from time domain to frequency domain, and the processing circuitry 528 may include inverse STFT (iSTFT) circuitry configured to convert short windows of audio signals from frequency domain to time domain. In some embodiments, portions of the circuitry in the ear-worn device 500 may be configured to process audio signals in the time domain. In some embodiments, the ear-worn device may lack STFT and iSTFT circuitry.

Deploying noise reduction techniques may introduce delays between when a sound is emitted by the sound source and when the noise-reduced sound is output to a user. For example, such techniques may introduce a delay between when a speaker speaks and when a listener hears the noise-reduced speech. During in-person communication, long latencies can create the perception of an echo as both the original sound and the noise-reduced version of the sound are played back to the listener. Additionally, long latencies can interfere with how the listener processes incoming sound due to the disconnect between visual cues (e.g., moving lips) and the arrival of the associated sound. To attain tolerable latencies when implementing a neural network on an ear-worn device, the ear-worn device may need to be capable of performing billions of operations per second. To address power issues with such demanding requirements, the neural network circuitry 524 (in addition to other circuitry) may be implemented on a chip in the ear-worn device. Thus, in some embodiments, one or more of the processing circuitry 522, the noise reduction circuitry 524 (including the neural network circuitry 526), and the processing circuitry 528 (or portions of any of the above) may be implemented on a single same chip (i.e., a single semiconductor die or substrate) in the ear-worn device. Further description of chips incorporating (in some embodiments, among other elements) neural network circuitry for use in ear-worn devices may be found in U.S. Pat. No. 11,886,974, entitled "Neural Network Chip for Ear-Worn Device," issued Jan. 30, 2024, which is incorporated by reference herein in its entirety, as well as below.

Noise Reduction Circuitry

Figure 6:
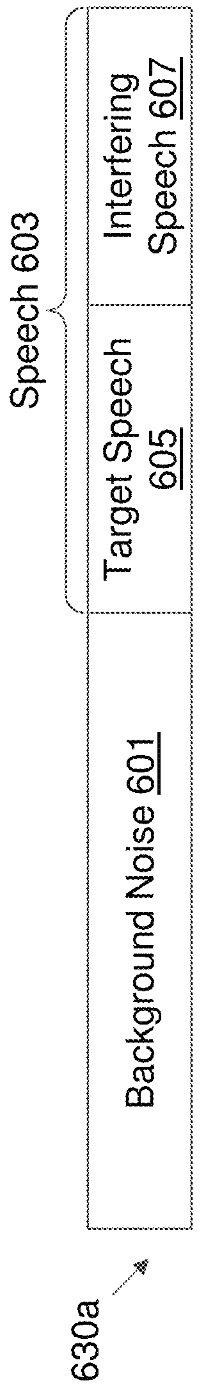
FIG. 6 illustrates an audio signal, in accordance with certain embodiments described herein.

FIG. 6 illustrates an audio signal 630*a*, in accordance with certain embodiments described herein. The audio signal 630*a* (which, as described below, may be one of the audio signals 630 that are input to neural network circuitry) contains a background noise signal 601 and a speech signal 603. The speech signal 603 includes a target speech signal 605 and an interfering speech signal 607.

Generally, the goal of noise reduction circuitry (e.g., any of the noise reduction circuitry described herein) may be to enhance the target speech signal 605. This may include, for example, amplifying the target speech signal 605 and/or attenuating the background noise signal 601 and the interfering speech signal 607. Thus, both background noise and interfering speech may be considered noise and attenuated as part of noise reduction. The speech signal 603 may include speech in the audio signal 630*a* and the background noise signal 601 may include background noise in the audio signal 630*a*. In more detail, any speech that lacks features that can distinguish it from target speech (described further below) may be considered to be the speech signal 603 of the audio signal 630*a*. The background noise signal 601 may be considered to be any sounds (including speech) that include features that can distinguish it from target speech. Examples of types of speech that include features that can distinguish it from target speech include speech that sounds like babble and speech that sounds far away. In some embodiments, the background noise signal 601 may be equivalent to the remainder when the speech signal 603 is subtracted from the audio signal 630*a*. From another perspective, the speech signal 603 may be equivalent to the remainder when the background noise signal 601 is subtracted from the audio signal 630*a*. It should be appreciated that the relationships described above may still be true even if no subtraction process is actually performed. For example, the background noise signal 601 may be considered equivalent to the remainder when the speech signal 603 is subtracted from an audio signal 630*a*, even if the background noise signal 601 is generated independently or through a different procedure, rather than being generated through subtraction.

The target speech signal 605 may, broadly and qualitatively, be considered to be the portion of the speech signal 603 that the wearer of the ear-worn device is most interested in hearing. The interfering speech signal 607 may, broadly and qualitatively, be considered to be the portion of the speech signal 603 that the wearer of the ear-worn device is less interested in hearing. However, as described above, determining what is the target speech signal 605 and what is the interfering speech signal 607 may be a difficult problem. The technology described herein may distinguish between the target speech signal 605 and the interfering speech signal 607 based on direction-of-arrival (DOA) relative to the wearer. In further detail, the target speech signal 605 may be a first spatially-focused version of the speech signal 603 of the audio signal 630*a*, and the interfering speech signal 607 may be a second spatially-focused version (different from the first spatially-focused version) of the speech signal 603 of the audio signal 630*a*. A spatially-focused version of a signal may be that signal with a spatial focusing pattern applied to it. In other words, spatial focusing may include applying a spatial focusing pattern (which may also be referred to as a spatial focusing pattern) to an audio signal. A spatial focusing pattern may define different weights (which may also be referred to as gains) applied to an audio signal as a function of direction-of-arrival (DOA) of sounds in the audio signal, where DOA may be defined relative to the wearer of the ear-worn device. In some embodiments, weights may be equal to 0, equal to 1, or between 0 and 1. In some embodiments, a weight may be equal to or greater than 0. In some embodiments, weights may be greater than 0, less than 0, equal to zero, or complex numbers; a negative weight may flip phase by 180 degrees, while a complex weight may rotate the phase by some angle. Mapping weights to DOA may result in focusing, as higher weights may be applied to sounds originating from certain directions and lower weights may be applied to sounds originating from other directions. Applying higher weights to the direction where a target speaker is located (or assumed to be located) and lower weights to other directions may help to focus on sound from the target speaker and to attenuate sound from other interfering speakers. As an example, if the target speaker is located (or assumed to be located) in front of the wearer of the ear-worn device, a spatial focusing pattern may specify higher weights for DOAs in front of the wearer than for DOAs to the sides and back of the wearer.

In some embodiments, the target speech signal 605 may be equivalent to the speech signal 603 (of the audio signal 630*a*) to which has been applied a first spatial focusing pattern. (As referred to herein, if signal A is equivalent to signal B with a spatial focusing pattern applied to signal B, signal A may be considered to "have" the spatial focusing pattern.) The first spatial focusing pattern may include different weights applied to the speech of the speech signal 603 originating from different directions-of-arrival (DOAs) relative to the wearer of the ear-worn device. The first spatial focusing pattern may have higher weights for DOAs where the target speaker is located or assumed to be located and lower weights elsewhere. For example, the first spatial focusing pattern may include higher weights applied to speech originating from DOAs towards a front of the wearer of the ear-worn device than weights applied to speech originating from DOAs towards sides and a back of the wearer. The interfering speech signal 607 may be equivalent to the speech signal 603 of the audio signal 630*a* to which has been applied a second spatial focusing pattern. For example, the second spatial focusing pattern may have lower weights for DOAs where the target speaker is located or assumed to be located and higher weights elsewhere. In some embodiments, the interfering speech signal 607 may be equivalent to the remainder when the target speech signal 605 is subtracted from the speech signal 603. From another perspective, the target speech signal 605 may be equivalent to the remainder when the interfering speech signal 607 is subtracted from the speech signal 603. From yet another perspective, the second spatial focusing pattern may be the remainder when the first spatial focusing pattern is subtracted from a weighting pattern having weights at all DOAs equal to 1. From yet another perspective, the first spatial focusing pattern may be the remainder when the second spatial focusing pattern is subtracted from a weighting pattern having weights at all DOAs equal to 1. Generally, the first spatial focusing pattern and the second spatial focusing patterns may be inverses of each other. It should be appreciated that the relationships described above may still be true even if no subtraction process is actually performed. For example, the interfering speech signal 607 may be considered equivalent to the remainder when the target speech signal 605 is subtracted from the speech signal 603, even if the interfering speech signal 607 is generated independently or through a different procedure, rather than being generated through subtraction. It should be appreciated that the interfering speech signal 607 may represent different interfering speaker weighted based on the second spatial focusing pattern. For example, if a first interfering speaker is at 45 degrees and a second interfering speaker is at 90 degrees, and the second spatial focusing specifies a weight of 0.5 at 45 degrees and a weight of 0.8 at 90 degrees, then the interfering speech signal 607 may be equivalent to the audio from the first interfering speaker multiplied by 0.5 plus the audio from the second interfering speaker multiplied by 0.8.

It should be appreciated that because certain spatial focusing patterns may include applying a weight between 0 and 1 to sound from particular DOAs, the target speech signal 605 may include speech from a speaker (weighted by a certain amount) and the interfering speech signal 607 may also include speech from the same speaker (weighted by a different amount). However, if a speaker is only located at DOAs to which a certain spatial focusing pattern applies a weight of 1 or 0, then speech from that speaker may only be present in the target speech signal 605 or the interfering speech signal 607.

It should be appreciated that the audio signal 630*a* may be enhanced by reducing the volume of the background noise signal 601 and the interfering speech signal 607 and/or increasing the volume of the target speech signal 605. Noise reduction circuitry (e.g., any of the noise reduction circuitry described herein) may generally be configured to generate an output audio signal (e.g., the output audio signal 840) including the target speech signal 605, the interfering speech signal 607, and the background noise signal 601, such that in the output audio signal, the volumes of one or more of the background noise signal 601, the interfering speech signal 607, and the target speech signal 605 may be different from their volumes in the audio signal 630*a*. In particular, the change in volume of the background noise signal 601 may be different than the change in volume of the target speech signal 605 by a first volume change difference amount, and the change in volume of the interfering speech signal 607 is different from the change in volume of the target speech signal 605 by a second volume change difference amount. Change in volume may be measured between the volume in the audio signal 630*a* and the volume in the output signal. In some embodiments, the first volume change difference amount and the second volume change difference amount may be different. In some embodiments, the first volume change difference amount and the second volume change difference amount may be independently controllable.

Figure 7:
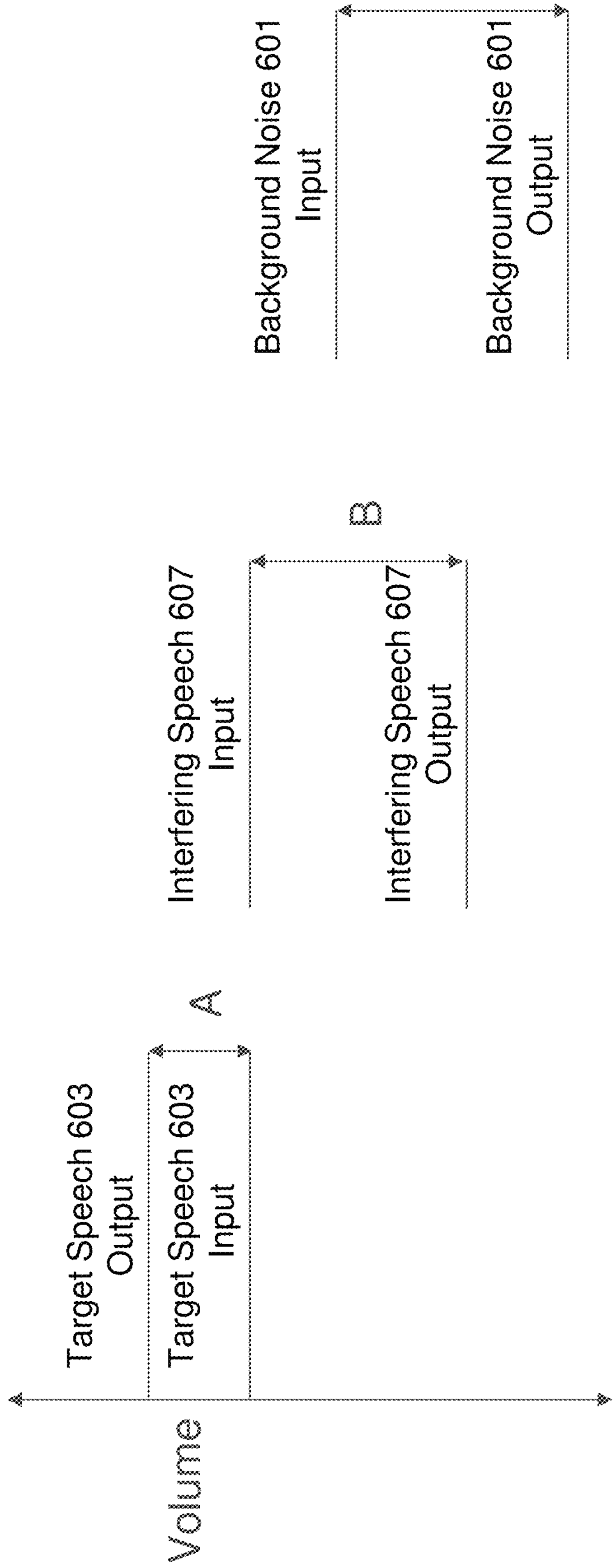
FIG. 7 illustrates changes in volume, in accordance with certain embodiments described herein.

FIG. 7 illustrates changes in volume, in accordance with certain embodiments described herein. FIG. 7 illustrates that the volume of the target speech signal 605 increases by A from the audio signal 630*a* (referred to as "Input") to the output audio signal (referred to as "Output). The volume of the interfering speech signal 607 decreases by B from the audio signal 630*a* to the output audio signal. The volume of the background noise signal 601 decreases by C from the audio signal 630*a* to the output audio signal. The first volume change difference amount described above may be C-A and the second volume change difference amount described above may be B-A.

Figure 8:
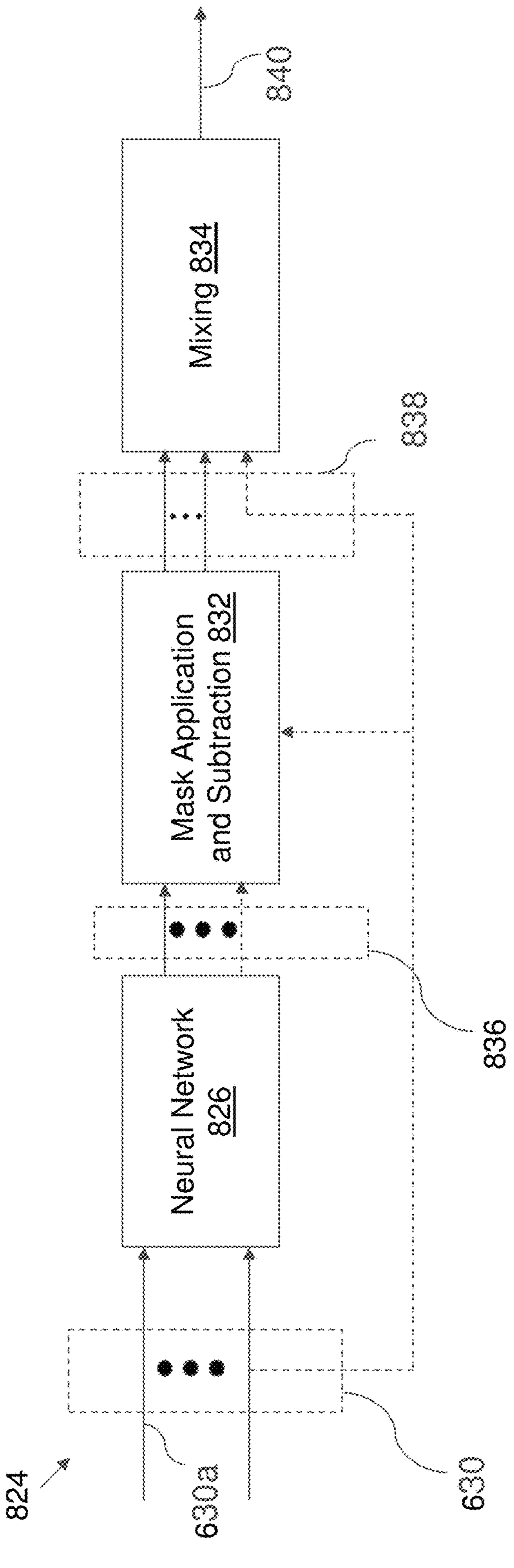
FIG. 8 illustrates noise reduction circuitry in an ear-worn device, in accordance with certain embodiments described herein.

FIG. 8 illustrates noise reduction circuitry 824 in an ear-worn device, in accordance with certain embodiments described herein. The ear-worn device may be any of the ear-worn devices described herein (e.g., the hearing aid 100, the eyeglasses 300, the ear-worn device 400, and/or the ear-worn device 500). The noise reduction circuitry 824 may be any of the noise reduction circuitry described herein (e.g., the noise reduction circuitry 524). The noise reduction circuitry 824 includes neural network circuitry 826 (which may be any of the neural network circuitry described herein, e.g., the neural network circuitry 526), mask application and subtraction circuitry 832, and mixing circuitry 834. The ear-worn device may include two or more microphones (e.g., the microphones 102*f* and 102*b*, the microphones 302, and/or the microphones 502), which are not illustrated in FIG. 8.

The neural network circuitry 826 may be configured to receive multiple audio signals 630 (including the audio signal 630*a*) such that (1) at least two of the multiple audio signals 630 each originate from a different one of the two or more microphones of the ear-worn device and/or (2) at least one of the multiple audio signals 630 is a beamformed audio signal originating from the two or more microphones. (As referred to herein, a first signal may be said to originate from a microphone if the microphone generates the first signal, or if the microphone generates a second signal and the first signal results from processing of the second signal. In some cases, this processing may be performed on the second signal along with other signals). With regards to option (1), as an example, one of the multiple audio signals 630 may be the output of one of the microphones (e.g., a front microphone, such as the front microphone 102*f*), or a processed version thereof (e.g., the output of the front microphone after processing by the processing circuitry 522), and another of the multiple audio signals 630 may be the output of another of the microphones (e.g., a back microphone, such as the back microphone 102*b*), or a processed version thereof (e.g., the output of the back microphone after processing by the processing circuitry 522). With regards to option (2), as an example, one of the multiple audio signals 630 may be the result of beamforming the outputs of two microphones (e.g., beamforming an audio signal originating from a front microphone, such as the front microphone 102*f*, together with an audio signal originating from a back microphone, such as the back microphone 102*b*). The beamformed result may have a particular directional pattern (e.g., cardioid, supercardioid, hypercardioid, or dipole, as non-limiting examples). Further description of beamforming and directional patterns may be found below. In some embodiments, at least two (or all) of the multiple audio signals 630 may have different beamformed directional patterns. In some embodiments, at least one of the multiple audio signals 630 may have a front-facing beamformed directional pattern and at least one of the multiple audio signals 630 may have a back-facing beamformed directional pattern. (As will be described further below, front-facing beamformed directional patterns may generally attenuate signals coming from behind the wearer more than signals coming from in front of the wearer, and back-facing beamformed directional patterns may generally attenuate signals coming from in front of the wearer more than signals coming from behind the wearer.) In some embodiments, the multiple audio signals 630 may include two signals. In some embodiments, the multiple audio signals 630 may include three signals. In some embodiments, the multiple audio signals 630 may include four signals. In some embodiments, the multiple audio signals 630 may include more than four signals. Following are non-limiting examples of sets of audio signals that may be or be included in the multiple audio signals 630. In some embodiments, the multiple audio signals 630 may include a signal having a front-facing supercardioid directional pattern and a signal having a back-facing supercardioid directional pattern. In some embodiments, the multiple audio signals 630 may include a signal having a front-facing cardioid directional pattern and a signal having a back-facing cardioid directional pattern. In some embodiments, the multiple audio signals 630 may include a signal having a front-facing hypercardioid directional pattern and a signal having a back-facing hypercardioid directional pattern. In some embodiments, the multiple audio signals 630 may include a signal having a front-facing cardioid directional pattern, a signal having a back-facing cardioid directional pattern, and a signal having a dipole directional pattern. In some embodiments, the multiple audio signals 630 may include a signal having a front-facing hypercardioid directional pattern, a signal having a back-facing hypercardioid directional pattern, and a signal having a dipole directional pattern. In some embodiments, the multiple audio signals 630 may be in the frequency domain. In some embodiments, the multiple audio signals 630 may be in the time domain. In some embodiments, the neural network circuitry 826 may be configured to receive the multiple audio signals 630 together (i.e., not one after another). In some embodiments, the neural network circuitry 826 may be configured to process the multiple audio signals 630 together (i.e., not one after another).

In some embodiments, the neural network circuitry 826 may be configured to implement one or more neural network layers trained to perform noise modification and spatial focusing, such that the neural network circuitry 826 generates, based on the multiple audio signals 630, two or more neural network outputs 836. (For simplicity, this description may interchangeably describe receiving signals and generating outputs based on the signals as performed by neural network circuitry or one or more neural network layers implemented by the neural network circuitry.) In some embodiments, the noise reduction circuitry 824 may be configured to obtain, based on the two or more neural network outputs 836, a combination of at least two of (1) the speech signal 603 of the audio signal 630*a*, (2) the background noise signal 601 of the audio signal 630*a*, (3) the target speech signal 105 of the audio signal 630*a*, and (4) the interfering speech signal 107 of the audio signal 630*a*. Following will be a description of various methods by which the noise reduction circuitry 824 may obtain these signals based on the two or more neural network outputs 836.

In some embodiments, the two or more neural network outputs 836 may include one or more of (1) an output (e.g., a mask) configured to generate the speech signal 603, (2) an output (e.g., a mask) configured to generate the background noise signal 601, (3) an output (e.g., a mask) configured to generate the target speech signal 105, and (4) an output (e.g., a mask) configured to generate the interfering speech signal 107. A mask may be a real or complex mask that varies with frequency. Thus, when a mask is applied to (e.g., multiplied by, or added to) an audio signal, it may operate differently on different frequency components of the audio signal. In other words, the mask may cause different frequency components of the audio signal to be multiplied by different real or complex values. A real mask may modify just magnitude, while a complex mask may modify both magnitude and phase. When the two or more neural network outputs 836 include two masks, the two masks may be different.

Generally, each of the two or more neural network outputs 836 may include one element or multiple elements, such as one audio signal, multiple audio signals, one mask, multiple masks, one audio signal and one mask, multiple audio signals and multiple masks, etc.

With further regards to training, in some embodiments one or more neural network layers implemented by the neural network circuitry 826 may be trained to perform background noise modification. Training such neural network layers may include obtaining noisy speech audio signals and speech-isolated versions of the audio signals (i.e., with only the speech remaining). In some embodiments, masks that, when applied to the noisy speech audio signals, result in the speech-isolated audio signals may be determined. The training input data may be the noisy speech audio signals and the training output data may be the masks. The one or more neural network layers may thereby learn how to output a speech-isolating mask for the audio signal 630*a*, such that when the mask is applied to (e.g., multiplied by or added to) the audio signal 630*a*, the resulting output audio signal is the speech signal 603, namely a speech-isolated version of the audio signal 630*a*. In some embodiments, masks that, when applied to the noisy speech audio signals, result in the background noise-isolated audio signals may be determined. The training input data may be the noisy speech audio signal and the training output data may be the masks. The neural network layers may thereby learn how to output a background noise-isolating mask for the audio signal 630*a*, such that when the mask is applied to (e.g., multiplied by or added to) the audio signal 630*a*, the resulting output audio signal is the background noise signal 601, namely a background noise-modified version of the audio signal 630*a*. In embodiments in which the one or more neural networks are trained to output speech-isolated or noise-isolated signals themselves, the output training data may be the speech-isolated or noise-isolated signals themselves. Further description of neural networks trained to perform noise modification may be found in U.S. Pat. No. 11,812,225, titled "Method, Apparatus and System for Neural Network Hearing Aid," issued Nov. 7, 2023.

In some embodiments, one or more neural network layers implemented by the neural network circuitry 826 may be trained to perform spatial focusing. Spatial focusing may include applying a spatial focusing pattern to an audio signal. As described above, a spatial focusing pattern may specify different weights as a function of direction-of-arrival (DOA) of sounds, where DOA may be defined relative to the wearer of the ear-worn device. In some embodiments, weights may be equal to 0, equal to 1, or between 0 and 1. In some embodiments, weights may be equal to or greater than 0. In some embodiments, weights may be greater than 0, less than 0, equal to zero, or complex numbers; a negative weight may flip phase by 180 degrees, while a complex weight may rotate the phase by some angle. Mapping weights to DOA may result in focusing, as higher weights may be applied to sounds originating from certain directions and lower weights may be applied to sounds originating from other directions. For training such neural network layers, a training audio signal may be formed from component audio signals originating from different DOAs. Multiple audio signals originating from multiple microphones may be generated from the training audio signal. When the neural network is trained to output a mask, a training mask may be determined such that, when the training mask is applied to one of the multiple audio signals, what remains is each component audio signal multiplied by a weight corresponding to the DOA from which it originated, and then summed together. The one or more neural network layers may thereby learn how to output a mask based on the multiple audio signals such that, when the mask is applied to (e.g., multiplied by or added to) the speech signal 603, the resulting output (the target speech signal 605) includes each component of the speech signal 603 multiplied by a weight corresponding to the DOA from which it originated, and then summed together, namely a spatially-focused version of the speech signal 603. In embodiments in which the one or more neural networks are trained to output spatially-focused signals, the output training data may be the spatially-focused signals themselves.

In some embodiments, one or more neural network layers implemented by the neural network circuitry 826 may be trained to perform background noise modification and spatial focusing. For training such neural network layers, a training audio signal may be formed from component audio signals originating from different DOAs. Multiple audio signals originating from multiple microphones may be generated from the training audio signal. When the neural network is trained to output a mask, a training mask may be determined such that, when the training mask is applied to one of the multiple audio signals, what remains is the speech of each component audio signal multiplied by a weight corresponding to the DOA from which it originated, and then summed together. (As described above, training audio signals may include noisy speech audio signals and speech-isolated versions of the audio signals, i.e., with only the speech remaining.) The one or more neural network layers may thereby learn how to output a mask based on the multiple audio signals such that, when the mask is applied to (e.g., multiplied by or added to) the audio signal 630*a*, the resulting output (the target speech signal 605) includes the speech of each component of the audio signal 630*a* multiplied by a weight corresponding to the DOA from which it originated, and then summed together, namely a background noise-modified and spatially-focused version of the audio signal 630*a*. In embodiments in which the one or more neural networks are trained to output background noise-modified and spatially-focused signals, the output training data may be the background noise-modified and spatially-focused signals themselves.

In some embodiments, the mask application and subtraction circuitry 832 in the noise reduction circuitry 824 may be configured to obtain, based on the two or more neural network outputs 836, a combination of at least two of (1) the speech signal 603 of the audio signal 630*a*, (2) the background noise signal 601 of the audio signal 630*a*, (3) the target speech signal 105 of the audio signal 630*a*, and (4) the interfering speech signal 107 of the audio signal 630*a*. In some embodiments, the mask application and subtraction circuitry 832 may be configured to obtain one or more of these signals by applying a mask to an audio signal. In more detail, consider that the neural network circuitry 826 is configured to generate a mask (i.e., the mask is included in the two or more neural network outputs 836). The one or more neural network layers implemented by the neural network circuitry 826 may be trained to generate a mask such that applying a mask to an audio signal may isolate a portion of the audio signal (e.g., isolate speech from background noise, or isolate target speech from interfering speech). In some embodiments, the mask application and subtraction circuitry 832 may be configured to apply the mask to the audio signal 630*a*, thereby generating the speech signal 603 of the audio signal 630*a*. In some embodiments, the mask application and subtraction circuitry 832 may be configured to apply the mask to the audio signal 630*a*, thereby generating the background noise signal 601 of the audio signal 630*a*. In some embodiments, the mask application and subtraction circuitry 832 may be configured to apply the mask to the speech signal 603 of the audio signal 630*a*, thereby generating the target speech signal 605 of the audio signal 630*a*. In some embodiments, the mask application and subtraction circuitry 832 may be configured to apply the mask to the speech signal 603 of the audio signal 630*a*, thereby generating the interfering speech signal 607 of the audio signal 630*a*. In some embodiments, the mask application and subtraction circuitry 832 may be configured to apply the mask to the audio signal 630*a*, thereby generating the target speech signal 605 of the audio signal 630*a*. In some embodiments, the mask application and subtraction circuitry 832 may be configured to apply the mask to the audio signal 630*a*, thereby generating the interfering speech signal 607 of the audio signal 630*a*. Which signal the mask application and subtraction circuitry 832 applies the mask to, and which signal results, may depend on how the one or more neural network layers implemented by the neural network circuitry 826 have been trained to output the mask. (Because the mask application and subtraction circuitry 832 may be configured to apply the mask to the audio signal 630*a*, a dotted line is shown connecting the audio signal 630*a* to the mask application and subtraction circuitry 832).

In some embodiments, the mask application and subtraction circuitry 832 may be configured to obtain one or more of these signals by performing subtraction on certain signals. (However, in some embodiments, other operations, such as addition, may be used instead.) In some embodiments, the mask application and subtraction circuitry 832 may be configured to subtract the speech signal 603 of the audio signal 630*a* from the audio signal 630, thereby generating the background noise signal 601 of the audio signal 630*a*. In some embodiments, the mask application and subtraction circuitry 832 may be configured to subtract the background noise signal 601 of the audio signal 630*a* from the audio signal 630*a*, thereby generating the speech signal 603 of the audio signal. 630*a*. In some embodiments, the mask application and subtraction circuitry 832 may be configured to subtract the target speech signal 605 from the speech signal 603, thereby generating the interfering speech signal 607 of the speech signal 603 of the audio signal 630*a*. In some embodiments, the mask application and subtraction circuitry 832 may be configured to subtract the interfering speech signal 607 from the speech signal 603, thereby generating the target speech signal 605. In some embodiments, the mask application and subtraction circuitry 832 may be configured to subtract the target speech signal 605 and the interfering speech signal 607 from the audio signal 630*a*, thereby generating the speech signal 603.

In some embodiments, the neural network circuitry 826 may be configured to perform spatial focusing on the audio signal 630*a*, such that one of the two or more neural network outputs 836 is a first signal that includes a spatially-focused version of speech in the audio signal 630*a* plus the background noise in the audio signal 630*a* without spatial focusing, or an output (e.g., a mask) configured to generate this first signal. Thus, in some embodiments, the mask application and subtraction circuitry 832 may be configured to apply the mask to the audio signal 630*a*, thereby generating the first signal. The neural network circuitry 826 may be configured to perform noise modification on the first signal, such that another of the two or more neural network outputs 836 is the target speech signal 605 (namely, the first signal with noise removed), or an output (e.g., a mask) configured to generate the target speech signal 605. Thus, in some embodiments, the mask application and subtraction circuitry 832 may be configured to apply the mask to the first signal (or the audio signal 630*a*), thereby generating the target speech signal 605. In some embodiments, the mask application and subtraction circuitry 832 may be configured to subtract the target speech signal 605 from the first signal, thereby generating the background noise signal 601. In some embodiments, the mask application and subtraction circuitry 832 may be configured to subtract the first signal from the audio signal 630*a*, thereby generating the interfering speech signal 607. In some embodiments, the above may be performed with the roles of the target speech signal 805 and the interfering speech signal 807 interchanged.

In some embodiments, the neural network circuitry 826 may be configured to perform spatial focusing on the audio signal 630*a*, such that one of the two or more neural network outputs 836 is a first signal that includes a spatially-focused version of speech in the audio signal 630*a* plus a spatially-focused version of background noise in the audio signal 630*a*, or an output (e.g., a mask) configured to generate this first signal. Thus, in some embodiments, the mask application and subtraction circuitry 832 may be configured to apply the mask to the audio signal 630*a*, thereby generating the first signal. The neural network circuitry 826 may be configured to perform noise modification on the first signal, such that another of the two or more neural network outputs 836 is the target speech signal 605 (namely, the first signal with noise removed), or an output (e.g., a mask) configured to generate the target speech signal 605. Thus, in some embodiments, the mask application and subtraction circuitry 832 may be configured to apply the mask to the first signal (or the audio signal 630*a*), thereby generating the target speech signal 605. In some embodiments, the mask application and subtraction circuitry 832 may be configured to subtract the target speech signal 605 from the first signal, thereby generating a signal including spatially-focused background noise in the audio signal 603. In some embodiments, this signal including the spatially-focused background noise may be considered the background noise signal 601. In some embodiments, the mask application and subtraction circuitry 832 may be configured to subtract the first signal 605 from the audio signal 630*a*, thereby generating a third signal that includes interfering speech plus the rest of the background noise not in the spatially-focused background signal. In some embodiments, this third signal may be considered the interfering speech signal 607. In some embodiments, the above may be performed with the roles of the target speech signal 805 and the interfering speech signal 807 interchanged. Thus, in some embodiments, the interfering speech signal 607 may include interfering speech but not include background noise, while in other embodiments, the interfering speech signal 607 may include interfering speech plus some background noise. In some embodiments, the background noise signal 601 may include all (or an estimate of all) background noise, while in other embodiments, the background noise signal 601 may include some but not all background noise. From a different perspective, in some embodiments, the background noise signal 601 may not be spatially-focused, and the interfering speech signal 607 may not include a portion of the background noise in the audio signal 630*a*. In some embodiments, the background noise signal 601 may include a first spatially-focused version of the background noise in the audio signal 630*a*, and the interfering speech signal 608 may include the interfering speech (i.e., a spatially-focused version of the speech signal 603) plus a second spatially-focused version of the background noise in the audio signal 630*a*.

Having obtained, using the at least two neural network outputs 836, a combination of at least two of (1) the speech signal 603 of the audio signal 630*a*, (2) the background noise signal 601 of the audio signal 630*a*, (3) the target speech signal 605 of the audio signal 630*a*, and (4) the interfering speech signal 107 of the audio signal 630*a*, the noise reduction circuitry 824 may be configured to generate an output audio signal 840 including the target speech signal 605, the interfering speech signal 607, and the background noise signal 601. In some embodiments, to generate the output audio signal 840 to include the target speech signal 605, the interfering speech signal 607, and the background noise signal 601, the noise reduction circuitry 824 may need to obtain at least one of the target speech signal 605 and the interfering speech signal 607. In other words, in some embodiments, valid combinations may include the speech signal 603 and the target speech signal 605, the speech signal 603 and the interfering speech signal 607, the background noise signal 601 and the target speech signal 605, the background noise signal 601 and the interfering speech signal 607, and the target speech signal 605 and the interfering speech signal 607. In still other words, in some embodiments, the noise reduction 824 may be configured to obtain at least one of the target speech signal 605 and the interfering speech signal 607, and at least one of the speech signal 603 and the background noise signal 601, while in some embodiments, the noise reduction 824 may be configured to obtain the target speech signal 605 and the interfering speech signal 607.

The noise reduction circuitry 824 may be configured to generate in the output audio signal 840*a* such that the volumes of one or more of the background noise signal 601, the interfering speech signal 607, and the target speech signal 605 may be different from their volumes in the audio signal 630*a*. In particular, as illustrated in FIG. 7, the change in volume of the background noise signal 601 may be different than the change in volume of the target speech signal 605 by a first volume change difference amount, and the change in volume of the interfering speech signal 607 may be different from the change in volume of the target speech signal 605 by a second volume change difference amount. Change in volume may be measured between the volume in the audio signal 630*a* and the volume in the output signal 840. In some embodiments, the first volume change difference amount and the second volume change difference amount may be different. In some embodiments, the first volume change difference amount and the second volume change difference amount may be independently controllable.

In more detail, referring to the target speech signal 605 as TS, the interfering speech signal 607 as IS, and the background noise signal 601 as BN, in some embodiments the noise reduction circuitry 834 may be configured to generate the output audio signal 840 to be equivalent to a*TS+b*IS+c*BN. In some embodiments, the interfering speech weight b and the background noise weight c may have values between 0 and 1. The target speech weight a may typically have a value of 1, although other values (e.g., values greater than 1, or values less than 1) may be used as well. Thus, in some embodiments, the output audio signal 840 may have reduced levels of background noise and interfering speech. Adding some background noise and some interfering speech back into the target speech may help to reduce distortion and increase environmental awareness for the wearer of the ear-worn device. In some embodiments, the mixing circuitry 834 may be configured to generate the output audio signal 840 by mixing. As referred to herein, mixing should be understood to mean any combination of different elements after application of weights to the different elements. Thus, the mixing circuitry 834 may be configured to apply (e.g., multiply) signals by different weights and add the results together. The mixing performed by the mixing circuitry 834 may also be considered interpolation.

It should be appreciated that the output audio signal 840 may be generated to be equivalent to a*TS+b*IS+c*BN by multiplying the target speech signal 605 by a, multiplying the interfering speech signal 607 by b, and multiplying the background noise signal 601 by c, and then adding these intermediate products together. However, other signals may be mixed together to arrive at the same result. This may be true under the assumptions that the audio signal 630*a* is equivalent to the speech signal 603 plus the background noise signal 601, and the speech signal 603 is equivalent to the target speech signal 605 plus the interfering speech signal 607. As one non-limiting example, consider instead multiplying the target speech signal 605 by d, multiplying the interfering speech signal 607 by e, and multiplying the audio signal 630*a* by f, and then adding these intermediate products together. Referring to the audio signal 630*a* as O (for original) and the speech signal as S, the following may be shown:

$$d*TS+e*IS+f*O=d*TS+e*IS+f*(S+BN)=$$

$$d*TS+e*IS+f*(TS+IS)+f*BN=(d+f)*TS+(e+f)*IS+f*BN$$

Then, the weights a, b, and c in the expression a*TS+b*IS+c*BN may have the following relationships to the weights d, c, and f: a=d+f, b=c+f, c=f.

As described above, the change in volume of the background noise signal 601 may be different than the change in volume of the target speech signal 605 by a first volume change difference amount, and the change in volume of the interfering speech signal 607 is different from the change in volume of the target speech signal 605 by a second volume change difference amount. Change in volume may be measured between the volume in the audio signal 630*a* and the volume in the output signal 840. As will be described further below, the first volume change difference amount and the second volume change difference amount may be independently controllable by controlling one or more of the weight applied to the target speech signal 605, the weight applied to the background noise signal 601, and the weight applied to the interfering speech signal 607 in the output audio signal 840. In embodiments in which the weight applied to the target speech signal 605 is always 1 or 1 by default, the first volume change difference amount and the second volume change difference amount may be independently controllable by controlling the weight applied to the background noise signal 601 and the weight applied to the interfering speech signal 607 in the output audio signal 840. (Alternatively, the weight applied to either the background noise signal 601 and the weight applied to the interfering speech signal 607 may always be 1 or be 1 by default, and the first volume change difference amount and the second volume change difference amount may be independently controllable by controlling the weights applied to the other signals.) In some embodiments, the weights may be applied by directly applying weights to the background noise signal 601 and the interfering speech signal 607. For example, if the weight a for the target speech signal 605 is 1 and the weight c for the background noise signal 601 is 0.18, then the change in volume of the target speech signal 605 may be 0 dB, the change in volume of the background noise signal 601 may be approximately −15 dB (subtracting the volume in the audio signal 630*a* from the volume in the output audio signal 840), and the difference in the changes in volume may be −15 dB (i.e., the first volume change difference amount may be −15 dB). In some embodiments the weights may be applied indirectly as described above, by applying weights to other audio signals that are related to the background noise signal and the interfering speech signal. For example, if the weight f applied to the audio signal 630*a* is 0.18 and the weight d applied to the target speech signal 605 is 0.82, then the change in volume of the target speech signal 605 may be 0 dB, the change in volume of the background noise signal 601 may be approximately −15 dB, and the difference in the changes in volume may be −15 dB (i.e., the first volume change difference amount may be −15 dB).

In some embodiments, the first volume change difference amount and the second volume change difference amount may be considered to be independently controllable when a value selected for one volume change difference amount does not limit what value may be selected for the other volume change difference amount. For example, if the output audio signal 840 has the form a*TS+b*IS+c*BN, in some embodiments, the first volume change difference amount and the second volume change difference amount may be considered to be independently controllable when a value selected for one of the weights a, b, or c does not limit what value may be selected for another of the weights.

Generally, the noise reduction circuitry 824 may be configured to generate the output audio signal 840 using a combination of audio signals. In some embodiments, the combination of audio signals may be at least three signals 838, the at least three signals 838 being the set of or a subset of the audio signal 630*a* ("O"), the speech signal 603 ("S"), the background noise signal 601 ("BN"), the target speech signal 605 ("TS"), and the interfering speech signal 607 ("IS"). (Because the audio signal 630*a* may be used by the mixing circuitry 834 in some embodiments, the audio signal 630*a* is shown as an input to the mixing circuitry 834 with a dotted line.) Valid combinations of these signals may include at least TS IS BN, TS S BN, IS S BN, TS IS O, TS S O, IS S O, TS O BN, and IS O BN. In some embodiments, the mixing circuitry 834 may be configured to generate the output audio signal 840 by mixing a combination of audio signals, such as one of the combinations of the at least three signals 838 described above.

As described above, the noise reduction circuitry 824 may be configured to generate the output audio signal 840 including the target speech signal 605, the interfering speech signal 607, and the background noise signal 601 using at least the two or more neural network outputs 836. It can be appreciated from the above that the two or more neural network outputs 836 may include one or more of the target speech signal 605, the interfering speech signal 607, and the background noise signal 601, or may include outputs from which the target speech signal 605, the interfering speech signal 607, and the background noise signal 601 can be generated. Such outputs may be masks, or signals from which the target speech signal 603, the interfering speech signal 607, and/or the background noise signal 601 can be derived (e.g., by subtraction, as described above).

It should be appreciated from the above that the noise reduction circuitry 826 may be configured to use the first audio signal 630*a*, which may be a beamformed audio signal, in generating the output audio signal 630. For example, the mask application and subtraction circuitry 832 may be configured to apply a mask to the first audio signal 630*a* and/or the mixing circuitry 834 may be configured to use the first audio signal 630*a* in mixing. With regards to masks, it should be appreciated that in some embodiments, the mask application and subtraction circuitry 832 may be configured to apply a mask to a beamformed audio signal, and in some embodiments, the mask application and subtraction circuitry 832 may be configured to apply a mask to a non-beamformed signal.

In some embodiments, the two or more neural network outputs 836 may include one or more of the speech signal 603, the background noise signal 601, the target speech signal 105, and the interfering speech signal 607 themselves. In other words, the neural network circuitry 826 may be configured to directly output one or more of these signals themselves. In embodiments in which the neural network circuitry 826 outputs signals directly rather than masks, the mask application and subtraction circuitry 832 may instead just include subtraction circuitry. In some embodiments, application of masks may result in all the signals that need to be generated. In such embodiments, the mask application and subtraction circuitry 832 may instead just include mask application circuitry. In some embodiments, the neural network circuitry 826 may be configured to directly output all the signals that need to be generated. In such embodiments, the mask application and subtraction circuitry 832 may be absent.

In some embodiments, the mixing circuitry 834 may be configured to mix two or more masks, and the mask application and subtraction circuitry 832 may be configured to apply the mixed mask to an audio signal. Such an operation may be equivalent to applying the two or more masks to an audio signal independently and then mixing the results together. Mixing masks may include applying weights to different masks and combining (e.g., adding) the weighted masks together. In such embodiments, the mixing circuitry 834 may be incorporated into the mask application and subtraction circuitry 832. Thus, in some embodiments, the mixing circuitry 834 may be configured to generate the output audio signal 840 by mixing multiple (e.g., at least two) masks. Referring to the speech signal 603 as "S", the background noise signal 601 as "BN", the target speech signal 605 as "TS", and the interfering speech signal 607 as "IS", the multiple masks may include masks configured to generate TS, IS, BN; TS, S, BN; IS, S, BN; TS and IS; TS and S; IS and S; TS and BN; IS and BN. In some embodiments, when only two masks are mixed, the result may be applied to the audio signal 603*a* and then mixed with the audio signal 603*a*.

It should be appreciated that some or all of the speech signal 603, the background noise signal 601, the target speech signal 605, and the interfering speech signal 607 may be generated using one or more neural network layers, and the one or more neural network layers may be trained to output estimates. Thus, in some embodiments, the speech signal 603 need not necessarily include all speech in the audio signal 630*a*, the background noise signal 601 may not necessarily include all background noise in the audio signal 630*a*, the target speech signal 605 may not necessarily include all target speech in the speech signal 603, and the interfering speech signal 607 may not necessarily include all interfering speech in the speech signal 603.

Figure 9:
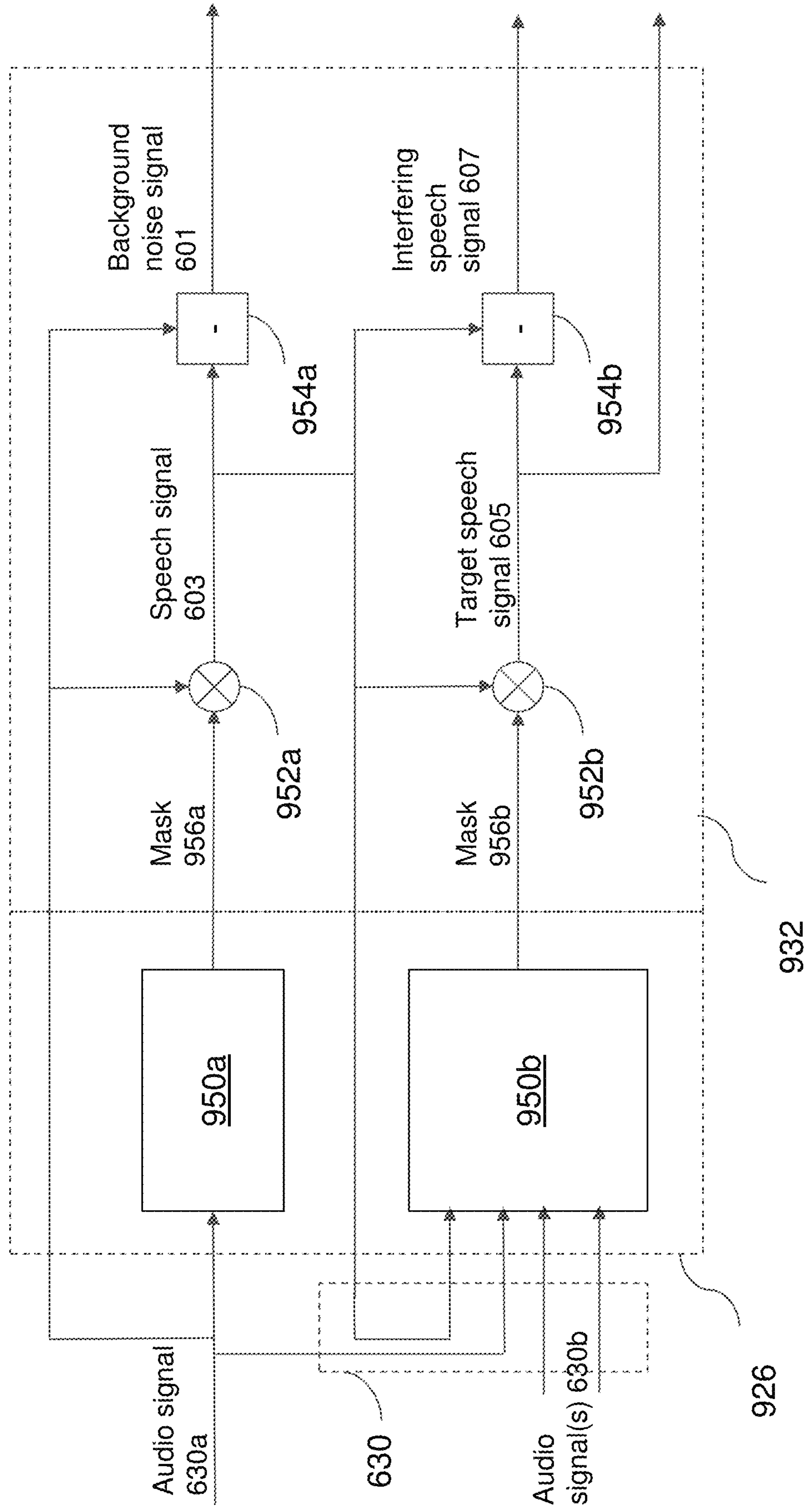
FIG. 9 illustrates neural network circuitry and mask application and subtraction circuitry, in accordance with certain embodiments described herein.

FIG. 9 illustrates neural network circuitry 926 and mask application and subtraction circuitry 932, in accordance with certain embodiments described herein. The neural network circuitry 926 may be an example of any of the neural network circuitry described herein (e.g., the neural network circuitry 526 and/or 826). The mask application and subtraction circuitry 932 may be an example of any of the processing circuitry described herein (e.g., the mask application and subtraction circuitry 832).

The neural network circuitry 926 includes circuitry configured to implement multiple neural network layers, illustrated in FIG. 9 as a first subset of the neural network layers (i.e., one or more layers) 950*a* and a second subset of the neural network layers (i.e., one or more layers) 950*b*. In some embodiments, such circuitry may include multiply-and-accumulate circuitry configured to perform multiply-and-accumulate operations on input activation vectors and neural network weight matrices as part of processing the one or more neural network layers. Further description of neural network circuitry may be found in U.S. Pat. No. 11,886,974, entitled "Neural Network Chip for Ear-Worn Device," and issued Jan. 30, 2024, which is incorporated by reference herein in its entirety. The mask application and subtraction circuitry 932 includes a multiplier 952*a*, a multiplier 956*b*, a subtractor 954*a*, and a subtractor 954*b*.

In some embodiments, the neural network circuitry 926 may be configured to use the first subset of the neural network layers 950*a* to generate one of the two or more neural network outputs 836, and to use the second subset of the neural network layers 950*b* to generate another of the two or more neural network outputs 836. Various options for the neural network outputs 836 are provided above, and it should be appreciated that different embodiments may generate different combinations of these options with the first subset of the neural network layers 950*a* and the second subset of the neural network layers 950*b*. For example, the neural network circuitry 926 may be configured to use the first subset of the neural network layers 950*a* to generate the speech signal 603, an output (e.g., a mask) configured to generate the speech signal 603, the background noise signal 601, and/or an output (e.g., a mask) configured to generate the background noise signal 601. Continuing with this example, the neural network circuitry 926 may be configured to use the second subset of the neural network layers 950*b* to generate the target speech signal 605, an output (e.g., a mask) configured to generate the target speech signal 605, the interfering speech signal 607, and/or an output (e.g., a mask) configured to generate the interfering speech signal 607. In the example of FIG. 9, the first of the neural network outputs 836 is a mask 956*a* configured to generate the speech signal 603, and the second of the neural network outputs 836 is a mask 956*b* configured to generate the target speech signal 605.

The first subset of the neural network layers 950*a* implemented by the neural network circuitry 926 may be configured to receive the audio signal 630*a*. The audio signal 630*a* may originate from one or more microphones in the ear-worn device (e.g., the microphones 102*f* and 102*b*, the microphones 302, and/or the microphones 502). For example, the audio signal 630*a* may be a beamformed version of signals from two different microphones that have undergone processing (e.g., by the mask application and subtraction circuitry 832). As another example, the audio signal 630*a* may be a version of a signal from one microphone that has undergone processing (e.g., by the mask application and subtraction circuitry 832). The first subset of neural network layers 950*a* implemented by the neural network circuitry 926 may be configured to generate, based on the audio signal 630*a*, an output configured to generate the speech signal 603. In the example of FIG. 9, the output configured to generate the speech signal 603 is the mask 956*a*. The multiplier 952*a* may be configured to multiply the audio signal 630*a* by the mask 956*a*, thereby producing the speech signal 603.

In some embodiments, the first subset of neural network layers 950*a* implemented by the neural network circuitry 926 may be trained to perform background noise modification. Further description of neural network training may be found above. Based on the training, the first subset of neural network layers 950*a* may learn how to output a speech-isolating mask 956*a* for an audio signal 630*a*, such that when the multiplier 952*a* multiplies the audio signal 630*a* by the mask 956*a*, the resulting output audio signal is the speech signal 603, namely a speech-isolated version of the audio signal 630*a*. Further description of neural networks trained to perform noise modification may be found in U.S. Pat. No. 11,812,225, titled "Method, Apparatus and System for Neural Network Hearing Aid," issued Nov. 7, 2023.

The second subset of the neural network layers 950*b* implemented by the neural network circuitry 926 may be configured to receive multiple audio signals 630 such that at least two of the multiple audio signals 630 each originate from a different one of the microphones (e.g., the microphones 102*f* and 102*b*, the microphones 302, and/or the microphones 502) of the ear-worn device and/or at least one of the multiple audio signals is a beamformed version of audio signals originating from the microphones. In the example of FIG. 9, the multiple audio signals 630 include the speech signal 603, the audio signal 630*a*, and one or more other audio signals 630*b*. In some embodiments, certain of the multiple audio signals 630 may have a directional pattern formed by beamforming audio signals from different microphones. In some embodiments, certain (e.g., at least two) of the multiple audio signals 630, or each of the multiple audio signals 630, may have a different beamformed directional pattern. In some embodiments, the audio signal 630*a* and/or at least one (or all) of the audio signals 630*b* may have a directional pattern formed by beamforming audio signals from different microphones. In some embodiments, the audio signal 630*a* and at least one (or all) of the audio signals 630*b* may each have a different beamformed directional pattern. Examples of beamformed directional patterns include dipoles, hypercardioids, supercardioids, and cardioids. In some embodiments, at least one of the audio signals 630 may have a front-facing beamformed directional pattern and at least one of the audio signals 630 may have a back-facing beamformed directional pattern. In some embodiments, the audio signal 630*a* or one of the audio signals may be a dipole. In some embodiments, the audio signal 630*a* or one of the audio signals 630*b* may be a front-facing hypercardioid. In some embodiments, the audio signal 630*a* or one of the audio signals 630*b* may be a front-facing supercardioid. In some embodiments, the audio signal 630*a* or one of the audio signals 630*b* may be a front-facing supercardioid. In some embodiments, the multiple audio signals 630 may include two signals. In some embodiments, the multiple audio signals 630 may include three signals. In some embodiments, the multiple audio signals 630 may include four signals. In some embodiments, the multiple audio signals 630 may include more than four signals. In some embodiments, the second subset of the neural network layers 950*b* may just receive the speech signal 603 and the audio signal 630*a* as inputs (i.e., but not receive the audio signals 630*b*). In some embodiments, the second subset of the neural network layers 950*b* may just receive the speech signal 603 and the audio signal(s) 630*b* as inputs (i.e., but not receive the audio signal 630*a*). In some embodiments, certain of the audio signal 630*a* and/or the audio signals 630*b* may be non-beamformed signals.

Following are non-limiting examples of sets of audio signals that may be or be included in the multiple audio signals 630. In some embodiments, the multiple audio signals 630 may include a signal having a front-facing supercardioid directional pattern and a signal having a back-facing supercardioid directional pattern. In some embodiments, the multiple audio signals 630 may include a signal having a front-facing cardioid directional pattern and a signal having a back-facing cardioid directional pattern. In some embodiments, the multiple audio signals 630 may include a signal having a front-facing hypercardioid directional pattern and a signal having a back-facing hypercardioid directional pattern. In some embodiments, the multiple audio signals 630 may include a signal having a front-facing supercardioid directional pattern, a signal having a back-facing supercardioid directional pattern, and the speech signal 603. In some embodiments, the multiple audio signals 630 may include a signal having a front-facing cardioid directional pattern, a signal having a back-facing cardioid directional pattern, and the speech signal 603. In some embodiments, the multiple audio signals 630 may include a signal having a front-facing hypercardioid directional pattern, a signal having a back-facing hypercardioid directional pattern, and the speech signal 603. In some embodiments, the multiple audio signals 630 may include a signal having a front-facing supercardioid directional pattern, a signal having a back-facing supercardioid directional pattern, a signal having a dipole directional pattern, and the speech signal 603. In some embodiments, the multiple audio signals 630 may include a signal having a front-facing cardioid directional pattern, a signal having a back-facing cardioid directional pattern, a signal having a dipole directional pattern, and the speech signal 603. In some embodiments, the multiple audio signals 630 may include a signal having a front-facing hypercardioid directional pattern, a signal having a back-facing hypercardioid directional pattern, a signal having a dipole directional pattern, and the speech signal 603. In some embodiments, the multiple audio signals 630 may include a signal having a front-facing supercardioid directional pattern, a signal having a back-facing supercardioid directional pattern, and a signal having a dipole directional pattern. In some embodiments, the multiple audio signals 630 may include a signal having a front-facing cardioid directional pattern, a signal having a back-facing cardioid directional pattern, and a signal having a dipole directional pattern. In some embodiments, the multiple audio signals 630 may include a signal having a front-facing hypercardioid directional pattern, a signal having a back-facing hypercardioid directional pattern, and a signal having a dipole directional pattern.

The second subset of the neural network layers **950*b* implemented by the neural network circuitry 926 may be configured to generate, based on the multiple audio signals 630, an output configured to generate the target speech signal 605. In the example of FIG. 9, the output configured to generate the target speech signal 605 is the mask 956*b*. The multiplier 956*b* may be configured to multiply the speech signal 603 by the mask 956*b*, thereby producing the target speech signal signal 605**.

In some embodiments, the second subset of the neural network layers **950*b* implemented by the neural network circuitry 926 may be trained to perform spatial focusing. Further description of training may be found above. Based on the training, the second subset of the neural network layers 950*b* may learn how to output a mask 956*b* based on the multiple audio signals 630 such that, when the multiplier 956*b* multiplies the speech signal 603 by the mask 956*b*, the resulting output (the target speech signal 605) includes each component audio signal multiplied by a weight corresponding to the DOA from which it originated, and then summed together. Applying higher weight to the direction where a target speaker is located and lower weight to other direction may help to focus on sound from the target speaker and to attenuate out sound from other interfering speakers. Thus, the output (the target speech signal 605**) may broadly be considered to be a signal containing target speech.

The mask application and subtraction circuitry 932 may be further configured to generate a background noise signal 601 and an interfering speech signal 607. In the example of FIG. 9, the subtractor **954*a* may be configured to subtract the speech signal 603 from the audio signal 630*a*, thus producing the background noise signal 601. The subtractor 954*b* may be configured to subtract the target speech signal 605 from the speech signal 603, thus producing the interfering speech signal 607**.

It should be appreciated from the above that the mask **956*a* may be configured to generate the speech signal 603, the mask 956*b* may be configured to generate the target speech signal 605, and the mask 956*a* and the mask 956*b* may be different. In some embodiments, rather than the mask 956*b* being applied to the speech signal 603, the mask 956*b* may be applied to the audio signal 630*a*, or one of the audio signals 630*b***.

Generally, the audio signals and training data for the one or more neural network layers trained to perform spatial focusing (e.g., the second subset **950*b***) may need to contain spatial information (in other words, contain sufficient information such that the model may infer where a sound source is located). At minimum, the audio signals and training data may need to include multiple (i.e., at least two) audio signals, where at least two of the multiple audio signals each originate from a different one of two or more microphones and/or at least one of the multiple audio signals is a beamformed version of audio signals originating from the two or more microphones. Thus, training data for these one or more neural network layers may generally need to include audio signals originating from different microphones. Two methods for generating multi-microphone localized training data may include 1. Collecting audio originating from sounds at different DOAs with multiple microphones, and 2. Synthetically creating multiple microphone signals as though a sound source was localized at a specific DOA using audio simulation. Synthetic generation of training signals may include adding directionality to different sound sources (speech signals and noise) in simulation and then adding these together to create a new signal with spatial audio. A neural network may be trained on either or both of synthetic data and captured data.

While the noise reduction circuitry 924 includes respective multipliers **952*a* and 956*b* for multiplying respective masks 956*a* and 956*b* by audio signals, in some embodiments, other operations (e.g., addition) may be used for combining masks with signals. Additionally, rather than the one or more neural network layers implemented by neural network circuitry (e.g., the neural network circuitry 926) being configured to generate an output (e.g., a mask, such as the mask 956*a* or 956*b*) that is configured to generate a particular signal, in some embodiments the one or more neural network layers may be configured to generate the particular signal itself. As an example, in some embodiments, the first subset of neural network layers 950*a* implemented by the neural network circuitry 926 may be configured to generate the speech signal 603, and the second subset of neural network layers 950*b* implemented by the neural network circuitry 926 may be configured to generate the target speech signal 605**.

As described above, the one or more neural network layers implemented by the neural network circuitry 926, and in particular, the first subset of neural network layers **950*a*, may be configured to generate the speech signal 603, or an output (e.g., the mask 956*a*) configured to generate the speech signal 603**. This may include cases where, when the mask is applied to an audio signal (e.g., the audio signal 630*a*), the speech signal 603 results, as well as cases where, when the mask is applied to an audio signal (e.g., the audio signal 630*a*), the background noise signal 601 results, and then a subtractor is used to generate the speech signal 603 from the background noise signal 601 (e.g., by subtracting the background noise signal 601 from the audio signal 630*a*). Additionally, this may include cases where the one or more neural network layers generate the speech signal 603 directly, as well as cases where the one or more neural network layers generate the background noise signal 601 directly, and then a subtractor is used to generate the speech signal 603 from the background noise signal 601 (e.g., by subtracting the background noise signal 601 from the audio signal 630*a*). Similarly, as described above, the one or more neural network layers implemented by the neural network circuitry 926, and in particular, the second subset of neural network layers 950*b*, may be configured to generate the target speech signal 605, or an output (e.g., the mask 956*b*) configured to generate the target speech signal 605. This may include cases where, when the mask is applied to an audio signal (e.g., the speech signal 603), the target speech signal 605 results, as well as cases where, when the mask is applied to an audio signal (e.g., the speech signal 603), the interfering speech signal 607 results, and then a subtractor is used to generate the target speech signal 605 from the interfering speech signal 607 (e.g., by subtracting the interfering speech signal 607 from the speech signal 603). Additionally, this may include cases where the one or more neural network layers generate the target speech signal 605 directly, as well as cases where the one or more neural network layers generate the interfering speech signal 607 directly, and then a subtractor is used to generate the target speech signal 605 from the interfering speech signal 607 (e.g., by subtracting the interfering speech signal 607 from the speech signal 603).

It should be appreciated from the above description of FIG. 9 that the first subset of the neural network layers 950*a* may be configured to generate the mask 956*a*, which may be configured to generate the speech signal 603, and the speech signal 603 may be an input to the second subset of the neural network layers 950*b*, which may be configured to generate the mask 956*b*. In other words, the mask 956*a* may be generated before the mask 956*b*. Thus, processing the first subset of the neural network layers 950*a* may occur before processing the second subset of the neural network layers 950*b*. In some embodiments, the same circuitry may be used to process the first subset of the neural network layers 950*a* and the second subset of the neural network layers 950*b*. For example, processing the neural network layers may include using multiplier-accumulator circuits (MACs) configured to multiply input activations by neural network weights. In some embodiments, the same MACs may be used to process the first subset of the neural network layers 950*a* and the second subset of the neural network layers 950*b*, but the neural network weights used by the MACs may be different. Namely, the first subset of the neural network layers 950*a* may use different weights than the second subset of the neural network layers 950*b*. In some embodiments, different circuitry may be used to process the first subset of the neural network layers 950*a* and the second subset of the neural network layers 950*b*.

Figure 10:
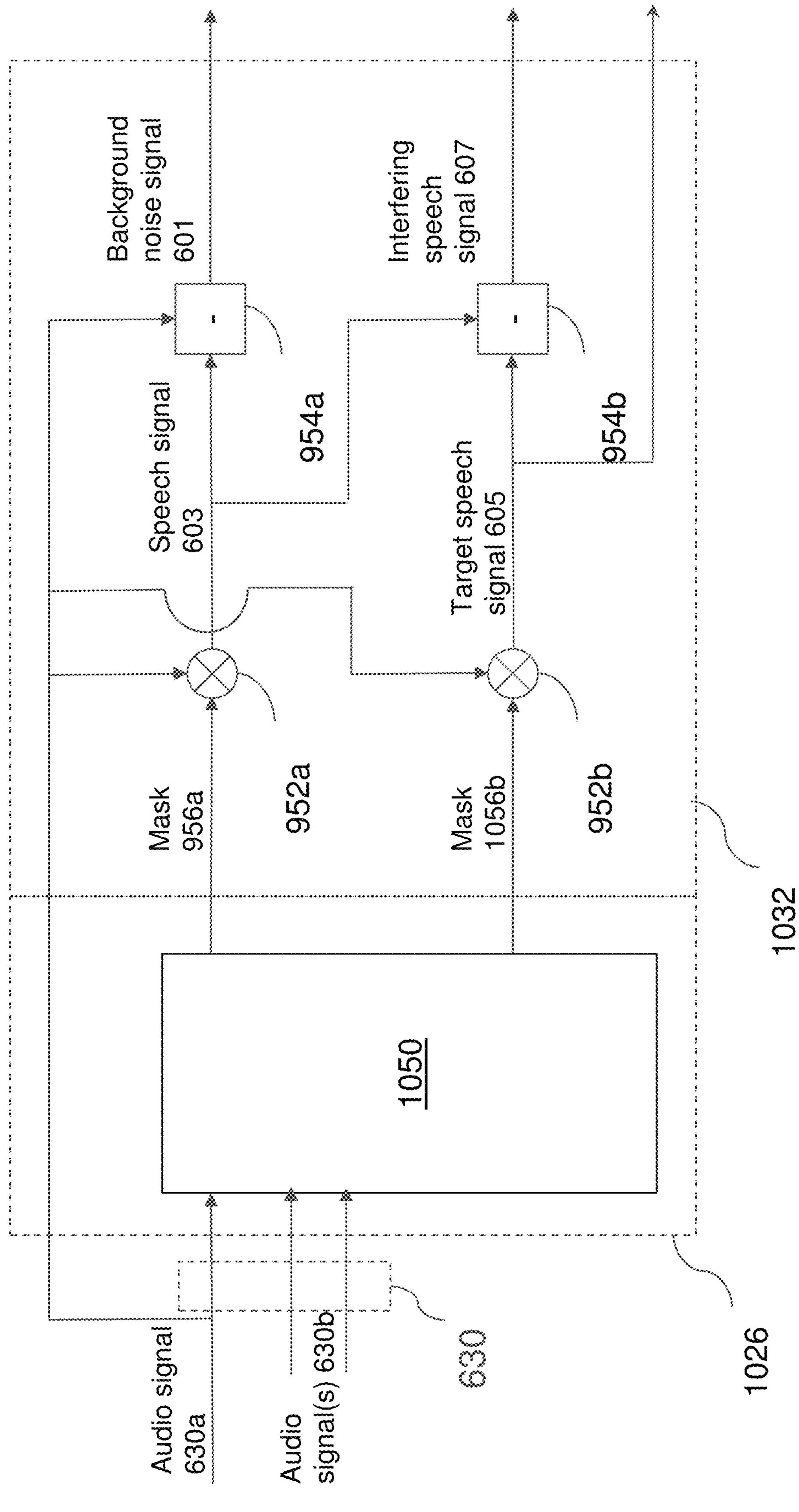
FIG. 10 illustrates neural network circuitry and mask application and subtraction circuitry, in accordance with certain embodiments described herein.

FIG. 10 illustrates neural network circuitry 1026 and mask application and subtraction circuitry 1032, in accordance with certain embodiments described herein. The neural network circuitry 1026 may be an example of any of the neural network circuitry described herein (e.g., the neural network circuitry 526 and/or 826). The mask application and subtraction circuitry 1032 may be an example of any of the processing circuitry described herein (e.g., the mask application and subtraction circuitry 832).

The neural network circuitry 1026 includes circuitry configured to implement one or more neural network layers. The one or more neural network layers 1050 implemented by the neural network circuitry 1026 may be configured to receive the multiple audio signals 630. Generally, the one or more neural network layers 1050 may be configured to generate, based on the multiple audio signals 630, the speech signal 603 or an output configured to generate the speech signal 603, and the target speech signal 605 or an output configured to generate the target speech signal 605. In the particular example of FIG. 10, based on the multiple audio signals 630, the one or more neural network layers 1050 may be configured to generate the mask 956*a* and a mask 956*b*. As described above, the mask 956*a* may be configured to generate the speech signal 603 (by multiplication of the mask 956*a* by the audio signal 630*a* using the multiplier 956*a*). The mask 1056*b* may be configured to generate the target speech signal 605 (by multiplication of the mask 1056*b* by the audio signal 630*a* using the multiplier 956*b*). From the speech signal 603 the background noise signal 601 may be generated (by subtracting the speech signal 603 from the audio signal 630*a* using the subtractor 954*a*), and from the target speech signal 605 the interfering speech signal 607 may be generated (by subtracting the target speech signal 605 from the speech signal 603 using the subtractor 954*b*). In some embodiments, the one or more neural network layers 1050 may be configured to generate a mask configured to generate the background noise signal 601 and/or a mask configured to generate the interfering speech signal 607. Furthermore, from the background noise signal 601, the speech signal 603 may be generated and/or from the interfering speech signal 607, the target speech signal 605 may be generated. In some embodiments, the mask 956*a* and the mask 1056*b* may be generated simultaneously. In some embodiments, the one or more neural network layers 1050 may be configured to directly generate some combination of the speech signal 603, the target speech signal 605, the background noise signal 601, and the interfering speech signal 607. In some embodiments, the signals generated by the one or more neural network layers 1050 may be generated simultaneously. Thus, the speech signal 603 may not necessarily be an input to neural network layers configured to generate the mask 1056*b*. The one or more neural network layers 1050 implemented by the neural network circuitry 1026 may be considered trained to perform background noise modification (for generating the speech signal 603 from the audio signal 630*a*) and trained to perform background noise modification and spatial focusing (for generating the target speech signal 605 from the audio signal 630*a*).

The above description of FIGS. 9 and 10 has described how the speech signal 603, the background noise signal 601, the target speech signal 605, and the interfering speech signal 607 may be generated. As further described above, some combination of these signals and the audio signal 630*a* may be mixed together, for example by the mixing circuitry 834.

Returning to FIG. 8, the above description of FIG. 8 has described the neural network circuitry 826 outputting two or more neural network outputs 836. Generally, as described above, the ear-worn device may include two or more microphones, the noise reduction circuitry 824 may include the neural network circuitry 826, the neural network circuitry 826 may be configured to receive the receive multiple audio signals 630 such that (1) at least two of the multiple audio signals 630 each originate from a different one of the two or more microphones of the ear-worn device and/or (2) at at least one of the multiple audio signals 630 is a beamformed audio signal originating from the two or more microphones. The neural network circuitry 826 may be configured to implement one or more neural network layers trained to perform noise modification and/or spatial focusing, such that the neural network circuitry 826 generates, based on the multiple audio signals 630, one or more neural network outputs 836. For example, the one or more neural network outputs 836 may be one or more audio signals, one or more outputs (e.g., masks and/or sound maps) configured to generate an output audio signal, or a combination thereof. The noise reduction circuitry 824 may be configured to output, based on the one or more neural network outputs 836, an output audio signal 840 that is a noise-modified and/or spatially-focused version of the audio signal 630*a* (i.e., one of the multiple audio signals 630). As particular examples, the one or more neural network outputs 836 may include an output audio signal that is a background noise-modified and spatially-focused version of the audio signal 630*a*, or the one or more neural network outputs 836 may be configured for use, by the noise reduction circuitry 826, in generating an output audio signal that is a background noise-modified version and spatially-focused version of the audio signal 630*a*.

In some embodiments, the noise reduction circuitry 824 may be configured to perform background noise modification. In other words, the one or more neural network layers may be trained to perform background noise modification, and the output audio signal 840 may include a background noise-modified version of the audio signal 630*a* (e.g., the speech signal 603 and/or the background noise signal 601). In some embodiments, the noise reduction circuitry 824 may be configured to perform spatial focusing. In other words, the one or more neural network layers may be trained to perform spatial focusing, and the output audio signal 840 may include a spatially-focused version of the audio signal 630*a* (e.g., a spatially-focused version of both the speech and background noise in the audio signal 630*a*, or a spatially-focused version of just the speech, i.e., the target speech signal 605). In some embodiments, the noise reduction circuitry 824 may be configured to perform background noise modification and spatial focusing. In other words, the one or more neural network layers may be trained to perform background noise modification and spatial focusing, and the output audio signal 840 may include a background noise-modified and spatially-focused version of the audio signal 630*a* (e.g., the target speech signal 605).

When the output audio signal 840 includes a spatially-focused version of the audio signal 630*a*, or a background noise-modified and spatially-focused version of the audio signal 630*a*, the spatially-focused portion of the output audio signal 840 may have a particular spatial focusing pattern. All description herein of spatial focusing patterns and control of spatial focusing pattern (e.g., in the context of the target speech signal 605) may apply to the output audio signal 840 in such scenarios as well.

In embodiments in which the neural network output 836 is a mask, the mask application and subtraction circuitry 832 may be configured to apply (e.g., by multiplying or adding) the mask to an audio signal, for example, the audio signal 630*a*. (Hence, a dotted line is shown connecting the audio signal 630*a* to the mask application and subtraction circuitry 832). In some embodiments, when the mask is applied to the audio signal 630*a*, the speech signal 603 of the audio signal 630*a* may result. In some embodiments, when the mask is applied to the audio signal 630*a*, the background noise signal 601 of the audio signal 630*a* may result. In some embodiments, when the mask is applied to the audio signal 630*a*, a spatially-focused version of the audio signal 630*a* (e.g., the target speech signal 605 or the interfering speech signal 607) may result. In some embodiments, the mask application and subtraction circuitry 832 may be configured to generate a second audio signal based on a first audio signal (which may be, for example, the neural network output 836, or an audio signal generated from the neural network output 836 when the neural network output 836 is a mask). In some embodiments, the mask application and subtraction circuitry 832 may be configured to subtract the speech signal 603 of the audio signal 630*a* from the audio signal 630*a*, thereby generating the background noise signal 601 of the audio signal 630*a*. In some embodiments, the mask application and subtraction circuitry 832 may be configured to subtract the background noise signal 601 of the audio signal 630*a* from the audio signal 630*a*, thereby generating the speech signal 603 of the audio signal 630*a*. In some embodiments, the mask application and subtraction circuitry 832 may be configured to subtract a background noise-modified and spatially-focused version of the audio signal 630*a* (e.g., the target speech signal 605) from the audio signal 630*a*, thereby generating an audio signal that includes background noise and interfering speech (e.g., an audio signal that includes the background noise signal 601 in addition to the interfering speech signal 607). In some embodiments, the mask application and subtraction circuitry 832 may be configured to subtract the target speech signal 605 from the speech signal 603, thereby generating the interfering speech signal 607, or may be configured to subtract the interfering speech signal 607 from the speech signal 603, thereby generating the target speech signal 605.

As described above, in some embodiments the output audio signal 840 may include a background noise-modified, a spatially-focused, or a background noise-modified and spatially-focused version of the audio signal 630*a*. In some embodiments, the output audio signal 840 may be the background noise-modified, the spatially-focused, or the background noise-modified and spatially-focused version of the audio signal 630*a*. In some embodiments the output audio signal 840 may include the background noise-modified, the spatially-focused, or the background noise-modified and spatially-focused version of the audio signal 630*a* mixed with one or more other audio signals. In some embodiments, the mixing circuitry 834 may be configured to mix two or more audio signals, such that the output audio signal 840 is equivalent to the background noise-modified and/or spatially-focused version of the audio signal 630*a* (which may be, as non-limited examples, the speech signal 603, the background noise signal 601, the target speech signal 605, and/or the interfering speech signal 607) mixed with another audio signal (which may be, as non-limited examples, the speech signal 603, the background noise signal 601, the target speech signal 605, the interfering speech signal 607, and/or the audio signal 630*a*). In some embodiments, the mixing circuitry 834 may be configured to mix the speech signal 603 of the audio signal 630*a* with the background noise signal 601 of the audio signal 630*a*. In some embodiments, the mixing circuitry 834 may be configured to mix the speech signal 603 of the audio signal 630*a* with the audio signal 630*a*. In some embodiments, the mixing circuitry 834 may be configured to mix the background noise signal 601 of the audio signal 630*a* with the audio signal 630*a*. In some embodiments, the mixing circuitry 834 may be configured to mix the speech signal 603 of the audio signal 630*a*, the background noise signal 601 of the audio signal 630*a*, and the audio signal 630*a*. In some embodiments, the mixing circuitry 834 may be configured to mix a background noise-modified and spatially-focused version (e.g., the target speech signal 605) of the audio signal 630*a* with the audio signal 630*a*. In some embodiments, the mixing circuitry 834 may be configured to mix a background noise-modified and spatially-focused version of the audio signal 630*a* (e.g., the target speech signal 605) with the background noise signal 601. In some embodiments, the mixing circuitry 834 may be configured to mix a first background noise-modified and spatially-focused version of the audio signal 630*a* (e.g., the target speech signal 605) with a second background noise-modified and spatially-focused version of the audio signal 630*a* (e.g., the interfering speech signal 607). In some embodiments, the mixing circuitry 834 may be configured to mix a first background noise-modified and spatially-focused version of the audio signal 630*a* (e.g., the target speech signal 605), a second background noise-modified and spatially-focused version of the audio signal 630*a* (e.g., the interfering speech signal 607), and the audio signal 630*a*. In some embodiments, the mixing circuitry 834 may be configured to mix a first background noise-modified and spatially-focused version of the audio signal 630*a* (e.g., the target speech signal 605), a second background noise-modified and spatially-focused version of the audio signal 630*a* (e.g., the interfering speech signal 607), and the background noise signal 601. In some embodiments, the mixing circuitry 834 may be configured to mix a first background noise-modified and spatially-focused version of the audio signal 630*a* (e.g., the target speech signal 605) with an audio signal that includes background noise and interfering speech (e.g., an audio signal that includes the background noise signal 601 in addition to the interfering speech signal 607). The mixing performed by the mixing circuitry 834 may also be considered interpolation.

Figure 11:
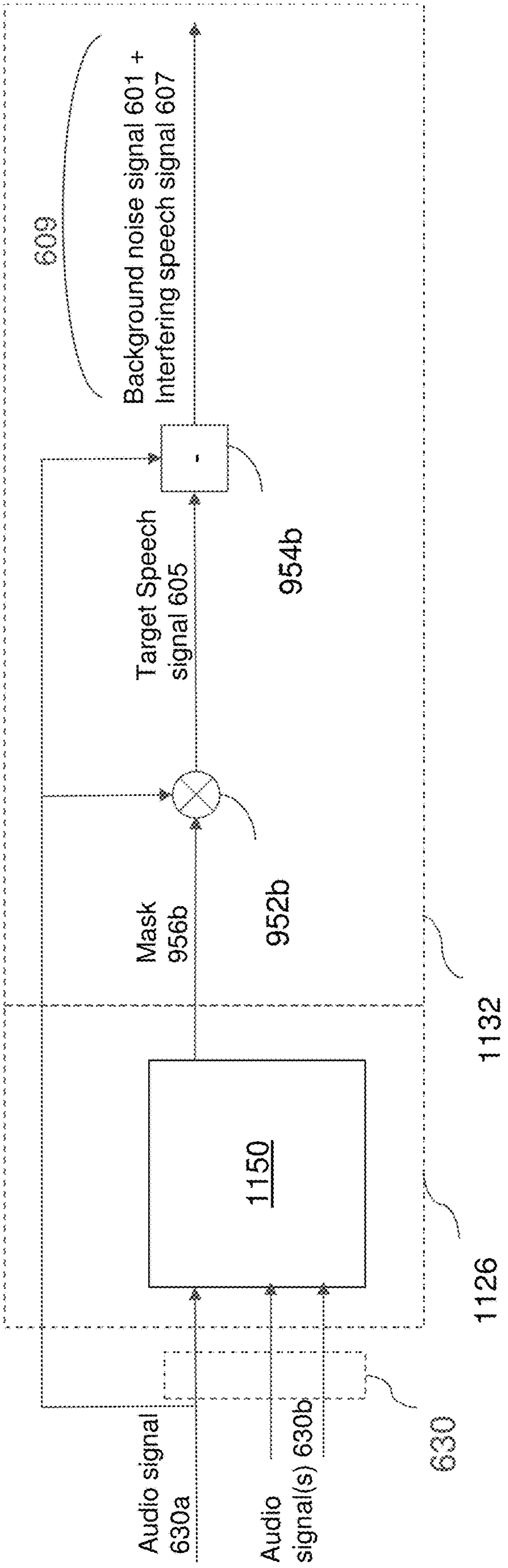
FIG. 11 illustrates neural network circuitry and mask application and subtraction circuitry, in accordance with certain embodiments described herein.

FIG. 11 illustrates neural network circuitry 1126 and mask application and subtraction circuitry 1132, in accordance with certain embodiments described herein. The neural network circuitry 1126 may be an example of any of the neural network circuitry described herein (e.g., the neural network circuitry 526 and/or 826). The mask application and subtraction circuitry 1132 may be an example of any of the processing circuitry described herein (e.g., the mask application and subtraction circuitry 832).

The neural network circuitry 1126 includes circuitry configured to implement one or more neural network layers. The one or more neural network layers 1150 implemented by the neural network circuitry 1126 may be configured to receive the multiple audio signals 630. Generally, the one or more neural network layers 1150 may be configured to generate, based on the multiple audio signals 630, the target speech signal 605 or an output configured to generate the target speech signal 605. In the particular example of FIG. 11, based on the multiple audio signals 630, the one or more neural network layers 1150 may be configured to generate the mask 1056*b*. As described above, the mask 1056*b* may be configured to generate the target speech signal 605 (by multiplication of the mask 1056*b* by the audio signal 630*a* using the multiplier 952*b*). From the target speech signal 605, an audio signal 609 that includes the background noise signal 601 plus the interfering speech signal 607 may be generated (by subtracting the target speech signal 605 from the audio signal 630*a* using the subtractor 954*b*). The one or more neural network layers 1150 implemented by the neural network circuitry 1126 may be considered trained to perform background noise modification and spatial focusing (for generating the target speech signal 603 from the audio signal 630*a*).

The above description of FIG. 11 has described how the target speech signal 605 and the audio signal 609 (including the background noise signal 601 plus the interfering speech signal 607) may be generated. As further described above, some combination of these signals and the audio signal 630*a* may be mixed together, for example by the mixing circuitry 834. In more detail, referring to the target speech signal 605 as TS, and the audio signal 609 as (IS+BN), in some embodiments the noise reduction circuitry 834 may be configured to generate the output audio signal 840 to be equivalent to a*TS+b*(IS+BN). In some embodiments, the weight b for the interfering speech plus the background noise may have values between 0 and 1. The target speech weight a may typically have a value of 1, although other values (e.g., values greater than 1, or values less than 1) may be used as well. Thus, in some embodiments, the output audio signal 840 may have reduced levels of background noise and interfering speech. Adding some background noise and interfering speech back into the target speech may help to reduce distortion and increase environmental awareness for the wearer of the ear-worn device. In some embodiments, the mixing circuitry 834 may be configured to generate the output audio signal 840 by mixing. Thus, the mixing circuitry 834 may be configured to apply (e.g., multiply) signals by different weights and add the results together. The mixing performed by the mixing circuitry 834 may also be considered interpolation.

It should be appreciated that the output audio signal 840 may be generated to be equivalent to a*TS+b*(IS+BN) by multiplying the target speech signal 605 by a and multiplying the audio signal 609 by b. However, other signals may be mixed together to arrive at the same result. This may be true under the assumptions that the audio signal 630*a* is equivalent to the speech signal 603 plus the background noise signal 601, and the speech signal 603 is equivalent to the target speech signal 605 plus the interfering speech signal 607. As one non-limiting example, consider instead multiplying the target speech signal 605 by d, multiplying the audio signal 630*a* by e, and then adding these intermediate products together. Referring to the audio signal 630*a* as O (for original) and the speech signal as S, the following may be shown:

$$d*TS+e*O=d*TS+e*(S+BN)=d*TS+e*(TS+IS+BN)=(d+e)*TS+e*IS+e*BN$$

Then, the weights a and b in the expression a*TS+b*(IS+BN) may have the following relationships to the weights d and c: a=d+c, b=c.

It should be appreciated that in such embodiments, the first volume change difference amount and the second volume change difference amount may not be independently controllable, as the background noise signal 601 and the interfering speech signal 607 may be combined together in the audio signal 609. Nevertheless, the first volume change difference amount and the second volume change difference amount may still be controllable. In other words, the first volume change difference amount and the second volume change difference amount may need to have the same amount, but that amount may be controllable. In still other words, the mixing circuitry 834 may be configured to mix two or more audio signals, such that the output audio signal comprises a background noise-modified and spatially-focused version of the audio signal 630*a* (i.e., the target speech signal 605) mixed with a second audio signal. The second audio signal may include the background noise signal 601 and the interfering speech signal 607. For example, the second audio signal may be the audio signal 609 or the audio signal 630*a*. The noise reduction circuitry (e.g., the noise reduction circuitry 824) may be configured to generate the output audio signal 840 such that in the output audio signal, a change in volume of the background noise signal 601 is different from a change in volume of the target speech signal 605 by a volume change difference amount, a change in volume of the interfering speech signal is different from the change in volume of the target speech signal by the same volume change difference amount, and the volume change difference amount may be controllable.

WDRC Circuitry

As described above, noise reduction circuitry may be configured to generate an output audio signal including the target speech signal 605, the interfering speech signal 607, and the background noise signal 601, such that in the output audio signal, a change in volume of the background noise signal is different from a change in volume of the target speech signal by a first volume change difference amount, a change in volume of the interfering speech signal is different from the change in volume of the target speech signal by a second volume change difference amount, and the first volume change difference amount and the second volume change difference amount are independently controllable. The above description has described generating this output audio signal using mixing circuitry (e.g., the mixing circuitry 834). In some embodiments, noise reduction circuitry may be configured to generate the output audio signal using wide dynamic range compression (WDRC) circuitry. Briefly, some ear-worn devices may apply a non-linear, frequency-dependent gain to incoming sound so as to "fit" the output sound to the hearing profile of the wearer. For example, if a wearer has significant hearing loss in higher frequencies and much less hearing loss in lower frequencies, then, for the same input volumes, the ear-worn device may apply more gain to higher frequency sounds than lower frequency sounds to equalize, in effect, the audibility or perceived loudness of different sounds across frequencies. Additionally, because those with hearing loss typically have a narrow range of volumes at which they can comfortably hear (a reduced "dynamic range"), some hearing aids apply more gain to quiet sounds and less gain to louder sounds, in effect "compressing" the original signal into the dynamic range of the wearer. These techniques are sometimes referred to as wide-dynamic range compression (WDRC).

Figure 12:
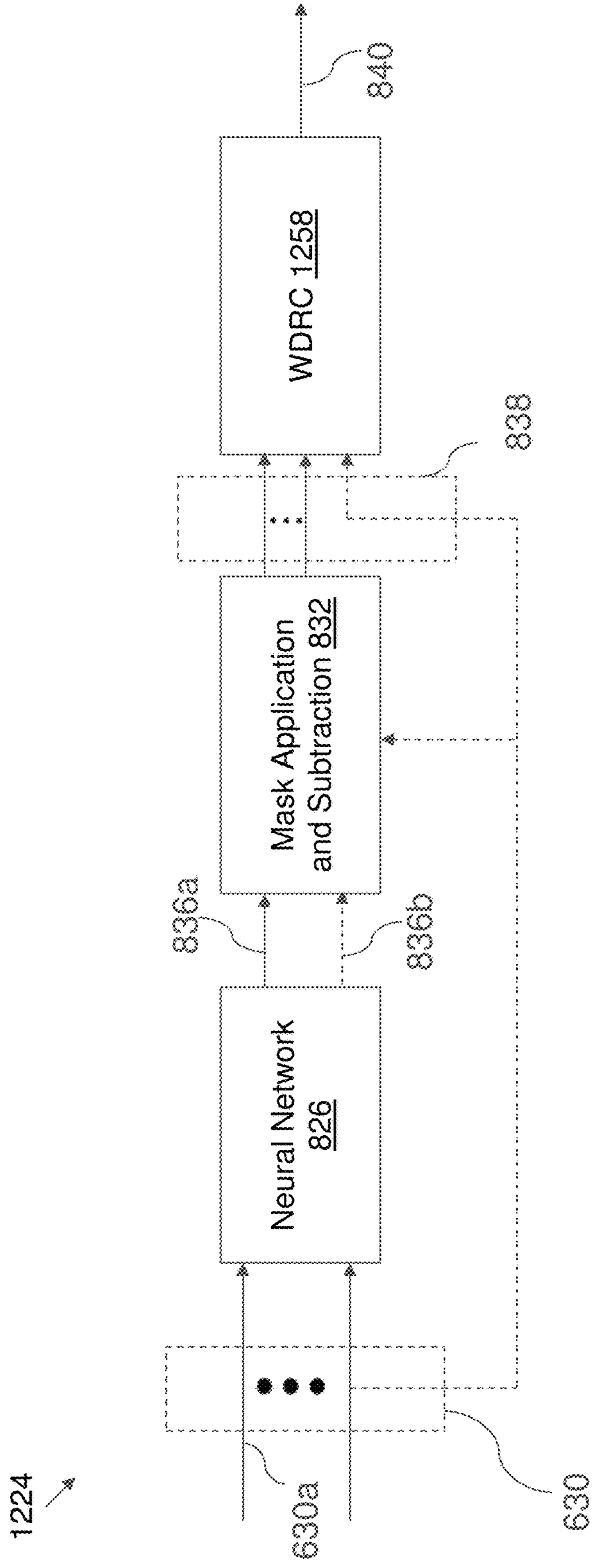
FIG. 12 illustrates noise reduction circuitry in an ear-worn device, in accordance with certain embodiments described herein.

FIG. 12 illustrates noise reduction circuitry 1224 in an ear-worn device, in accordance with certain embodiments described herein. The ear-worn device may be any of the ear-worn devices described herein (e.g., the hearing aid 100, the eyeglasses 300, the ear-worn device 400, and/or the ear-worn device 500). The noise reduction circuitry 1224 may be any of the noise reduction circuitry described herein (e.g., the noise reduction circuitry 524). The noise reduction circuitry 1224 includes the neural network circuitry 826, the mask application and subtraction circuitry 832, and WDRC circuitry 1258. The WDRC circuitry 1258 may be configured to receive as inputs the multiple audio signals 838, which may include, for example, two or more of the audio signal 630*a*, the speech signal 603, the background noise signal 601, the target speech signal 605, and the interfering speech signal 607.

Figure 13:
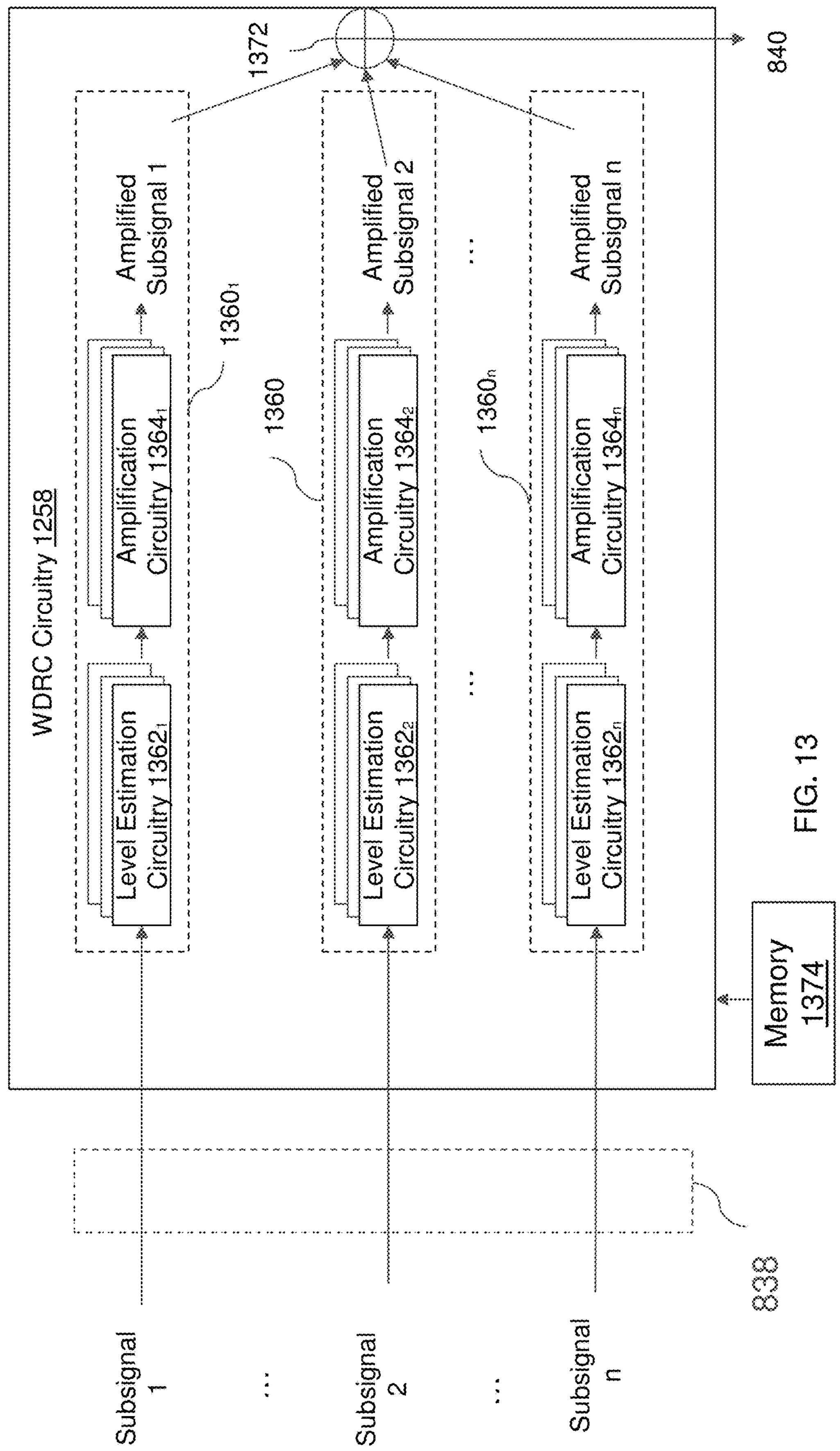
FIG. 13 illustrates the wide dynamic range compression (WDRC) circuitry of FIG. 12 in more detail, in accordance with certain embodiments described herein.

FIG. 13 illustrates the WDRC circuitry 1258 in more detail, in accordance with certain embodiments described herein. The WDRC circuitry 1258 includes the amplification pipelines 1360, one for each of the multiple audio signals 858 received by the WDRC circuitry 1258, and each including a set of level estimation circuitry 1362 and a set of amplification circuitry 1364. The multiple audio signals 858 may include, for example, two or more of the audio signal 630*a*, the speech signal 603, the background noise signal 601, the target speech signal 605, and the interfering speech signal 607. Each set of level estimation circuitry 1362 is displayed as including multiple blocks, each block for a different frequency channel. Each set of amplification circuitry 1364 is displayed as including multiple blocks, each block for a different frequency channel. (Circuitry for converting input signals to the frequency domain, splitting the signals into frequency channels, combining the frequency channels together, and converting to the time domain, is not shown for simplicity).

Generally, the WDRC circuitry 1258 includes multiple hearing loss amplification (which may be referred to herein simply as "amplification") pipelines 1360. Each amplification pipeline 1360 may correspond to one of the subsignals and include a block of amplification circuitry 1364. The amplification circuitry 1364 may be configured to implement hearing loss amplification, namely additional amplification configured to offset the loss of audibility due to hearing loss. In particular, each respective block of amplification circuitry 1F64 may be configured to apply amplification to the respective input subsignal to produce an amplified subsignal. The amplification applied by each block of amplification circuitry 1364 may be different. Thus, the amplification circuitry $\mathbf{1364}_1$ in the amplification pipeline $\mathbf{1360}_1$ may be configured to apply a first amplification to subsignal 1, the amplification circuitry $\mathbf{1364}_2$ in the amplification pipeline $\mathbf{1360}_2$ may be configured to apply a second amplification to subsignal 2, etc., and the first and second amplifications may be different. Generally, amplification may be any method for amplifying signals to offset loss of audibility due to hearing loss, and may include, for example, one or more rules, formulas, or curves.

Each respective set of level estimation circuitry 1362 may be configured to determine levels of a respective subsignal, and each respective set of amplification circuitry 1364 may be configured to amplify (e.g., apply a set of speech fitting curves) to the respective subsignal based at least in part on the levels of the speech subsignal as determined by the level estimation circuitry 1362. In more detail, for a particular subsignal's respective set of level estimation circuitry 1362, each block of the level estimation circuitry 1362 may be configured to determine a level (e.g., a power or an amplitude) of the input subsignal within a particular frequency channel and within some time window or over some moving average of time windows. For a particular subsignal's respective set of amplification circuitry 1364, each block of the amplification circuitry 1364 may be configured to apply amplification to the input subsignal within a particular frequency channel, such that the result is an amplified subsignal within that frequency channel, and the sum total of the amplified subsignal within the different frequency channels is an amplified subsignal. The amplification applied by each amplification pipeline 1360's set of amplification circuitry 1364 may be different. The amplification applied by the amplification circuitry 1364 to a particular frequency channel of a subsignal may depend, at least in part, on the input level of that particular frequency channel of the subsignal as determined by the level estimation circuitry 1362. Amplification that is input level-dependent and frequency-dependent may include applying a set of fitting curves to the subsignal, each fitting curve being an output level vs. input level curve for a given frequency channel (or, equivalently, each fitting curve being an output level vs. frequency channel curve for a given input level). Different amplification may include different sets of fitting curves. Applying a set of fitting curves to a subsignal may include determining the input level of the subsignal in each frequency channel, determining from one of the fitting curves the output level that corresponds to that input level and frequency channel, amplifying that channel of the subsignal to that output level, and combining results from the different frequency channels. The combiner 1374 (e.g., a summer) may be configured to combine the amplified subsignals back into a single output signal, the output audio signal 840

Thus, the level estimation circuitry 13621 in the amplification pipeline $1360_1$ may be configured to determine a level of subsignal 1 in each frequency channel, and the amplification circuitry $1364_1$ may be configured to apply a first amplification to subsignal 1 based on a first set of fitting curves defining output level as a function of input level and frequency channel. The level estimation circuitry $1362_2$ in the amplification pipeline $1360_2$ may be configured to determine a level of subsignal 2 in each frequency channel, and the amplification circuitry $1364_2$ may be configured to apply a second amplification to subsignal 2 based on a second set of fitting curves defining output level as a function of input level and frequency channel. The first and second amplification may be different; in other words, the first and second set of fitting curves may be different.

It should be appreciated that the WDRC circuitry 1258 includes different level estimation circuitry 1362 and different amplification circuitry 1364 for different subsignals. One subsignal may have blocks of level estimation circuitry 1362 and blocks of amplification circuitry 1364, each block for a particular frequency channel, and another subsignal may have separate blocks of level estimation circuitry 1362 and blocks of amplification circuitry 1364 for the same frequency channels. Thus, each amplification pipeline 1360 may be configured to measure input levels for different subsignals separately. This may be helpful in avoiding pumping effects, in which, due to using only a single level estimator for the entire signal, changes of level in one subsignal may cause jumps in the amplification of another subsignal that is not changing in the same way.

It should also be appreciated that while FIG. 13 illustrates more than two subsignals, more than two amplification pipelines 1360, and more than two amplified subsignals, in some embodiments there may be two subsignals, two amplification pipelines 1360, and two amplified subsignals.

It should also be appreciated that level-dependent amplification may be configured to implement compression, in which the dynamic range of the output level is smaller than the dynamic range of the input level. Amplification that includes compression may be referred to as wide-dynamic range compression (WDRC). Thus, FIG. 13 may illustrate multiple WDRC pipelines (i.e., the amplification pipelines 1360) configured to perform WDRC.

In some embodiments, one amplification pipeline 1360 may be configured to perform amplification based on the level of its own associated subsignal as well as the level of one or more other subsignals. For example, if one subsignal is the speech signal 603 and one subsignal is the background noise signal 601, the levels of the speech signal 603 and the background noise signal 601 may be used to calculate signal-to-noise ratio (SNR), which may then be used to modify the speech and/or noise fitting curves. In some embodiments, the level of the speech signal 603 may be used to set the gains for both the speech signal 603 and the background noise signal 601.

In some embodiments, the WDRC circuitry 1258 may lack level estimation circuitry 1362, and thus the amplification implemented by the amplification circuitry 1364 may not be applied as a function of input level. In other words, the amplification may be independent of input level. As an example, the amplification applied by the amplification circuitry 1364 may include the half-gain rule (adding gain equal to approximately half the amount of hearing loss) or the quarter-gain rule (adding gain equal to half the total hearing loss, plus one quarter of the conductive loss component of the hearing loss).

The memory 1374 may store the different sets of fitting curves and/or rules for the different sub signals. For example, the memory may store one set of fitting curves for the target speech signal 603, one set of fitting curves for the interfering speech signal 605, and one set of fitting curves for the background noise signal 601. In some embodiments, a fitting curve for a particular subsignal and a particular frequency channel may be stored as a set of input levels each with an associated output level, thereby defining a piecewise curve.

It should be appreciated from the above that different amplification may be applied to different audio signals of the multiple audio signals 858. For example, different amplifications may be applied to the audio signal 630*a*, the speech signal 603, the target speech signal 605, the interfering speech signal 607, and the background noise signal 601. Thus, the output audio signal 840 may include the target speech signal 605, the interfering speech signal 607, and the background noise signal 601, such that in the output audio signal 601, a change in volume of the background noise signal is different from a change in volume of the target speech signal by a first volume change difference amount and a change in volume of the interfering speech signal is different from the change in volume of the target speech signal by a second volume change difference amount. Controlling the different amplifications applied to the different audio signals, such as by controlling the fitting curves stored in the memory 1372, may enable the first volume change difference amount and the second volume change difference amount to be independently controllable. Generally, the WDRC circuitry 1258 may include multiple WDRC pipelines (i.e., the amplification pipelines 1360) configured to generate the output audio signal 830 by performing WDRC on a combination of audio signals. In some embodiments, the combination of audio signals may include three audio signals. In some embodiments, the three audio signals may be the set of or a subset of the audio signal 630*a* ("O"), the speech signal 603 ("S"), the background noise signal 601 ("BN"), the target speech signal 605 ("TS"), and the interfering speech signal 607 ("IS"). (Because the audio signal 630*a* may be used by the mixing circuitry 834 in some embodiments, the audio signal 630*a* is shown as an input to the mixing circuitry 834 with a dotted line.) Valid combinations of these signals may include at least TS, IS, BN; TS, S, BN; IS, S, BN; TS, IS, O; TS, S, O; IS, S, O; TS, O, BN; IS, O, BN.

Control of Volume Change

As described above, noise reduction circuitry (e.g., the noise reduction circuitry 524, 824, and/or 1224) may be configured to use mixing circuitry (e.g., the mixing circuitry 834) and/or WDRC circuitry (e.g., the WDRC circuitry 1258) to output the output audio signal 840 such that the output audio signal 840 includes the target speech signal 605, the interfering speech signal 607, and the background noise signal 601, and such that in the output audio signal, 840, the change in volume of the background noise signal 601 may be different from the change in volume of the target speech signal 605 by a first volume change difference amount, the change in volume of the interfering speech signal 607 may be different from the change in volume of the target speech signal 605 by a second volume change difference amount, and the first volume change difference amount and the second volume change difference amount may be independently controllable. Change in volume may be measured between the volume in the audio signal 630*a* and the volume in the output signal 840. It should also be appreciated that, when this description refers to change in volume, the change in volume may be an increase in volume or a decrease in volume. Following will be a description of how these first and second volume change difference amounts may be independently controllable.

Figure 14:
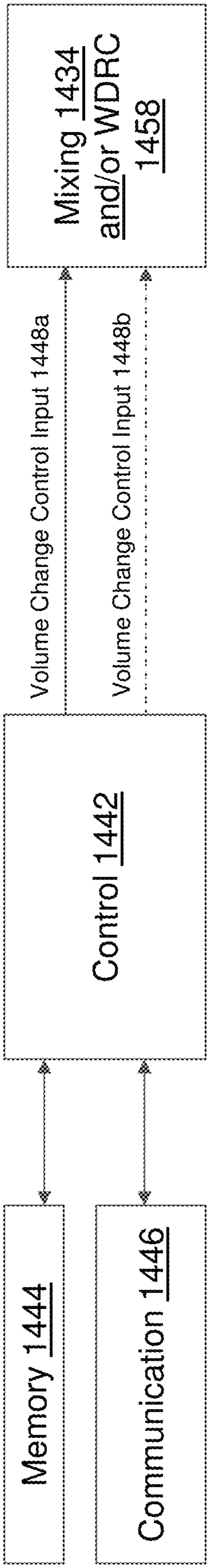
FIG. 14 illustrates circuitry in an ear-worn device, in accordance with certain embodiments described herein.

FIG. 14 illustrates circuitry in an ear-worn device, in accordance with certain embodiments described herein. The ear-worn device may be any of the ear-worn devices described herein (e.g., the hearing aid 100, the eyeglasses 300, the ear-worn device 400, and/or the ear-worn device 500). FIG. 14 illustrates control circuitry 1442, mixing circuitry 1434 (which may be an example of the mixing circuitry 834) and/or WDRC circuitry 1458 (which may be an example of the WDRC circuitry 1258), memory 1444, and communication circuitry 1446. The memory 1444, the communication circuitry 1446, and the mixing circuitry 1434 and/or WDRC circuitry 1358 are coupled to the control circuitry 1442. The memory 1444 may be configured to store data. The communication circuitry 1446 may be configured to facilitate communication between the ear-worn device and other devices (e.g., smartphones, tablets, laptops, computers), for example over wireless communication links (e.g., Bluetooth or NFMI).

The control circuitry 1442 may be configured to provide to the mixing circuitry 1434 and/or the WDRC circuitry 1458 a first volume change control input 1448*a* and a second volume change control input 1448*b*. Thus, in some embodiments, the control circuitry 1442 may be configured to provide the first volume change control input 1448*a* and the second volume change control input 1448*b* to the mixing circuitry 1434. In some embodiments, the control circuitry 1442 may be configured to provide the first volume change control input 1448*a* and the second volume change control input 1448*b* to the WDRC circuitry 1458. In some embodiments, the control circuitry 1442 may be configured to provide the first volume change control input 1448*a* and the second volume change control input 1448*b* to the mixing circuitry 1434 and the WDRC circuitry 1458.

In some embodiments, the mixing circuitry 1434 may be configured to receive the first volume change control input 1448*a* and a second volume change control input 1448*b* and perform the mixing using the first volume change control input 1448*a* and the second volume change control input 1448*b* such that the first volume change difference amount is controlled, at least in part, by the first volume change control input 1448*a* and the second volume change difference amount is controlled, at least in part, by the second volume change control input 1448*b*. For example, consider that the mixing circuitry 1434 may be configured to generate the output audio signal 840 to be equivalent to a*TS+b*IS+c*BN by multiplying the interfering speech signal 607 by b, multiplying the background noise signal 601 by c, and then adding these intermediate products together. (Assume for simplicity that the weight a applied to the target speech signal 605 is 1 by default.) The mixing circuitry 1434 may be configured to base the weight c on the first volume change control input 1448*a* and the weight b on the second volume change control input 1448*b*. The weights b and c, in turn, may control the second volume change difference amount and the first volume change difference amount, respectively. For example, if the weight a is 1 and the weight c is 0.18, then the change in volume of the target speech signal 605 may be 0 dB and the change in volume of the background noise signal 601 may be −15 dB (i.e., the first volume change difference amount may be −15 dB). If the weight a is 1 and the weight b is 0.5, then the change in volume of the target speech signal 605 may be 0 dB and the change in volume of the interfering speech signal 607 may be −6 dB (i.e., the second volume change difference amount may be −6 dB). As another example, consider that the mixing circuitry 834 may be configured to generate the output audio signal 630 to be equivalent to d*TS+e*IS+f*O by multiplying the interfering speech signal 607 by e, multiplying the background noise signal 601 by f, and then adding these intermediate products together. (Assume for simplicity that the weight applied to the target speech signal 605 is 1 by default.) The mixing circuitry may be configured to base the weight f on the first volume change control input and the weight e on the second volume change control input. The weights e and f may together control the first and second volume change difference amounts. Based on the above description showing that a=d+f, b=e+f, c=f, if for example the weight d is 0.82, the weight e is 0.32, and the weight f is 0.18, then the change in volume of the target speech signal 605 may be 0 dB, the change in volume of the background noise signal 601 may be −15 dB (i.e., the first volume change difference amount may be −15 dB), and the change in volume of the interfering speech signal 807 may be −6 dB (i.e., the second volume amount may be −6 dB).

In some embodiments, the first volume change control input 1448*a* and the second volume change control input 1448*b* may be values. In such embodiments, the mixing control circuitry 834 may make the weight c equal to the first volume change control input 1448*a* and make the weight b equal to the second volume change control input 1448. In some embodiments, the mixing control circuitry 834 may derive the weight c from the first volume change control input 1448*a* and derive the weight b from the second volume change control input 1448*b*. For example, the first volume change control input 1448*a* may be an encoded version of the weight c and the second volume change control input 1448*b* may be an encoded version of the weight b, and the mixing control circuitry 834 may be configured to decode the first volume change control input 1448*a* and the second volume change control input 1448*b*.

It should be appreciated that the first volume change control input 1448*a* and the second volume change control input 1448*b* may be different. Thus, the first volume change difference amount and the second volume change difference amount may be different, and may be independently controlled.

It should be appreciated from the above that, in some embodiments, the first volume change control input 1448*a* may control a weight applied to one signal (e.g., the background noise signal 601) and the second volume change control input 1448*b* may control a weight applied to another signal (e.g., the interfering speech signal 607). However, the mixing control circuitry 834 may be configured to use three weights for mixing three signals together. In some embodiments, a third volume change control input may not be used if the weight applied to the third signal (e.g., the target speech signal) always has the same value, or is the same value by default (e.g., 1). However, in some embodiments, a third volume change control input may be used to control the weight applied to the third signal, using the methods described below. For simplicity, this description focuses on the first volume change control input 1448*a* and the second volume change control input 1448*b*.

In some embodiments, the WDRC circuitry 1458 may be configured to receive the first volume change control input 1448*a* and a second volume change control input 1448*b* and perform WDRC using the first volume change control input 1448*a* and the second volume change control input 1448*b* such that the first volume change difference amount is controlled, at least in part, by the first volume change control input 1448*a* and the second volume change difference amount is controlled, at least in part, by the second volume change control input 1448*b*. For example, the first volume change control input 1448*a* and the second volume change control input 1448*b* may be different fitting curves or rules (or inputs from which fitting curves or rules can be derived or retrieved) for applying to different signals.

In some embodiments, the memory 1444 may be configured to store the first volume change control input 1448*a* and the second volume change control input 1448*b*. In some embodiments, the communication circuitry 1446 may be configured to receive the first volume change control input 1448*a* and the second volume change control input 1448*b* from a processing device (i.e., an external device). The memory 1444 may be configured to store the first volume change control input 1448*a* and the second volume change control input 1448*b*. In some embodiments, the control circuitry 1442 may be configured to retrieve the first volume change control input 1448*a* and the second volume change control input 1448*b* from the memory 1444 and output the first volume change control input 1448*a* and the second volume change control input 1448*b* to the mixing circuitry 1458 and/or to the WDRC circuitry 1458. In some embodiments, the communication circuitry 1446 may be configured to receive the first volume change control input 1448*a* and the second volume change control input 1448*b* from an external device and the control circuitry 1442 may be configured to receive the first volume change control input 1448*a* and the second volume change control input 1448*b* from the communication circuitry 1446 and provide the first volume change control input 1448*a* and the second volume change control input 1448*b* to the mixing circuitry 1434 and/or the WDRC circuitry 1458 without storing the data in the memory 1444.

In some embodiments, the first volume change difference amount and the second volume change difference amount may be determined as part of a fitting. For example, an audiologist may determine the first volume change difference amount and the second volume change difference amount during a fitting and use their processing device (e.g., smartphone, tablet, laptop, or computer) to transmit the first volume change control input 1448*a* and the second volume change control input 1448*b* (corresponding to the first volume change difference amount and the second volume change difference amount, respectively) to the communication circuitry 1446 of the ear-worn device. In some embodiments, the processing device (e.g., the processing device 418, such as a smartphone, tablet, laptop, or computer) of the ear-worn device's wearer may run an app for communicating with the ear-worn device. In such embodiments, the app may include default values for the first volume change difference amount and the second volume change difference amount, and the wearer's processing device may transmit the first volume change control input 1448*a* and the second volume change control input 1448*b* (corresponding to the default first volume change difference amount and the default second volume change difference amount, respectively) to the communication circuitry 1446 of the ear-worn device. The first volume change control input 1448*a* and the second volume change control input 1448*b* may then be stored in the memory 1444. In some embodiments, the app may include different sets of default values for the first volume change difference amount and the second volume change difference amount, and the wearer's processing device may transmit sets of first volume change control inputs 1448*a* and second volume change control inputs 1448*b* (corresponding to the default sets of first volume change difference amounts and the default second volume change difference amounts, respectively) to the communication circuitry 1446 of the ear-worn device. The sets of first volume change control inputs 1448*a* and second volume change control inputs 1448*b* may then be stored in the memory 1444. When the wearer selects a mode using the app of their processing device, the processing device may transmit an indication of the selected mode to the communication circuitry 1446 of the ear-worn device, and the control circuitry 1442 may receive the indication of the mode and retrieve the first volume change control input 1448*a* and the second volume change control input 1448*b* corresponding to the selected mode from the memory 1444. In some embodiments, the app may provide options for the wearer to select a specific first volume change difference amount and the second volume change difference amount, or some other values related to the first volume change difference amount and the second volume change difference amount, and the wearer's processing device may transmit the first volume change control input 1448*a* and second volume change control input 1448*b* (corresponding to the selected first volume change difference amount and the default second volume change difference amount, respectively) to the communication circuitry 1446 of the ear-worn device, and the control circuitry 1442 may receive the selected first volume change control input 1448*a* and selected second volume change control input 1448*b* and use them to control the mixing circuitry 1434 and/or WDRC circuitry 1458.

As referred to herein, circuitry configured to perform operations (e.g., store, receive, retrieve, provide, etc.) related to a volume change control input should be understood to include the circuitry being configured to perform the operations using the volume change control input itself, or using some other data from which the volume change control input may be obtained. For example, when referring to the memory 1444 being configured to store a volume change control input, the memory 1444 may be configured to store the volume change control inputs themselves, or some other data (e.g., an encoded versions of the volume change control inputs) from which the volume change control inputs themselves can be obtained. As another example, when referring to the control circuitry 1442 providing volume change control inputs to the mixing circuitry 1434 and/or WDRC circuitry 1458, the control circuitry 1442 may be configured to provide the volume change control inputs themselves, or some other data (e.g., encoded versions of the volume change control inputs) from which the volume change control inputs themselves can be obtained.

As described above, in some embodiments the mixing circuitry 1434 may be configured to mix two signals together. For example, the mixing circuitry 1434 may be configured to mix the target speech signal 605 with the audio signal 609, or the target speech signal 605 with the audio signal 603*a*. In more detail, the mixing circuitry 1434 may be configured to output a*TS+b*(IS+BN) or a*TS+b*O. In embodiments in which the weight a always has the same value, or is the same value by default (e.g., 1), the mixing circuitry 1434 may only be configured to receive the volume change control input 1448*a*, which may control the weight b, but not a second volume change control input. Accordingly, the volume change control input 1448*b* is shown with dashed lines in the figures. This volume change control input may control a volume change difference amount for both the interfering speech and the background noise. In other words, the volume change difference amount for the interfering speech and the background noise may be the same. Description herein for the first volume change difference amount may apply to this volume change difference amount.

In still other words, the mixing circuitry 1434 may be configured to mix two or more audio signals, such that the output audio signal comprises a background noise-modified and spatially-focused version of the audio signal 630*a* (i.e., the target speech signal 605) mixed with a second audio signal. The second audio signal may include the background noise signal 601 and the interfering speech signal 607. For example, the second audio signal may be the audio signal 609 or the audio signal 630*a*. The noise reduction circuitry (e.g., the noise reduction circuitry 824) may be configured to generate the output audio signal 840 such that in the output audio signal, a change in volume of the background noise signal 601 is different from a change in volume of the target speech signal 605 by a volume change difference amount, a change in volume of the interfering speech signal is different from the change in volume of the target speech signal by the same volume change difference amount, and the volume change difference amount may be controllable. The mixing circuitry 1434 may be configured to receive the volume change control input 1448*a* and perform the mixing using the volume change control input 1448*a* such that the volume change difference amount is controlled, at least in part, by the volume change control input. The communication circuitry 1446 may be configured to receive the volume change control input 1448*a* from a processing device, the memory 1444 may be configured to store the volume change control input 1448*a*, and the control circuitry 1442 may be configured to retrieve the volume change control input 1448*a* and output the volume change control input to the mixing circuitry 1434.

Figure 15:
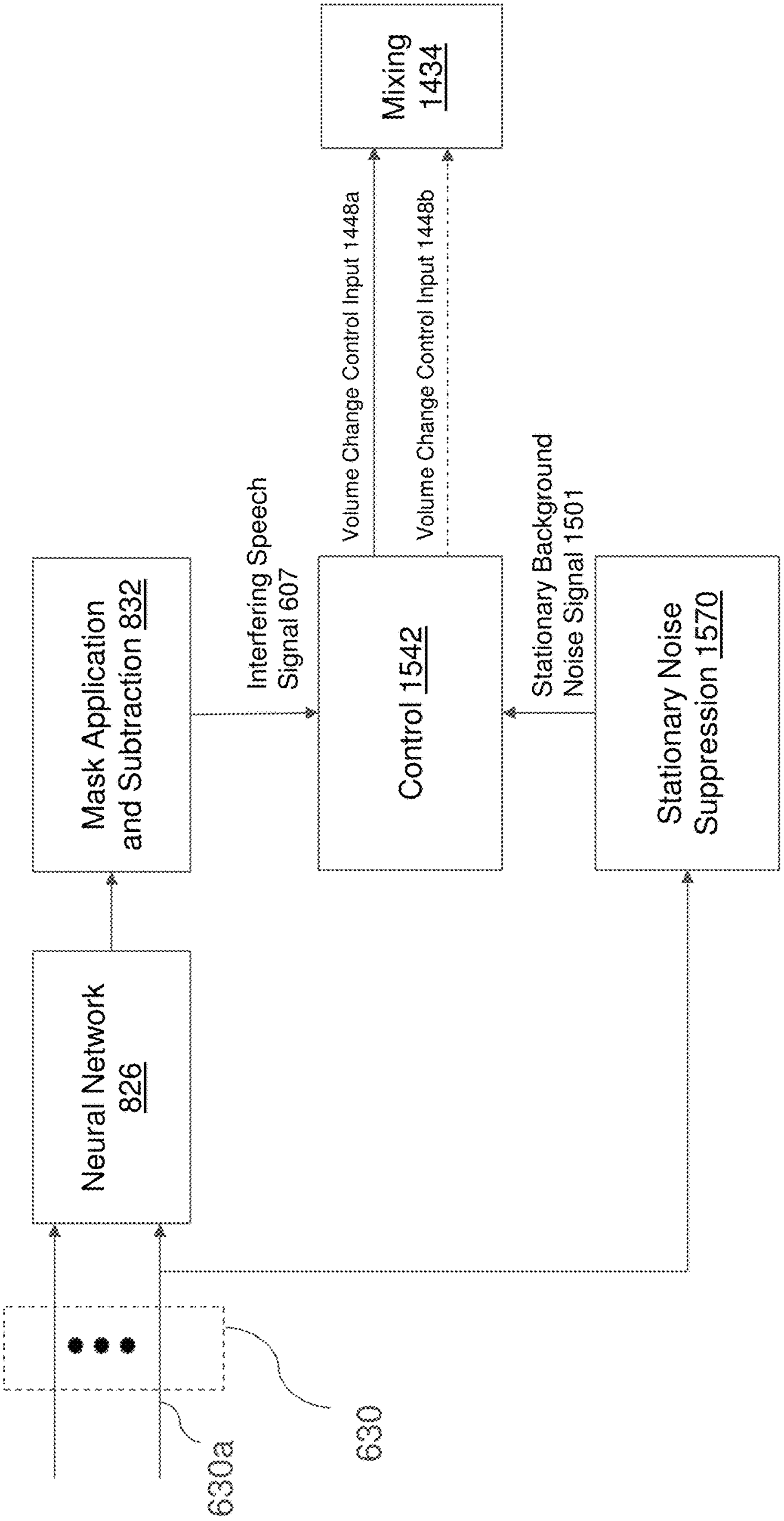
FIG. 15 illustrates circuitry in an ear-worn device, in accordance with certain embodiments described herein.

In some embodiments, the amount of volume change for the background noise signal 601 may be based on the level of the background noise in the audio signal 603*a*. In some embodiments, the level of the background noise may be measured on a background noise component as determined using stationary noise suppression (SNS) circuitry. FIG. 15 illustrates circuitry in an ear-worn device, in accordance with certain embodiments described herein. The circuitry includes the neural network circuitry 826, the mask application and subtraction circuitry 832, the mixing circuitry 1434, control circuitry 1542 (which may be the same as the control circuitry 1442), and SNS circuitry 1570. The ear-worn device may be any of the ear-worn devices described herein (e.g., the hearing aid 100, the eyeglasses 300, the ear-worn device 400, and/or the ear-worn device 500). In some embodiments, the one or more neural network layers implemented by the neural network circuitry 826 may be particularly effective in reducing non-stationary noise, and separate stationary noise suppression may be implemented. Thus, the SNS circuitry 1570 may be configured to receive the audio signal 630*a* and generate the stationary background noise signal 1501, namely an estimate of the stationary background noise component of the audio signal 630*a*. The stationary background noise signal 1501 may be slow-moving. Qualitatively, the stationary background noise signal 1501 may generally not change substantially over the timescale of a few seconds. Quantitatively, the stationary background noise signal 1501 may be asymmetric in that it may be permitted to get smaller over a relatively fast timescale but may be permitted to get larger only over a very long timescale (~10 seconds). In some embodiments, the SNS circuitry 1570 may be configured to implement a minimum statistics noise estimation algorithm to generate the stationary background noise signal 1501. In some embodiments, the SNS circuitry 1570 may be further configured to implement other algorithms, in addition to or instead of the minimum statistics noise estimation algorithm, to generate the stationary background noise signal 1501. These algorithms may include, among non-limiting examples, spectral subtraction, Wiener filtering, and Ephraim-Malah techniques. Further description of such algorithms may be found in Chung, King. "Challenges and recent developments in hearing aids: Part I. Speech understanding in noise, microphone technologies and noise reduction algorithms." Trends in Amplification 8.3 (2004): 83-124, which is incorporated by reference herein in its entirety.

The control circuitry 1542 may be configured to receive the stationary background noise signal 1501 (as generated using the SNS circuitry 1570) and generate the first volume change control input 1448*a* based on the level of the stationary background noise signal 1501. As described above, in some embodiments, the mixing circuitry 1434 may be configured to mix the background noise signal 601 (generated using the neural network circuitry 826) with one or more other signals to generate the output audio signal 840. In embodiments such as that of FIG. 15, the amount of the background noise signal 601 mixed with the other signals may be based on the stationary background noise signal 1501, rather than the background noise signal 601 itself (which may be a counterintuitive approach). These two background noise signals may not necessarily be identical. Performing the mixing based on the level of the background noise signal 1501 may be helpful because the stationary background noise signal 1501 may be a slow-moving estimate of the noise, and a slow-moving estimate of the noise may help to reduce sudden jumps in the mixing coefficient. In some embodiments, the control circuitry 1542 may be configured to perform additional smoothing on the stationary background noise signal 1501 prior to generating the first volume change control input 1448*a* based on the stationary background noise signal 1501. However, in some embodiments, the stationary background noise signal 1501 may be sufficiently slow-moving such that no additional smoothing may need to be performed. In some embodiments, the control circuitry 1542 may be configured to convert the units of the stationary background noise signal 1501 to different units (e.g., from linear units to logarithmic units). However, in some embodiments, no unit conversion may be performed.

As further illustrated in FIG. 15, the control circuitry 1542 may be configured to receive the interfering speech signal 607 and generate the second volume change control input 1448*a* based on the level of the interfering speech signal 607.

Figure 16:
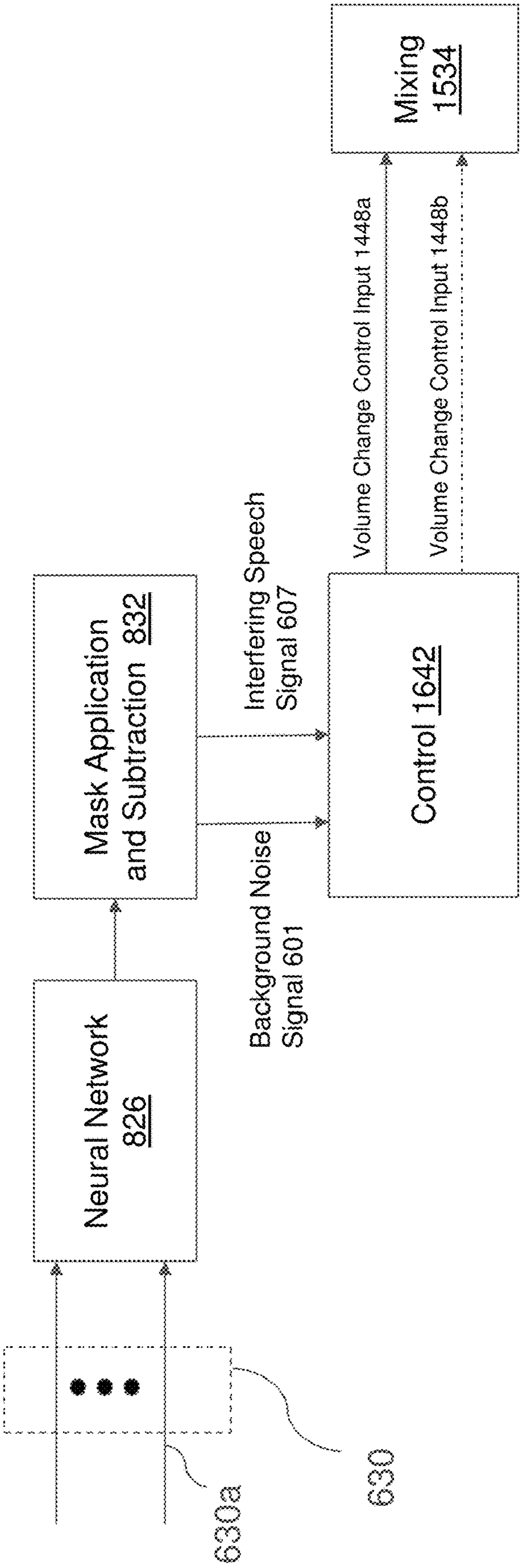
FIG. 16 illustrates circuitry in an ear-worn device, in accordance with certain embodiments described herein.

FIG. 16 illustrates circuitry in an ear-worn device, in accordance with certain embodiments described herein. The circuitry includes the neural network circuitry 826, the mask application and subtraction circuitry 832, the mixing circuitry 1434, and control circuitry 1642 (which may be an example of the control circuitry 1442). The ear-worn device may be any of the ear-worn devices described herein (e.g., the hearing aid 100, the eyeglasses 300, the ear-worn device 400, and/or the ear-worn device 500). The control circuitry 1670 may be configured to receive the background noise signal 601 (as generated using the neural network circuitry 826) and generate the first volume change control input 1448*a* based on the level of the background noise signal 601. In some embodiments, the control circuitry 1642 may be configured to perform additional smoothing on the background noise signal 601 prior to generating the first volume change control input 1448*a* based on the background noise signal 601. However, in some embodiments, the background noise signal 601 may be sufficiently slow-moving such that no additional smoothing may need to be performed. In some embodiments, the control circuitry 1642 may be configured to convert the units of the background noise signal 601 to different units (e.g., from linear units to logarithmic units). However, in some embodiments, no unit conversion may be performed. As further illustrated in FIG. 16, the control circuitry 1670 may be configured to receive the interfering speech signal 607 and generate the second volume change control input 1448*a* based on the level of the interfering speech signal 607.

Generally, then, control circuitry (e.g., the control circuitry 1542 and/or the control circuitry 1642) may be configured to generate the first volume change control input 1448*a* based on a level of background noise in the audio signal 630*a* and generate the second volume change control input 1448*b* based on a level of interfering speech in the audio signal 630*a*.

In some embodiments, the control circuitry 1542 and/or 1642 may be configured to determine different volume change control inputs for different frequency bands based on the different levels of the background noise and/or interfering speech in the different frequency bands, and the mixing circuitry may be configured to use the different volume change control inputs for mixing together the different frequency bands. However, in some embodiments, the control circuitry 1542 and/or 1642 may be configured to determine one volume change control input based on one level for the background noise and/or interfering speech (e.g., averaged across all frequencies), and the one volume change control input may be used for mixing together all frequencies.

In some embodiments, as the level of background noise increases, the amount of background noise mixed back into the output signal may decrease. However, in some embodiments, once the level of background noise increases beyond a certain threshold, the amount of background noise mixed back in may increase again. In some embodiments, as the level of interfering speech increases, the amount of interfering speech mixed back into the output signal may decrease. However, in some embodiments, once the level of interfering speech increases beyond a certain threshold, the amount of interfering speech mixed back in may increase again.

Figure 17:
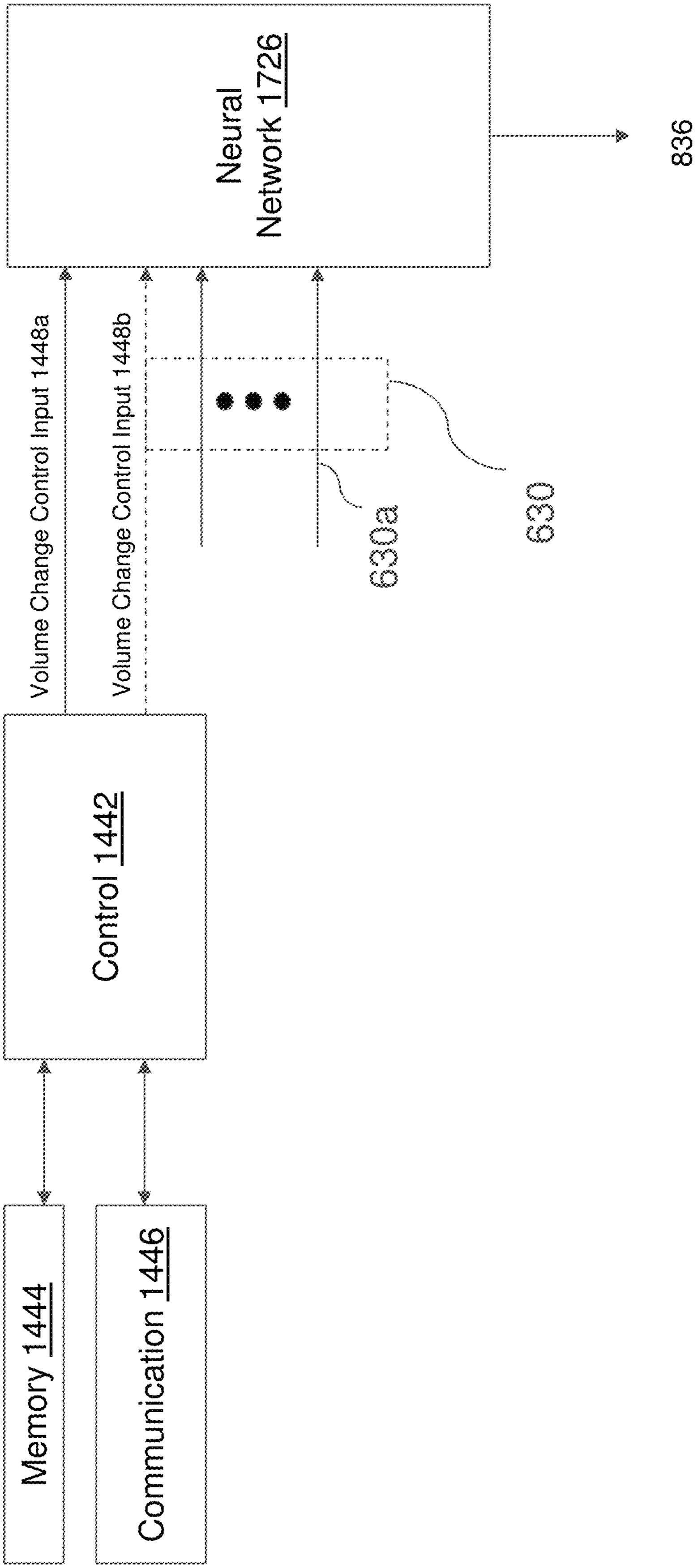
FIG. 17 illustrates circuitry in an ear-worn device, in accordance with certain embodiments described herein.

FIG. 17 illustrates circuitry in an ear-worn device, in accordance with certain embodiments described herein. The circuitry includes neural network circuitry 1726 (which may be the same as the neural network circuitry 526, 826, 926, 1026, and/or 1126), the control circuitry 1442, the memory 1444, and the communication circuitry 1446. The ear-worn device may be any of the ear-worn devices described herein (e.g., the hearing aid 100, the eyeglasses 300, the ear-worn device 400, and/or the ear-worn device 500). As illustrated, the control circuitry 1442 may be configured to output the first volume change control input 1448*a* and the second volume change control input 1448*b* to the neural network circuitry 1726. The neural network circuitry 1726 may be configured to receive the first volume change control input 1448*a* and the second volume change control input 1448*b* and use the first volume change control input 1448*a* and the second volume change control input 1448*b* to generate the neural network output(s) 836 such that the first volume change difference amount is controlled, at least in part, by the first volume change control input 1448*a* and the second volume change difference amount is controlled, at least in part, by the second volume change control input 1448*b*. In some embodiments, the neural network output 836 may be the output audio signal 840, such that the first volume change difference amount and the second volume change difference amount are controlled by the first volume change control input 1448*a* and the second volume change control input 1448*b*, respectively. In some embodiments, the neural network output 836 may be an output (e.g., a mask) configured to generate (e.g., by application to the audio signal 630*a*) the output audio signal 840, such that the first volume change difference amount and the second volume change difference amount are controlled by the first volume change control input 1448*a* and the second volume change control input 1448*b*, respectively. Generally, the one or more neural network layers implemented by the neural network circuitry 1726 may be trained to perform the weighted combination of the target speech signal 605, the interfering speech signal 607, and the background noise signal 601. In such embodiments, either or both of processing circuitry (e.g., the mask application and subtraction circuitry 832) and mixing circuitry (e.g., the mixing circuitry 834 and/or 1434) may be absent. For training, each set of training data may have training input data including the multiple audio signals 630 plus the first volume change control input 1448*a* and the second volume change control input 1448*b*, and training output data including an output audio signal 840 in which the first volume change difference amount and the second volume change difference amount are as indicated by the first volume change control input 1448*a* and the second volume change control input 1448*b*, or a mask configured to generate such an output audio signal 840.

Spatial Focusing Patterns

Figure 18:
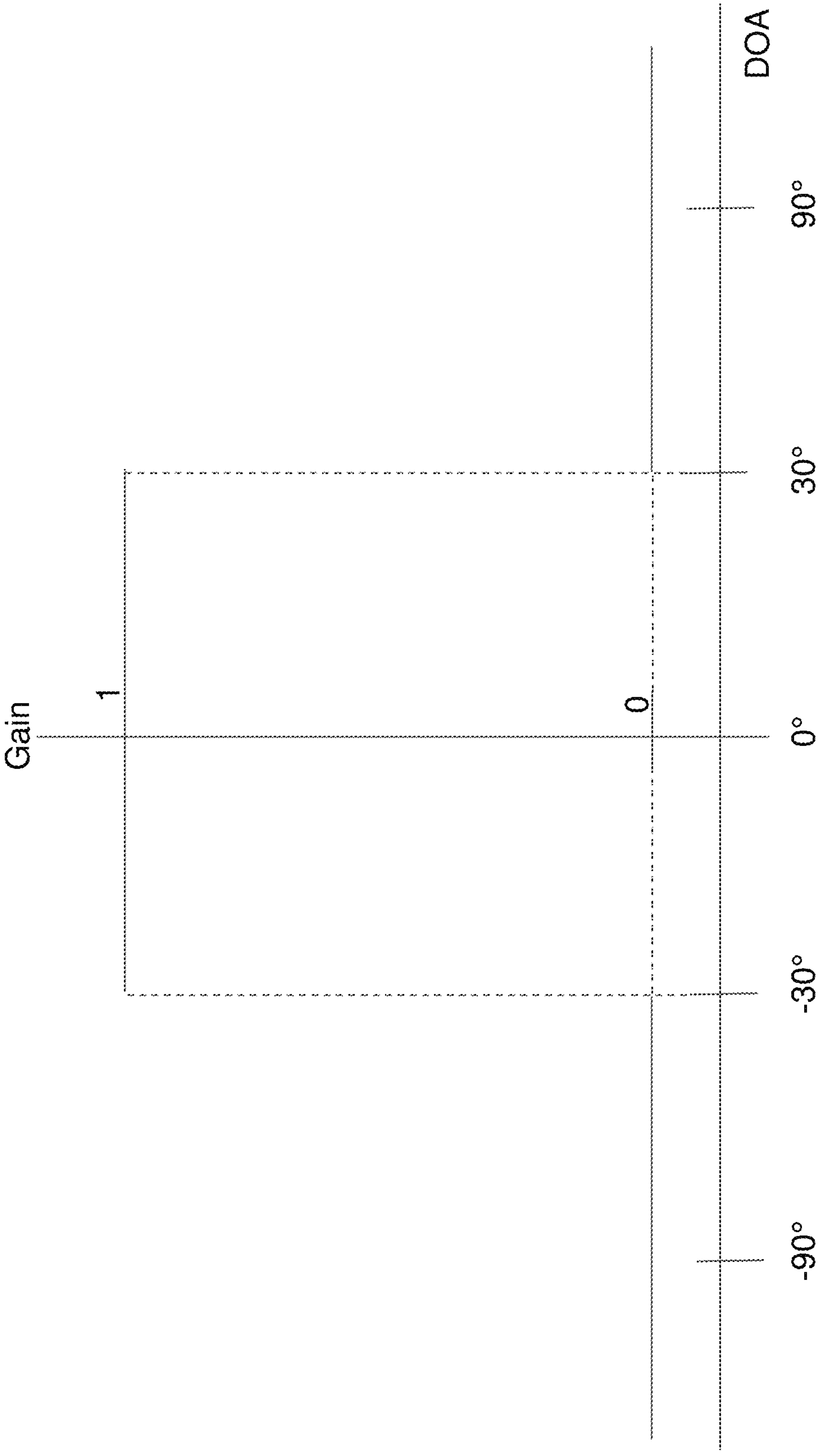
FIG. 18 illustrates an example spatial focusing pattern, in accordance with certain embodiments described herein.

As described above, a target speech signal 605 may have a spatial focusing pattern. In other words, the target speech signal 607 may be equivalent to the speech signal 603 to which has been applied a particular spatial focusing pattern. Generally, an output audio signal 840 may include a spatially-focused signal having a spatial focusing pattern. For example, the output audio signal 840 may include the target speech signal 605, or include the audio signal 630*a* to which has been applied a particular spatial focusing pattern. FIG. 18 illustrates an example spatial focusing pattern, in accordance with certain embodiments described herein. FIG. 18 illustrates weight as a function of DOA. (This description will use the convention of defining 0 degrees as in front of the wearer of the ear-worn device, 0 to 90 degrees as to the left of the wearer, 0 to −90 degrees as to the right of the wearer, and 90 degrees to −90 degrees as in back of the wearer). As illustrated, a weight of 1 is applied to sounds at DOAs from −30 degrees to 30 degrees, and a weight of 0 is applied to other DOAs. Thus, sounds originating from 60 degrees in front of the wearer will be retained, while other sounds will not. The spatial focusing pattern of FIG. 18 includes a sharp transition spatially from DOAs using a weight 1 to DOAs using a weight 0. Thus, even a small movement of the wearer's head may cause a sound source to transition from being within the spatial region using a weight of 1 to being within the spatial region using a weight of 0, leading to a sharp nulling out of the sound.

Figure 19:
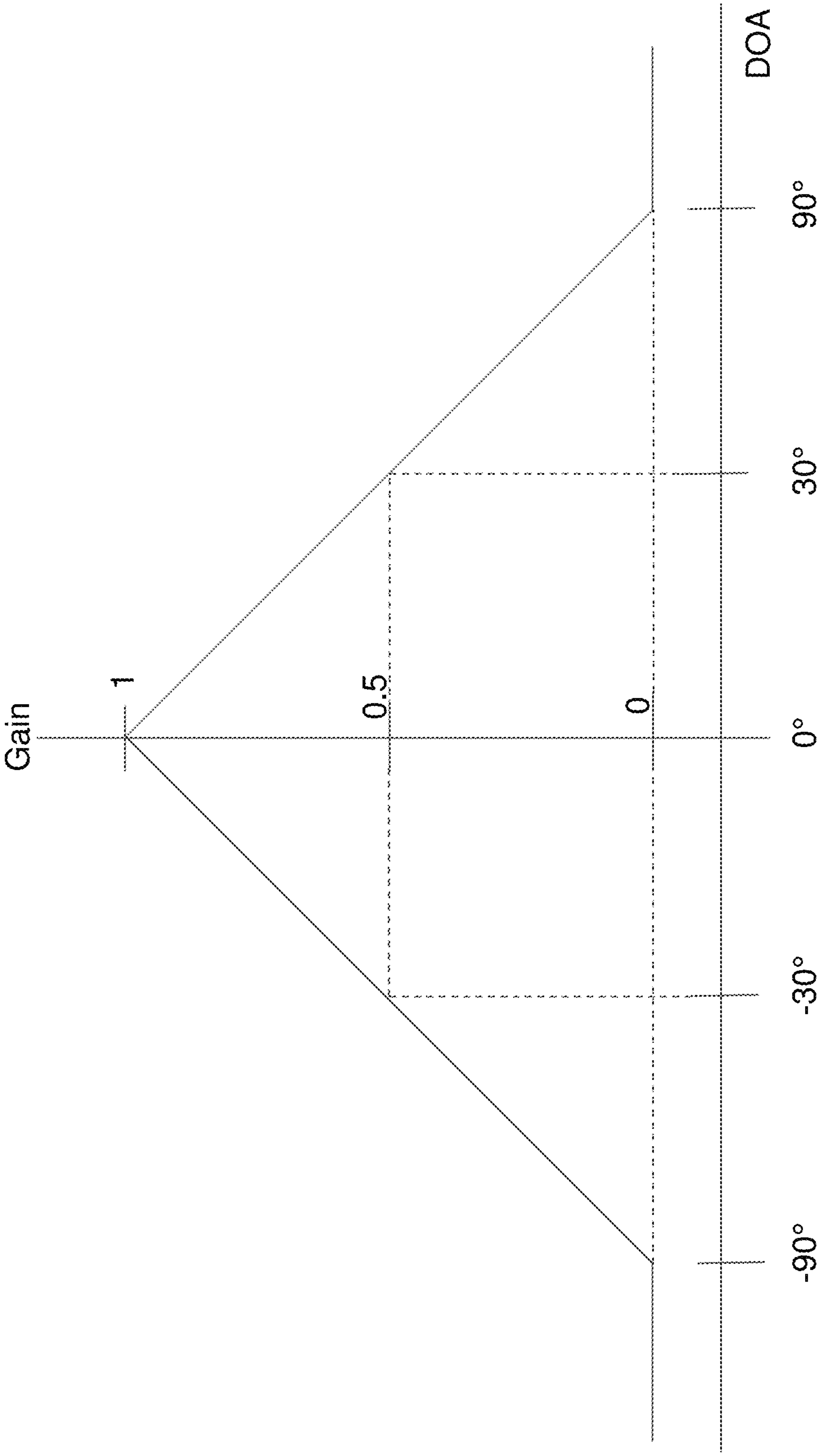
FIG. 19 illustrates an example spatial focusing pattern, in accordance with certain embodiments described herein.

In some embodiments, weight may smoothly transition, or transition approximately smoothly, as a function of DOA. FIG. 19 illustrates an example spatial focusing pattern, in accordance with certain embodiments described herein. FIG. 19 illustrates weight as a function of DOA. As illustrated, the weight transitions smoothly or approximately smoothly from a weight of 1 at a DOA of 0 degrees (i.e., directly in front of the wearer), to a weight of 0.5 at a DOA of 30 degrees and −30 degrees, and to a weight of 0 at DOAs of 90 degrees and −90 degrees and beyond. Thus, the entire back of the wearer may be nulled out. A function such as the one illustrated in FIG. 19 may be realized by inputting a given DOA into a formula. For example, the formula may be $\text{weight}=(-1/90)*\text{DOA}+1$ when $0 \le \text{DOA} \le 90$ degrees and $\text{weight}=(1/90)*\text{DOA}+1$ when $-90 \le \text{DOA} < 0$ degrees. In some embodiments, multiple DOA bins (which may also be considered spatial regions) may be defined and each associated with a weight. For example, each bin may encompass 1 degree, such as a bin for DOAs between 0 and 1 degrees, a bin for DOAs between 1-2 degrees, etc. For a given DOA, the weight associated with the bin encompassing that DOA may be determined (e.g., from a lookup table).

Figure 20:
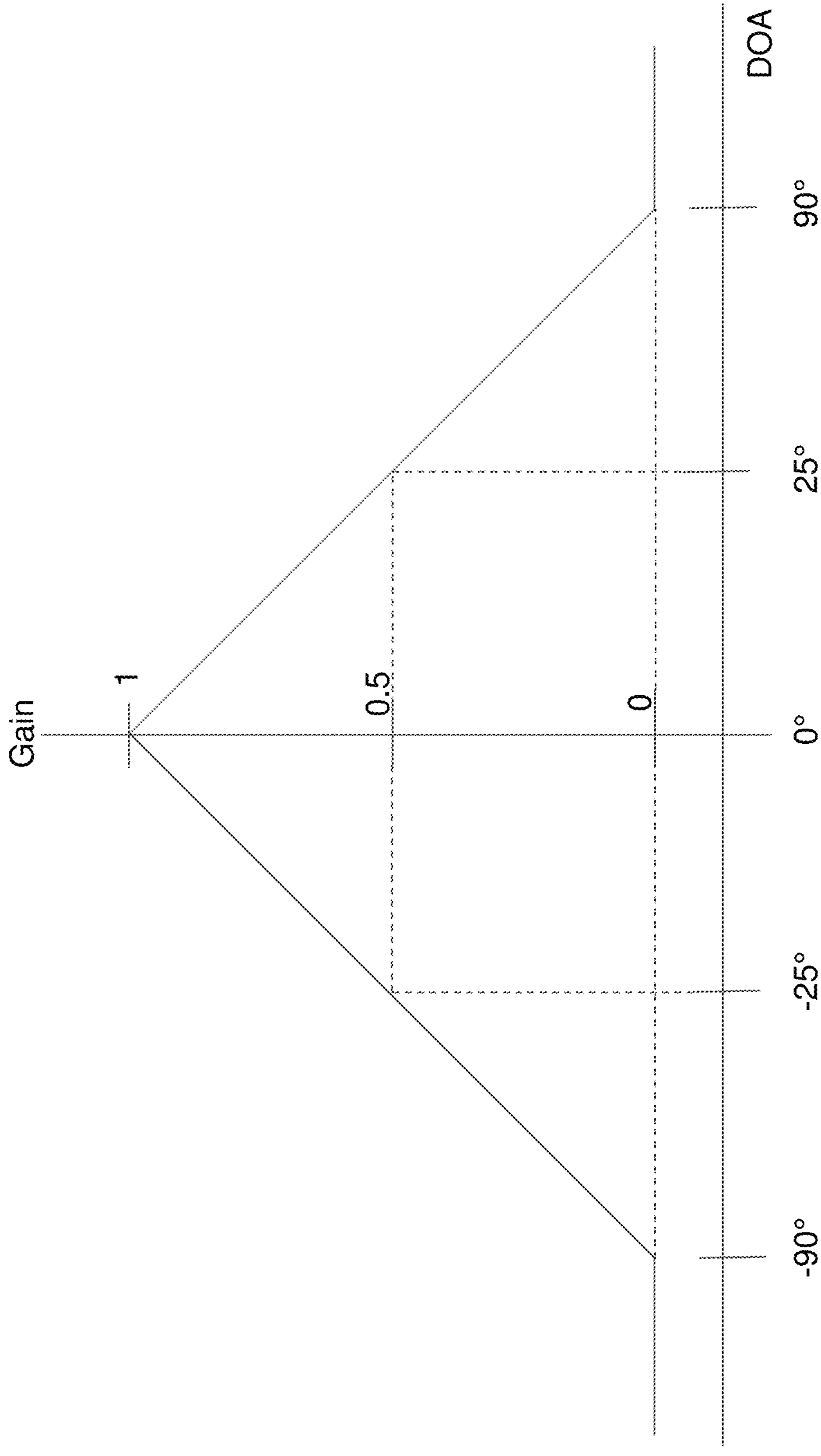
FIG. 20 illustrates an example spatial focusing pattern, in accordance with certain embodiments described herein.

FIG. 20 illustrates an example spatial focusing pattern, in accordance with certain embodiments described herein. FIG. 20 is the same as FIG. 19, except the weight decreases from 1 to 0.5 as DOA goes from 0 to 25 degrees and from 0 to −25 degrees.

Generally, a spatial focusing pattern may include any variation of weight with DOA (where DOA may be defined relative to the wearer). In some embodiments, a spatial focusing pattern may use weights equal to 0, equal to 1, or between 0 and 1. In some embodiments, a spatial focusing pattern may use weights equal to or greater than 0. In some embodiments, weights may be greater than 0, less than 0, equal to zero, or complex numbers; a negative weight may flip phase by 180 degrees, while a complex weight may rotate the phase by some angle. As described above with reference to FIGS. 18-20, some spatial focusing patterns may have weights that are greater than 0 within a certain spatial region in front of the wearer, and have weights that are 0 at other DOAs. One manner of comparing spatial patterns may be to determine the size of the spatial region using weights greater than a threshold weight, such as 0.5. This spatial region may be considered the target spatial region, or the spatial region that is within focus. Then, FIG. 19 may be considered to illustrate a spatial focusing pattern that focuses 60 degrees in front of the wearer while FIG. 20 may be considered to illustrate a spatial focusing pattern that focuses 50 degrees in front of the wearer, and FIG. 20 may be considered to illustrate a larger amount of spatial focusing than FIG. 19. However, it should be appreciated that other types of spatial focusing patterns, besides those illustrated in FIGS. 18-20, may also be used, and these spatial focusing patterns may include any variation of weight with DOA.

The result of applying a spatial focusing pattern to an audio signal may be equivalent to each component of the audio signal multiplied by a weight associated with the DOA from which the component originated, in accordance with the spatial focusing pattern (examples of which are illustrated in FIGS. 18-20). Thus, the resulting audio signal may be the original audio signal to which has been applied the spatial focusing pattern. For example, the target speech signal 605 may be the speech signal 603 of the audio signal **603*a* to which has been applied a spatial focusing pattern. In embodiments that include focusing on multiple DOAs, multiple different functions like the one in FIGS. 18-20** may be generated, and the sum or the union of the functions may be used.

It should be appreciated that target spatial regions having sizes relative to the wearer other than 60 degrees (e.g., as in FIG. 19) or 50 degrees (e.g., as in FIG. 20) may also be used. In some embodiments, the target spatial region may have a size approximately equal to or between 10-180 degrees. In some embodiments, the target spatial region may have a size approximately equal to or between 20-180 degrees. In some embodiments, the target spatial region may have a size approximately equal to or between 30-180 degrees. In some embodiments, the target spatial region may have a size approximately equal to or between 40-180 degrees. In some embodiments, the target spatial region may have a size approximately equal to or between 50-180 degrees. In some embodiments, the target spatial region may have a size approximately equal to or between 60-180 degrees. In some embodiments, the target spatial region may have a size approximately equal to or between 10-150 degrees. In some embodiments, the target spatial region may have a size approximately equal to or between 20-150 degrees. In some embodiments, the target spatial region may have a size approximately equal to or between 30-150 degrees. In some embodiments, the target spatial region may have a size approximately equal to or between 40-150 degrees. In some embodiments, the target spatial region may have a size approximately equal to or between 50-150 degrees. In some embodiments, the target spatial region may have a size approximately equal to or between 60-150 degrees. In some embodiments, the target spatial region may have a size approximately equal to or between 10-120 degrees. In some embodiments, the target spatial region may have a size approximately equal to or between 20-120 degrees. In some embodiments, the target spatial region may have a size approximately equal to or between 30-120 degrees. In some embodiments, the target spatial region may have a size approximately equal to or between 40-120 degrees. In some embodiments, the target spatial region may have a size approximately equal to or between 50-120 degrees. In some embodiments, the target spatial region may have a size approximately equal to or between 60-120 degrees. In some embodiments, the target spatial region may have a size approximately equal to or between 10-90 degrees. In some embodiments, the target spatial region may have a size approximately equal to or between 20-90 degrees. In some embodiments, the target spatial region may have a size approximately equal to or between 30-90 degrees. In some embodiments, the target spatial region may have a size approximately equal to or between 40-90 degrees. In some embodiments, the target spatial region may have a size approximately equal to or between 50-90 degrees. In some embodiments, the target spatial region may have a size approximately equal to or between 60-90 degrees. For example, the size may be equal to or approximately equal to 10, 20, 30, 40, 50, 60, 70, 80, 90, 100, 110, 120, 130, 140, 150, 160, 170, or 180 degrees, or any other suitable angle.

In some embodiments, spatial focusing patterns may be predetermined. In other words, the bounds of the various spatial regions and the weight associated with each spatial region may be determined at training time. The spatial focusing patterns of FIGS. 18-20 may be examples of predetermined spatial focusing patterns. In some embodiments, spatial focusing patterns may not be predetermined. In other words, the bounds of the various spatial regions and/or the weight associated with each spatial region may be determined after training time (e.g., at inference time). Further description of such spatial focusing may be found below.

Sound Maps

Referring to FIG. 8, in some embodiments the neural network output 836 generated by the one or more neural network layers implemented by the neural network circuitry 826 may be a sound map, or an output (e.g., a mask) configured to generate a sound map. When the neural network output 836 is a mask configured to generate a sound map, the mask application and subtraction circuitry 832 may be configured to apply the mask to one of the multiple audio signals 630 (e.g., by multiplication or addition), thereby generating the sound map.

In more detail, if multiple frequency bins are defined, and multiple DOA bins are defined, the sound map may indicate a value for each frequency bin originating from each DOA bin. For example, if the number of frequency bins is n and the number of DOA bins is m, then the sound map may be an n×m array. When one or more neural network layers are also trained to perform noise modification, the sound map may be a speech map indicating the frequency components of speech originating from each spatial region.

Each DOA bin may encompass, for example, a certain range of degrees relative to the wearer. In embodiments in which there are two microphones with symmetry about the axis connecting the two microphones (e.g., the front microphone 102*f* and the back microphone 102*b* illustrated in FIG. 1), the ear-worn device may not be able to distinguish between sounds coming from the left of the wearer or from the right of the wearer. In such embodiments, one spatial region may be defined combining symmetrical regions on the left and right of the wearer. For example, one spatial region may be defined for both the region 20-25 degrees to the left of the wearer and the region 20-25 degree to the right of the wearer. In embodiments in which there are microphones without symmetry about the axis connecting the microphones, then the ear-worn device may be able to distinguish between sounds coming from the left of the wearer and sounds coming from the right of the wearer. In such embodiments, separate regions may be defined for symmetrical regions on the left and right of the wearer. Examples of ear-worn devices that lack symmetry about the axis connecting the microphones may be eyeglasses with built-in hearing aids (e.g., the eyeglasses 300 with the microphones 302). In embodiments in which there is binaural communication, then the ear-worn device or system of ear-worn devices may be able to distinguish between sounds coming from the left of the wearer and sounds coming from the right of the wearer. For example, a device on the left ear of the wearer may detect a sound coming from the left of the wearer before a device on the right ear of the wearer, and this earlier detection may be communicated between the two ears to determine that the sound came from the left of the wearer. Binaural communication may occur, for example, in a system of two hearing aids, cochlear implants, or earphones that communicate with each other over a wireless communication link. Binaural communication may also occur in an ear-worn device such as eyeglasses with built-in hearing aids, in which a device in a portion of the eyeglasses near one ear may communicate with a device in a portion of the eyeglasses near the other ear over a wired communication link within the eyeglasses.

In some embodiments, using the sound map, the mask application and subtraction circuitry 832 may be configured to apply a beam pattern to the sound map. The result of applying the beam pattern may be a spatially-focused audio signal, and thus the sound map may be used for generating a spatially-focused audio signal. To apply a beam pattern, the mask application and subtraction circuitry 832 may be configured to apply different weights to sounds originating from the different DOAs (as indicated by the sound map). These weights need not be predetermined.

In some embodiments that include an ear-worn device with an array of more than two microphones (e.g., on eyeglasses such as the eyeglasses 300), beamforming circuitry may be configured to generate, at each time step, multiple beams (e.g., between or equal to 10-20 beams), each of which points at a different angle around the 360-degree circle relative to the wearer. The mask application and subtraction circuitry 832 or the neural network circuitry 826 may be configured to calculate values for a metric from audio from the multiple beams. Thus, each beam may have a different value for the metric. As examples, the metric may be signal-to-noise ratio (SNR) or speaker power. The mask application and subtraction circuitry 832 may be configured to combine the audio from the multiple beams using the values for the metric. For example, when the metric is SNR, the mask application and subtraction circuitry 832 may be configured to output the sum of the audio from each beam weighted by each beam's SNR. In particular, low-SNR beams may be down-weighted and high-SNR beams may be up-weighted. Thus, focus may be placed on those beams having the highest SNR audio.

As another example, the metric may be related to voice personalization. Further description of voice personalization may be found in U.S. Pat. No. 11,818,523, entitled "System and Method for Enhancing Speech of Target Speaker from Audio Signal in an Ear-Worn Device Using Voice Signatures," issued Nov. 14, 2023, which is incorporated by reference herein in its entirety. For example, the metric may indicate whether a particular speaker's voice is present in a particular beam or not. The mask application and subtraction circuitry 832 may be configured to combine audio from the multiple beams using the values for metric. In some embodiments, the output may be a slow-moving average (e.g., an exponential moving average) of audio from beams in which the particular speaker's voice has been present. Thus, the output may include audio from the beam that currently has the speaker's voice as well as sound from directions that do not currently have the particular speaker's voice, but did have the speaker's voice recently, weighted according to the averaging function.

The result may therefore be a spatially-focused audio signal, and thus the values calculated for the metric may be used for generating a spatially-focused audio signal. In some embodiments, before summing the beams, the processing circuitry may be configured to apply a moving average across the audio from the different beams.

Control of Spatial Focusing

As described above, one signal may be equivalent to another signal to which has been applied a spatial focusing pattern. For example, the target speech signal 605 may be equivalent to the speech signal 603 to which has been applied a spatial focusing pattern. As another example, the output audio signal 840 may include the target speech signal 605. As another example, the output audio signal 840 may include the audio signal 630*a* to which has been applied a spatial focusing pattern. In some embodiments, the spatial focusing pattern used by one or more neural network layers (i.e., in performing spatially focusing, by outputting signals having spatial focusing patterns or outputs configured to generate signals having spatial focusing patterns) may be controlled through inputs to neural network circuitry (e.g., any of the neural network circuitry 826 described herein). In some embodiments, the spatial focusing pattern may be controlled through inputs to processing circuitry (e.g., any of the mask application and subtraction circuitry 832 described herein). In some embodiments, the spatial focusing pattern may be controlled through inputs to mixing circuitry (e.g., the mixing circuitry 834 and/or 1434 described herein). Furthermore, as will be described below, in some embodiments, a user may control the spatial focusing pattern.

Figure 21:
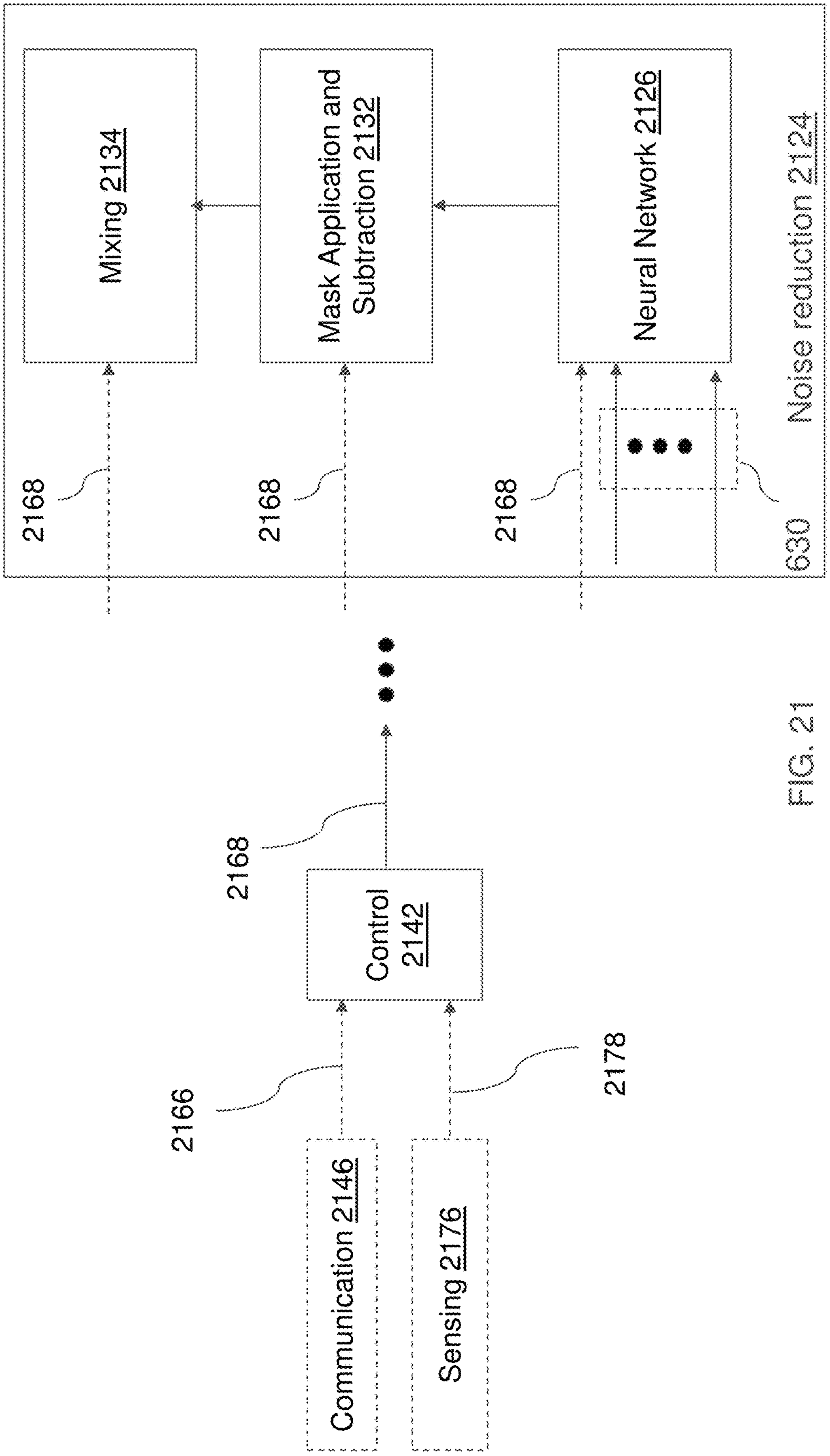
FIG. 21 illustrates circuitry for controlling spatial focusing in an ear-worn device, in accordance with certain embodiments described herein.

FIG. 21 illustrates circuitry for controlling spatial focusing in an ear-worn device, in accordance with certain embodiments described herein. FIG. 21 illustrates either or both of communication circuitry 2146 (which may be the same as the communication circuitry 1446) and sensing circuitry 2176 coupled to control circuitry (which may be the same as the control circuitry 1442, 1542, and/or 1642). FIG. 21 further illustrates noise reduction circuitry 2124 (which may be the same as any of the noise reduction circuitry described herein, such as the noise reduction circuitry 524 and/or 824) including neural network circuitry 2126, processing circuitry 2132, and mixing circuitry 2132. The ear-worn device may be any of the ear-worn devices described herein (e.g., the hearing aid 100, the eyeglasses 300, the ear-worn device 400, and/or the ear-worn device 500).

The communication circuitry 2146 may be configured to communicate with other devices, such as processing devices (e.g., smartphones or tablets, such as the processing device 418) over wireless communication links (e.g., the wireless communication link 420). For example, the wireless communication link may be Bluetooth or NFMI. In some embodiments, a user may use the processing device to select a spatial focusing pattern (e.g., the particular spatial focusing pattern that the target speech signal 605 has), or otherwise make a selection related to spatial focusing. The communication circuitry 2146 in the ear-worn device may be configured to receive, from the processing device, an indication of the user selection of the spatial focusing pattern, and generate one or more inputs 2166 based on the indication of the user selection of the spatial focusing pattern.

The control circuitry 2142 may be configured, based at least in part on the indication of the user selection of the spatial focusing pattern, and in particular, based at least in part on the one or more inputs 2166 received from the communication circuitry 2146, to generate one or more spatial focusing control inputs 2168 indicating the spatial focusing pattern. The one or more spatial focusing control inputs 2168 may indicate the spatial focusing pattern (i.e., selected by the user). The one or more spatial focusing control inputs 2168 may be inputs to one or more of the neural network circuitry 2126 (which may be the same as any of the neural network circuitry described herein, such as the neural network circuitry 526, 826, 926, 1026, and/or 1126), the processing circuitry 2132 (which may be the same as any of the processing circuitry described herein, such as the mask application and subtraction circuitry 832), and the mixing circuitry 2134 (which may be any of the mixing circuitry described herein, such as the mixing circuitry 834 and/or 1434). The one or more spatial focusing control inputs 2168 may control spatial focusing through control of the neural network circuitry 2126, the processing circuitry 2132, and/or the mixing circuitry 2134, as described further below.

In embodiments in which the one or more spatial focusing control inputs 2168 from the control circuitry 2142 are input to the neural network circuitry 2126, the one or more spatial focusing control inputs 2168 may be in addition to the multiple audio signals 630 that are inputted to the neural network circuitry 2126. The one or more spatial focusing control inputs 2168 may indicate the spatial focusing pattern (e.g., as selected by the user). The one or more neural network layers implemented by the neural network circuitry 2126 may be trained such that the one or more spatial focusing control inputs 2168 affect the pattern used for the spatial focusing performed by the one or more neural network layers. In other words, the neural network circuitry 2126 may be configured to implement one or more neural network layers trained to generate, based on the multiple input audio signals 2134, an output audio signal (e.g., the target speech signal 605) having the spatial focusing pattern indicated by the one or more spatial focusing control inputs 2168, or an output (e.g., a mask) configured to generate an output audio signal (e.g., the target speech signal 605) having the spatial focusing pattern indicated by the one or more spatial focusing control inputs 2168. For example, referring back to FIG. 8, the target speech signal 605 may be equivalent to the speech signal 603 to which has been applied a particular spatial focusing pattern. The neural network circuitry 2126 may be configured to receive one or more spatial focusing control inputs 2168 indicating the particular spatial focusing pattern, and use the one or more spatial focusing control inputs 2168 to generate the neural network output(s) 836 such that the target speech signal 605 is equivalent to the speech signal 603 to which has been applied the particular spatial focusing pattern.

For training such neural network layers, training may proceed as above, except that the one or more spatial focusing control inputs 2168 corresponding to a spatial focusing pattern may be added to input training data, and the output training data may correspond to that spatial focusing pattern. For example, consider input training data that includes multiple audio signals, plus an input 2168 having a particular value which corresponds to a particular spatial focusing pattern. The output training data may be a mask that, when applied to one of the multiple audio signals, results in that spatial focusing pattern being applied to that audio signal.

It should be appreciated that the one or more neural network layers themselves may receive the one or more spatial focusing control inputs 2168 indicating the spatial focusing pattern, rather than the one or more spatial focusing control inputs 2168 being received by circuitry operating on an output of the one or more neural network layers.

In some embodiments, the one or more neural network layers may also be configured to receive no inputs indicating a spatial focusing pattern, and then the neural network may be configured to apply a default spatial focusing pattern.

In embodiments in which the one or more spatial focusing control inputs 2168 from the control circuitry 2142 are input to the processing circuitry 2132, in some such embodiments the processing circuitry 2132 may be configured to apply a beam pattern to a sound map based on the one or more spatial focusing control inputs 2168.

In embodiments in which the one or more spatial focusing control inputs 2168 from the control circuitry 2142 are input to the mixing circuitry 2134, referring to the target speech signal 605 as TS, the interfering speech signal 607 as IS, and the background noise signal 601 as BN, the output audio signal (not illustrated) from the mixing circuitry 2134 may be equivalent to a*TS+b*IS+c*BN. Using a value for b that is relatively lower may result in more spatial focusing, whereas using a value for b that is relatively higher may result in less spatial focusing. If the mixing circuitry 2134 is configured to mix a spatially-focused version of an audio signal (refer to it as A) together with the audio signal itself (refer to it as B), such that the output is a*A+b*B, using a value for a that is relatively higher than the value for b may result in more spatial focusing, whereas using a value for a that is relatively lower than the value for b may result in less spatial focusing. Thus, based on the one or more spatial focusing control inputs 2168 from the control circuitry 2142, the mixing circuitry 2134 may be configured to modulate weights used for mixing, which may in effect modify weights applied to sounds from different DOAs and thereby control spatial focusing.

In some embodiments, spatial focusing may be turned off. When spatial focusing is turned off, the output signal from the noise reduction circuitry 2124 may be a noise-modified audio signal, and in some cases, a noise-modified beamformed audio signal. Thus, in some embodiments, when spatial focusing is turned off, one portion of the speech signal 603 (i.e., the interfering speech signal 607) may not have a different change in volume than another portion of the speech signal 603 (i.e., the target speech signal 605) based on spatial focusing. There may be multiple methods for turning off spatial focusing. In some embodiments, there may be one or more spatial focusing control inputs 2168 associated with no spatial focusing that, when input to the neural network circuitry 2126, cause the neural network circuitry 2126 not to perform spatial focusing. For example, in some embodiments, the one or more spatial focusing control inputs 2168 may cause the neural network circuitry 2126 not to run one or more neural network layers that are trained to perform spatial focusing (e.g., the second subset 950*b*). As another example, the one or more spatial focusing control inputs 2168 may cause the neural network circuitry 2126 to use a spatial focusing pattern having weight of 1 at every DOA. In some embodiments, the one or more spatial focusing control inputs 2168 may cause the neural network circuitry 2126 to output a mask (e.g., the mask 956*b*) configured to generate the speech signal 603 instead of the target speech signal 605 (e.g., the mask may contain all Is). In some embodiments, the one or more spatial focusing control inputs 2168 associated with no spatial focusing may be input to the processing circuitry 2132 and cause the processing circuitry 2132 not to perform spatial focusing. For example, the processing circuitry 2132 may be configured to output the speech signal 603 rather than the target speech signal 605, or may be configured to replace a mask (e.g., the mask 956*b*) with a different mask configured to generate the speech signal 603. In some embodiments, consider that a sound map includes columns, each corresponding to sounds coming from a different spatial region. The one or more spatial focusing control inputs 2168 may cause the processing circuitry 2132 not to modify the weight of the columns of the sound map, or in other words, apply a weight of 1 to the columns of the sound map. In some embodiments, the one or more spatial focusing control inputs 2168 associated with no spatial focusing may be input to the mixing circuitry 2134 and cause the mixing circuitry 2134 not to perform spatial focusing. For example, the one or more spatial focusing control inputs 2168 may cause the mixing circuitry 2134 to mix the full interfering speech signal 607 back with the target speech signal 605. In other words, referring to the expression a*TS+b*IS+c*BN above, a and b may both be 1. As another example, the mixing circuitry 2134 may weight a spatially-focused signal at 0 and weight a non-spatially-focused signal at 1 when performing the mixing. In other words, referring to the expression a*A+b*B above, a may be 0 and b may be 1. In some embodiments, a user selection may cause spatial focusing to be turned off. In other words, in some embodiments, an ear-worn device (e.g., the hearing aid 100, the eyeglasses 300, the ear-worn device 400, and/or the ear-worn device 500) may be configured to receive a user selection to turn spatial focusing off. Based on receiving the user selection to turn spatial focusing off, the ear-worn device may be configured to turn spatial focusing off, for example, using any of the methods described above. Further description may be found below.

In some embodiments, noise modification performed using the neural network circuitry 2126 may be turned off. In some embodiments, to turn noise modification off, one or more neural network layers that are trained to perform noise modification may not be run.

Graphical User Interfaces

In some embodiments, spatial focusing may be based on user selection. The user may be able to control spatial focusing using a processing device (e.g., a smartphone or tablet, such as the processing device 418) in communication with an ear-worn device (e.g., the hearing aid 100, the eyeglasses 300, the ear-worn device 400, and/or the ear-worn device 500). The communication may be over a wireless communication link (e.g., the wireless communication link 420). Any of the GUIs described herein may be displayed on such a processing device. This user selection may be the one described above; in other words, an indication of the user selection of the spatial focusing pattern may be received by the communication circuitry 2146 of the ear-worn device, as described above. In some embodiments, the user selection may be a selection of one of multiple options for spatial focusing pattern. Thus, in some embodiments, the processing device may be configured to display a graphical user interface (GUI) including options for different spatial focusing patterns, and to receive a user selection of a particular spatial focusing pattern.

Figure 22:
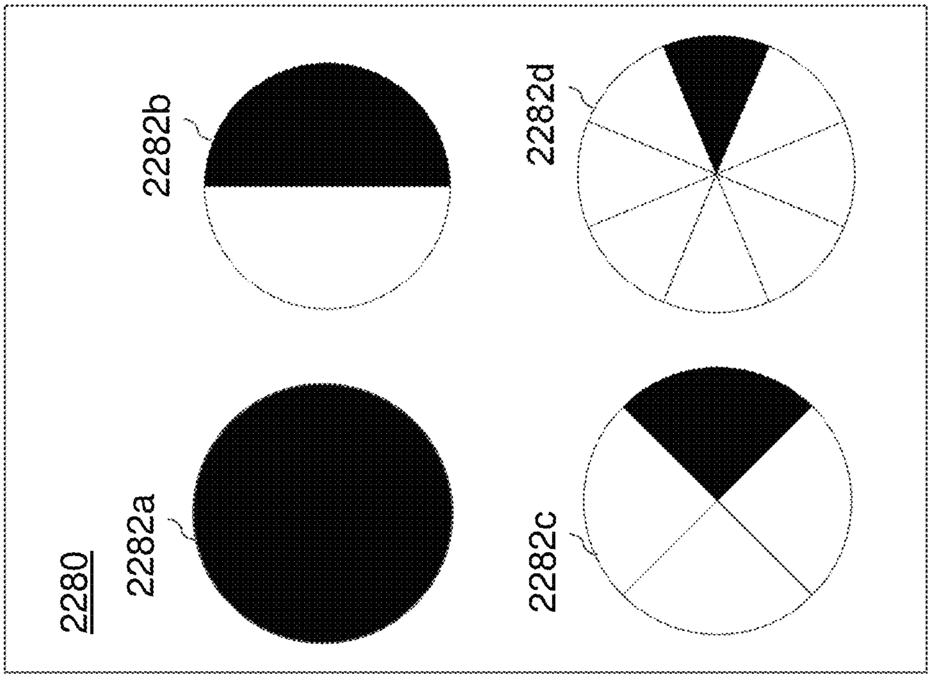
FIG. 22 illustrates a graphical user interface (GUI) for controlling spatial focusing of an ear-worn device, in accordance with certain embodiments described herein.

FIG. 22 illustrates a graphical user interface (GUI) 2280 for controlling spatial focusing of an ear-worn device (e.g., a hearing aid), in accordance with certain embodiments described herein. The GUI 2280 includes four options 2282*a*-2282*d* for spatial focusing patterns. Generally, a GUI may include multiple options for spatial focusing patterns. In the example of FIG. 22, the different spatial focusing patterns have different amounts of spatial focusing. The GUI 2280 displays the options 2282*a*-2282*d* as graphical representations of different spatial focusing patterns. The graphical representations in the example of FIG. 22 each include a circle representing the environment of the wearer and a highlighted area representing where spatial focusing occurs (e.g., the target spatial region). The option 2282*a* corresponds to a spatial focusing pattern that includes no or approximately no spatial focusing. The option 2282*b* corresponds to a spatial focusing pattern that focuses 180 degrees (or approximately 180 degrees) in front of the wearer. The option 2282*c* corresponds to a spatial focusing pattern that focuses 90 degrees (or approximately 90 degrees) in front of the wearer. The option 2282*d* corresponds to a spatial focusing pattern that focuses 45 degrees (or approximately 45 degrees) in front of the wearer. Thus, the option 2282*a* may represent the least amount of spatial focusing and the option 2282*d* may represent the most amount of spatial focusing among the options displayed. The spatial focusing patterns corresponding to the options 2282*a*-2282*d* may be of the form illustrated in FIG. 19, where the pattern is considered to focus on those DOAs having weights greater than or equal to a threshold, such as 0.5. The processing device displaying the GUI 2280 may be configured to receive a selection of one of the options 2282*a*-2282*d*, for example, through a touch-sensitive display screen displaying the options 2282*a*-2282*d*. Based on the user selection from the GUI 2280, the processing device may be configured to transmit an indication of the user selection to the communication circuitry 2146 of an ear-worn device. The communication circuitry 2146 may be configured to generate one or more inputs to the control circuitry 2166 based on the received indication of the user selection, and the control circuitry 2142 may be configured to transmit one or more spatial focusing control inputs 2168 to the neural network circuitry 2126, processing circuitry 2132, and/or mixing circuitry 2134 based on the one or more inputs received from the communication circuitry 2146.

While the above example includes four options for the one or more inputs to the neural network, in some embodiments there may be fewer than four options, and in some embodiments there may be more than four options. In some embodiments, there may be a large number or a continuous range of options for the spatial focusing pattern (e.g., from omni-directional to super-focused). For example, a user may select a spatial focusing pattern from a continuous range of options using a slider on a graphical user interface, where the slider selects the range of DOAs in the front of the wearer that are within focus.

For example, in embodiments in which the one or more spatial focusing control inputs 2168 are input to the neural network circuitry 2126, if the option 2282*a* is selected the one or more spatial focusing control inputs 2168 may be 0, if the option 2282*b* is selected the one or more spatial focusing control inputs 2168 may be 1, if the option 2282*c* is selected the one or more spatial focusing control inputs 2168 may be 2, and if the option 2282*d* is selected the one or more spatial focusing control inputs 2168 may be 3. As another example (i.e., a one-hot scheme), if the option 2282*a* is selected the one or more spatial focusing control inputs 2168 may be [1,0,0,0], if the option 2282*b* is selected the one or more spatial focusing control inputs 2168 may be [0,1,0,0], if the option 2282*c* is selected the one or more spatial focusing control inputs 2168 may be [0,0,1,0], and if the option 2282*d* is selected the one or more spatial focusing control inputs 2168 may be [0,0,0,1].

It should be appreciated that the one or more neural network layers themselves may receive the one or more spatial focusing control inputs 2168 indicating the spatial focusing pattern, rather than the one or more spatial focusing control inputs 2168 being received by circuitry operating on an output of the one or more neural network layers. Thus, for example, the one or more neural network layers may be configured to receive an audio input in the form of a vector of size 128 plus a spatial focusing control input 2168 indicating a spatial focusing pattern using a one-hot scheme with vector of size 4. Thus, the total size of the input received by the one or more neural network layers would be 128+4=132.

For training such neural network layers, training may proceed as above, except that the one or more spatial focusing control inputs 2168 corresponding to a spatial focusing pattern may be added to input training data, and the output training data may correspond to that spatial focusing pattern. For example, consider input training data that includes multiple audio signals formed from one or more sound signals, plus the input [0,0,1,0] which corresponds to the option 2282*c* in FIG. 22. The output training data may be a mask that, when applied to one of the multiple audio signals, results in focusing on those sound signals originating from 90 degrees in front of the wearer and extending to +45 degrees and −45 degrees on either side of the direction that corresponds to the front of the wearer, such that the resulting audio signal has the spatial focusing pattern.

In embodiments in which the one or more spatial focusing control inputs 2168 are input to the processing circuitry 2132, consider that a sound map processed by the processing circuitry 2132 includes 16 spatial regions. The option 2282*d* may be realized by focusing on the front-facing 2 spatial regions of the 16 total spatial regions. The option 2282*c* may be realized by focusing on the front-facing 4 spatial regions of the 16 total spatial regions. The option 2282*b* may be realized by focusing on the front-facing 8 spatial regions of the 16 total spatial regions. The 2282*a* may be realized by focusing on all 16 total spatial regions. Consider that the sound map includes 16 columns, each corresponding to one of 16 spatial regions. Based on the one or more spatial focusing control inputs 2168, the processing circuitry 2132 may be configured to apply a weight of 1 to values in the columns corresponding to the focused spatial regions and apply a weight of 0 out values in the columns corresponding to the other spatial regions (e.g., to realize a spatial focusing pattern as in FIG. 18), or apply weights between or equal to 0.5 and 1 to the columns corresponding to the focused spatial regions and apply weights between or equal to 0.5 and 0 to the columns corresponding to the non-focused spatial regions (e.g., to realize a spatial focusing pattern as in FIG. 19). Generally, the processing circuitry 2132 may be configured to use higher weights for columns corresponding to the focused spatial regions and use lower weights for values in the columns not corresponding to the focused spatial regions.

Figure 23:
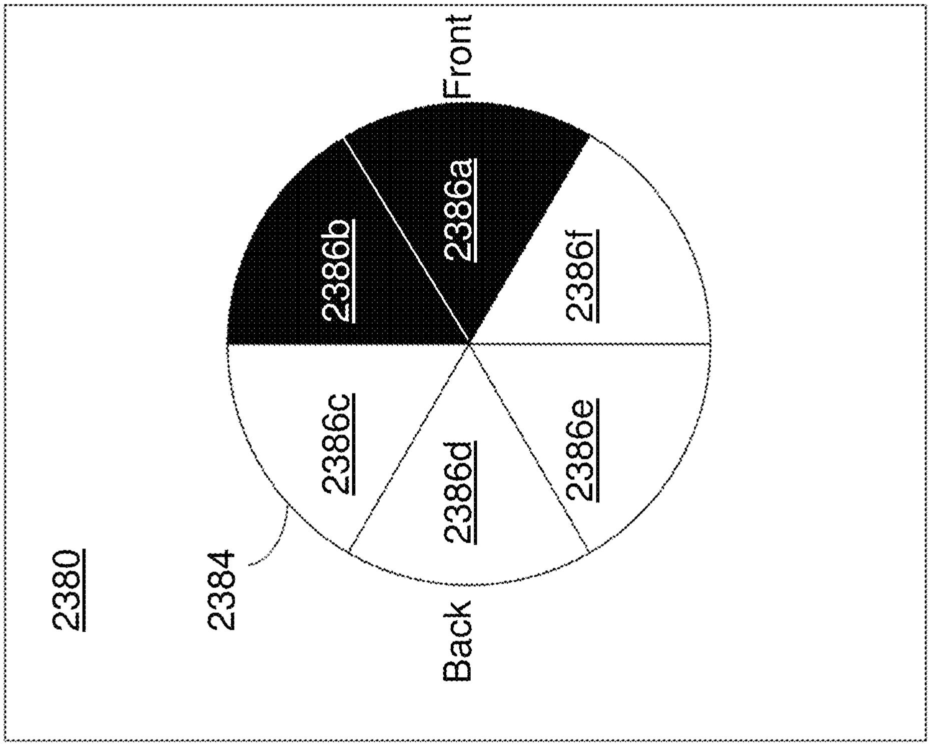
FIG. 23 illustrates a graphical user interface (GUI) for controlling spatial focusing of an ear-worn device, in accordance with certain embodiments described herein.

In some embodiments, the user selection may be which spatial regions to focus on and which spatial regions to not focus on. FIG. 23 illustrates a graphical user interface (GUI) 2380 for controlling spatial focusing of an ear-worn device (e.g., a hearing aid), in accordance with certain embodiments described herein. The GUI 2380 includes a circle 2384 representing the environment of the wearer, with the wearer considered to be in the center of the circle 2384, and the front of the wearer represented on the right side of the circle 2384 and the back of the wearer represented on the left side of the circle 2384. The circle 2384 includes multiple spatial regions 2386*a*-2386*b* that the wearer may select. In the example of FIG. 23, the wearer has selected the spatial regions 2386*a* and 2386*b*, causing them to be highlighted. It should be appreciated that when using the GUI 2380, the wearer may be able to select one, two, or more than two of the spatial regions 2386*a*-2386*f*. It should also be appreciated that more or fewer than six spatial regions may be used in the GUI 2380. Based on the user selection from the GUI 2380, the processing device may be configured to transmit an indication of the user selection to the communication circuitry 2146 of an ear-worn device. The communication circuitry 2146 may be configured to generate one or more inputs to the control circuitry 2166 based on the received indication of the user selection, and the control circuitry 2142 may be configured to transmit one or more spatial focusing control inputs 2168 to the neural network circuitry 2126, processing circuitry 2132, and/or mixing circuitry 2134 based on the one or more inputs received from the communication circuitry 2146.

In embodiments in which the one or more spatial focusing control inputs 2168 are input to the neural network circuitry 2126, the input 2168 may be, for example, a vector having as many elements are spatial regions 2386*a*-2386*b*, with an elements being equal to 1 if its corresponding spatial region was selected and being 0 otherwise. Further description of training neural network layers implemented by such neural network circuitry may be found above.

In embodiments in which the one or more spatial focusing control inputs 2168 are input to the processing circuitry 2132, consider that a sound map includes columns, each corresponding to sounds coming from a different one of the spatial regions 2386*a*-2386*f*. Based on the one or more spatial focusing control inputs 2168, the processing circuitry 2132 may be configured to apply a weight of 1 to values in the columns corresponding to the selected spatial regions (e.g., 2386*a* and 2386*b* in FIG. 23) and apply a weight of 0 out values in the columns corresponding to the unselected spatial regions (e.g., to realize a spatial focusing pattern as in FIG. 18), or apply weights between or equal to 0.5 and 1 to the columns corresponding to the selected spatial regions and apply weights between or equal to 0.5 and 0 to the columns corresponding to the unselected spatial regions (e.g., to realize a spatial focusing pattern as in FIG. 19). Generally, the processing circuitry 2132 may be configured to use higher weights for columns corresponding to the selected spatial regions and to use lower weights for values in the columns corresponding to the unselected spatial regions.

Figure 24:
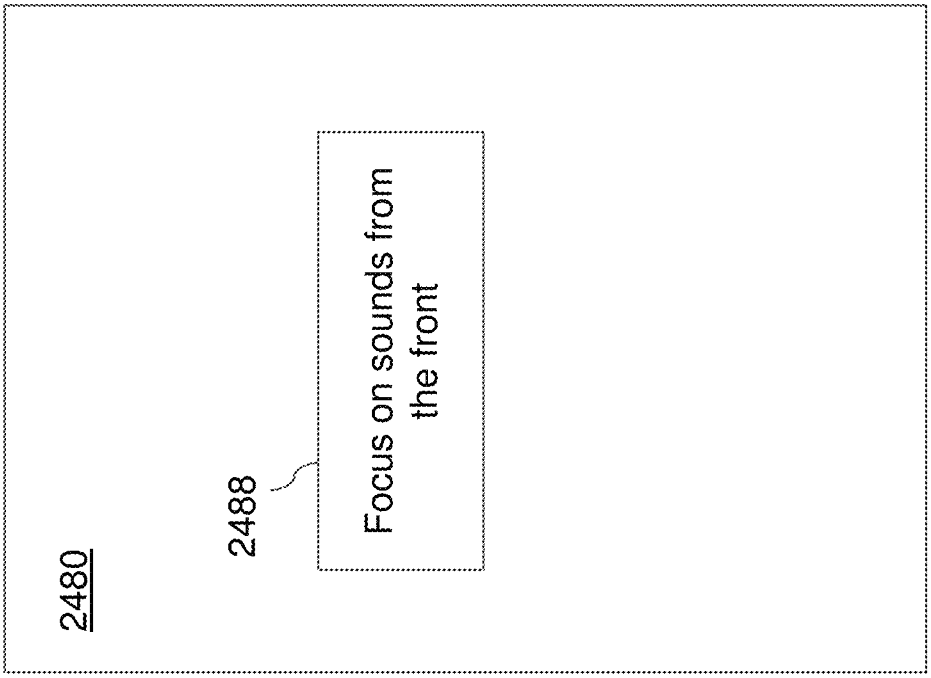
FIG. 24 illustrates a graphical user interface (GUI) for controlling spatial focusing of an ear-worn device, in accordance with certain embodiments described herein.

In some embodiments, the user selection may be whether to perform spatial focusing or not. FIG. 24 illustrates a graphical user interface (GUI) 2480 for controlling spatial focusing of an ear-worn device (e.g., a hearing aid), in accordance with certain embodiments described herein. The GUI 2480 includes an option 2488 which may be toggled by the user to turn spatial focusing on or off. Based on the user selection from the GUI 2380, the processing device may be configured to transmit an indication of the user selection to the communication circuitry 2146 of an ear-worn device. The communication circuitry 2146 may be configured to generate one or more inputs to the control circuitry 2166 based on the received indication of the user selection, and the control circuitry 2142 may be configured to transmit one or more spatial focusing control inputs 2168 to the neural network circuitry 2126, processing circuitry 2132, and/or mixing circuitry 2134 based on the one or more inputs received from the communication circuitry 2146. In some embodiments, a physical user input (e.g., the user input device 104, such as a button) on an ear-worn device may receive a user selection to turn spatial focusing on or off. Based on user activation of the physical user input on the ear-worn device, the control circuitry 2142 may be configured to transmit one or more spatial focusing control inputs 2168 to the neural network circuitry 2126, processing circuitry 2132, and/or mixing circuitry 2134. Further description of how one or more spatial focusing control inputs 2168 may control turning on and off spatial focusing may be found above.

Figure 25:
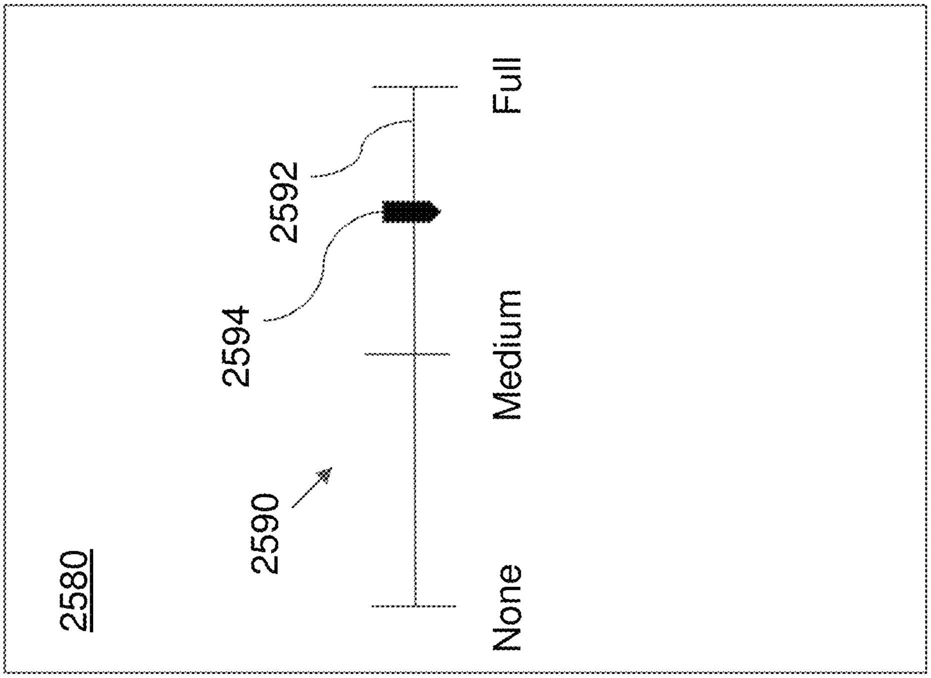
FIG. 25 illustrates a graphical user interface (GUI) for controlling spatial focusing of an ear-worn device, in accordance with certain embodiments described herein.

In some embodiments, user selection may be how much focusing to perform. FIG. 25 illustrates a graphical user interface (GUI) 2580 for controlling spatial focusing of an ear-worn device (e.g., a hearing aid), in accordance with certain embodiments described herein. The GUI 2580 includes a slider option 2590 which the user may use to control the degree of focusing. The slider option 2590 includes a line 2592 and a slider 2594. The wearer may control the position of the slider 2594 on the line 2592. The ratio of 1. The distance from the left end of the line 2592 to the position of the slider 2594, and 2. The length of the line 2592, may be a value between 0 and 1, with a value closer to 1 indicating more spatial focusing, and a value closer to 0 indicating less spatial focusing. The communication circuitry 2146 may be configured to generate one or more inputs to the control circuitry 2166 based on the received indication of the user-selected value, and the control circuitry 2142 may be configured to transmit one or more spatial focusing control inputs 2168 to the neural network circuitry 2126, processing circuitry 2132, and/or mixing circuitry 2134 based on the one or more inputs received from the communication circuitry 2146.

In embodiments in which the one or more spatial focusing control inputs 2168 are input to the neural network circuitry 2126, the one or more spatial focusing control inputs 2168 indicating the user-selected value (between 0 and 1) for the amount of spatial focusing may have a value related to the amount of spatial focusing selected by the user. By analogy with FIG. 22, when the user-selected value is close to or equal to 1 then the one or more spatial focusing control inputs 2168 may have a value associated with the option 2282*d*, when the user-selected value is close to or equal to 0 then the one or more spatial focusing control inputs 2168 may have a value associated with the option 2282*a*, and when the user-selected value is in between 0 and 1 then the one or more spatial focusing control inputs 2168 may have a value associated with the options 2282*b* or 2282*c*. Further description of training neural network layers implemented by such neural network circuitry may be found above.

In embodiments in which the one or more spatial focusing control inputs 2168 are input to the processing circuitry 2132, consider that a sound map includes columns, each corresponding to sounds coming from a different spatial region. When the user-selected value is close to or equal to 1 then the one or more spatial focusing control inputs 2168 may cause the processing circuitry 2132 to apply weights to the columns of the sound map to implement a spatial focusing pattern with a large amount of spatial focusing. When the user-selected value is close to or equal to 0 then the one or more spatial focusing control inputs 2168 may cause the processing circuitry 2132 to apply weights to the columns of the sound map to implement a spatial focusing pattern with a small amount of spatial focusing. When the user-selected value is between 0 and 1 then the one or more spatial focusing control inputs 2168 may cause the processing circuitry 2132 to apply weights to the columns of the sound map to implement a spatial focusing pattern with a medium amount of spatial focusing.

In embodiments in which the one or more spatial focusing control inputs 2168 are input to the mixing circuitry 2134, consider that the mixing circuitry 2134 may be configured to mix a spatially-focused version of an audio signal (refer to it as A) together with the audio signal itself (refer to it as B), such that the output is a*A+b*B. In some embodiments, the one or more spatial focusing control inputs 2168 may cause the mixing circuitry 2134 to use a value for a equal to the user-selected value for the amount of spatial focusing. In such embodiments, b may be a constant, or may be inversely related to a.

Figure 26:
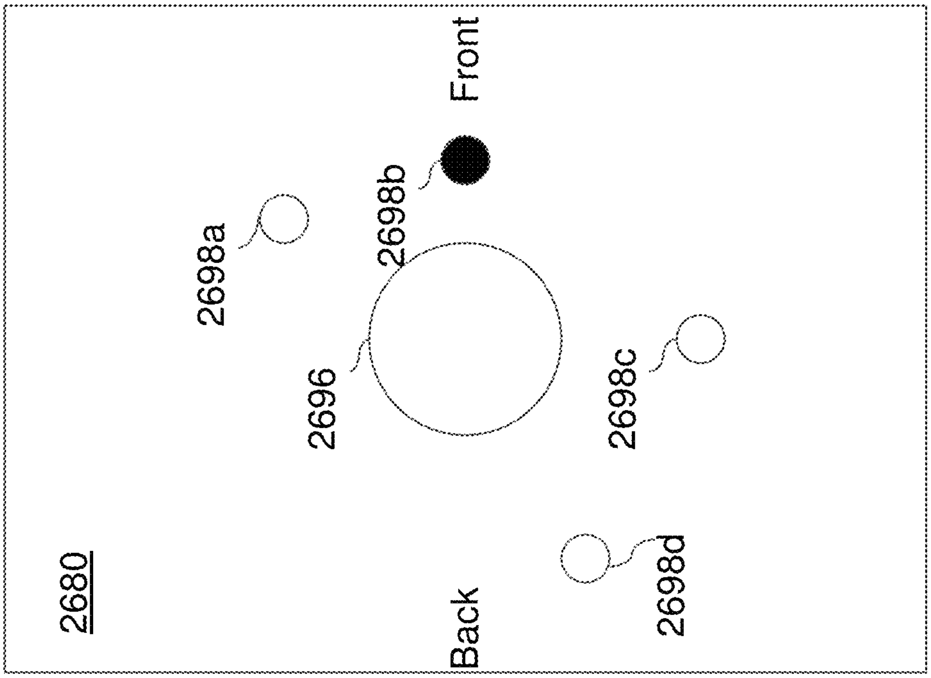
FIG. 26 illustrates a graphical user interface (GUI) for controlling spatial focusing of an ear-worn device, in accordance with certain embodiments described herein.

In some embodiments, the user selection may be which speaker to focus on. FIG. 26 illustrates a graphical user interface (GUI) 2680 for controlling spatial focusing of an ear-worn device (e.g., a hearing aid), in accordance with certain embodiments described herein. The GUI 2680 includes a representation of a wearer 2696 and representations of four speakers 2698*a*-2698*d* at different directions relative to the wearer. In the example of FIG. 26, the wearer has selected the speaker 2698*a*, causing it to be highlighted on the GUI 2680.

In some embodiments, the ear-worn device may be configured to generate multiple tight beams using beamforming on an array of more than two microphones, and the ear-worn device or the processing may be configured to calculate the power of the speech signal in audio from each beam. Beams having power above a threshold may be considered to have a speaker in the direction of the beam. In some embodiments, a neural network may be trained to determine the direction of speakers based on audio from one or more beams. In some embodiments, the ear-worn device may run the neural network, and information about the direction of the speakers may be transmitted from the ear-worn device to the processing device. The processing device may then use this information to display representations of the speakers at each of their respective directions in a GUI. In some embodiments, the neural network may run on the processing device itself.

Based on the user selection from the GUI 2380, the processing device may be configured to transmit an indication of the user selection to the communication circuitry 2146 of an ear-worn device. The communication circuitry 2146 may be configured to generate one or more inputs to the control circuitry 2166 based on the received indication of the user selection, and the control circuitry 2142 may be configured to transmit one or more spatial focusing control inputs 2168 to the neural network circuitry 2126, processing circuitry 2132, and/or mixing circuitry 2134 based on the one or more inputs received from the communication circuitry 2146. Based on the wearer selecting one of the representations of the speakers from the GUI, the processing device may transmit an indication of this selection to the ear-worn device, and the ear-worn device may use a beam focused on the direction of that speaker going forward.

In embodiments in which the one or more spatial focusing control inputs 2168 are input to the neural network circuitry 2126, the one or more spatial focusing control inputs 2168 may be associated with a spatial focusing pattern pointing in the direction of the selected speaker. In embodiments in which the one or more spatial focusing control inputs 2168 are input to the processing circuitry 2132, the one or more spatial focusing control inputs 2168 may cause the processing circuitry 2132 to apply weights to the columns of the sound map that implement a spatial focusing pattern pointing in the direction of the selected speaker.

In some embodiments, the ear-worn device or the processing device may be configured to determine a signal-to-noise ratio (SNR) of an acoustic environment, and the ear-worn device may be configured to generate, based on the SNR of the acoustic environment, the one or more spatial focusing control inputs 2168 indicating the spatial focusing pattern. If the acoustic environment has a high signal-to-noise ratio (SNR), the ear-worn device may be configured to select less spatial focusing than if the acoustic environment has a low SNR.

Sensing Circuitry

Returning to FIG. 21, in some embodiments the sensing circuitry 2176 may include one or more of an accelerometer, a gyroscope, and a magnetometer. The sensing circuitry 2176 may be configured to generate one or more inputs 2178 based on movement of the ear-worn device. In some embodiments, the control circuitry 2142 may be configured to determine, based on the one or more inputs 2178 received from the sensing circuitry 2176, a degree of head movement (i.e., how fast the wearer's head is moving). Further description of how to determine how fast the wearer's head is moving using sensors may be found in Ionut-Cristian S, Dan-Marius D, Using Inertial Sensors to Determine Head Motion-A Review, J Imaging, 2021 Dec. 6; 7(12):265, which is incorporated by reference herein in its entirety. In some embodiments, the control circuitry 2142 may be configured to generate, based on the degree of head movement, the one or more spatial focusing control inputs 2168 indicating a particular spatial focusing pattern. For example, the control circuitry 2142 may be configured to select a spatial focusing pattern with a larger amount of spatial focusing when the wearer's head is moving slowly or not at all than when the wearer's head is moving fast. As a specific example using four bins for degree of head movement, no head movement may be associated with a spatial focusing pattern having a large amount of spatial focusing, a low degree of head movement may be associated with a spatial focusing pattern having a moderate amount of spatial focusing, a moderate degree of head movement may be associated with a spatial focusing pattern having a low amount of spatial focusing, and a high degree of head movement may be associated with no spatial focusing. As another example, a spatial focusing pattern with a certain amount of spatial focusing (which may be no spatial focusing) may be used if the speed of head movement is above a threshold, and a spatial focusing pattern with another amount of spatial focusing may be performed if the speed of head movement is below the threshold. Basing the amount of spatial focusing on speed of head movement may be helpful because it May 1. Assist the neural network in achieving higher performance during head rotations and 2. Broaden the spatial focusing under the assumption that head rotation is not correlated with the desire for tight spatial focusing. Generally, the control circuitry 2142 may be configured to generate a first set of one or more spatial focusing control inputs 2168 indicating a spatial focusing pattern with a first amount of spatial focusing based on a first degree of head movement, and generate a second set of one or more spatial focusing control inputs 2168 indicating a spatial focusing pattern with a second amount of spatial focusing based on a second degree of head movement, where the first amount of spatial focusing is less than the second amount of spatial focusing, and the first degree of head movement is greater than the second degree of head movement.

In some embodiments, instead of or in addition to determining how fast the wearer's head is moving using the sensing circuitry 2176, the ear-worn device may be configured to determine how fast the wearer's head is moving using a neural network trained to determine how fast the wearer's head is moving (for example, using sound received by the ear-worn device as an input).

In embodiments in which the one or more spatial focusing control inputs 2168 are input to the neural network circuitry 2126, the one or more neural network layers implemented by the neural network circuitry 2126 may be trained such that the one or more spatial focusing control inputs 2168 affect the spatial focusing pattern implemented by the one or more neural network layers. In other words, the neural network circuitry 2126 may be configured to implement one or more neural network layers trained to generate, based on the multiple input audio signals 2130, an output audio signal having the spatial focusing pattern indicated by the one or more spatial focusing control inputs 2168, or an output configured to generate an output audio signal having the spatial focusing pattern indicated by the one or more spatial focusing control inputs 2168.

For example, in embodiments in which the one or more spatial focusing control inputs 2168 are input to the neural network circuitry 2126, the control circuitry 2142 may be configured to determine, based on the one or more inputs 2178 from the sensing circuitry 2176, into which of four bins the speed of the head movement falls. If no head movement is detected the one or more spatial focusing control inputs 2168 may be 0, if a low degree of head movement is detected the one or more spatial focusing control inputs 2168 may be 1, if a moderate degree of head movement is detected the one or more spatial focusing control inputs 2168 may be 2, and if a high degree of head movement is detected the one or more spatial focusing control inputs 2168 may be 3. As another example using a one-hot scheme, if no head movement is detected the one or more spatial focusing control inputs 2168 may be [1,0,0,0], if a low degree of head movement is detected the one or more spatial focusing control inputs 2168 may be [0,1,0,0], if a moderate degree of head movement is detected the one or more spatial focusing control inputs 2168 may be [0,0,1,0], and if a high degree of head movement is detected the one or more spatial focusing control inputs 2168 may be [0,0,0,1]. Further description of training such neural networks may be found above.

In embodiments in which the one or more spatial focusing control inputs 2168 are input to the processing circuitry 2132, the one or more spatial focusing control inputs 2168 may cause the processing circuitry 2132 to process a sound map such that spatial focusing pattern associated with the amount of head movement (as indicated by the one or more spatial focusing control inputs 2168) is implemented.

As described above, in some embodiments an ear-worn device may generate a sound map indicating the frequency components originating from each of multiple spatial regions. In such embodiments, it may be helpful to apply a moving average to values determined for different spatial regions, as this may average away some error. However, if the wearer rotates their head quickly, this may blur the average across the different spatial regions. As will be described further below, sensing circuitry 2176 configured to track head movements (e.g., using an accelerometer and gyroscope) may be able to correct for this.

It should be appreciated that in arrays of two microphones (e.g., on hearing aids such as the hearing aid 100), the beams that can be created using beamforming (e.g., cardioids and supercardioids) may be broad, such that if the wearer was talking to a person in front of them and then turns their head, even by 90 degrees, the person's speech may only decrease in amplitude by a few dB. However, with an array of more than two microphones (e.g., on eyeglasses such as the eyeglasses 300), more narrow beams may be created. With a narrow beam, even slight head rotations may cause the amplitude of sound from a person previously directly in front of the wearer to decrease substantially. Sensing circuitry 2176 configured to track head movements (e.g., using an accelerometer and gyroscope) may be able to correct for this as well.

In more detail, sensing circuitry 2176 configured to track head movements (e.g., using an accelerometer and gyroscope) may enable spatial regions to be defined in an absolute coordinate system, rather than the coordinate system of the wearer's head (which could rotate very quickly). The absolute coordinate system may be defined relative to the wearer's head, but on a slow timescale. Thus, if the wearer is sitting and talking to a person, briefly turns their head to look at something, then turns back to the person they are talking to, the coordinate system may stay in the same place and not rotate (or not rotate very much) with the head. But if the wearer turns and starts talking to another person, the coordinate system may slowly (e.g., over the course of several seconds) rotate with the head. To realize this, an exponential moving average may be applied to the coordinate system, such that the coordinate system is an exponential moving average of the head orientation. The timescale of the exponential moving average may be, for example, several seconds (e.g., 2, 3, 4, or 5, 6, 7, 8, 9, or 10 seconds, or any other suitable value). In some embodiments, during head movements, sounds from the new direction (i.e., the direction the wearer is turning their head towards) may be focused on immediately but sounds from the old direction (i.e., the direction the wearer is turning their head away from) may continue to be focused on and released slowly. In other words, as the wearer moves their head toward a new direction, the aperture may be broadened aperture fairly quickly to focus on sounds from the new direction but continue to focus on sounds from the previous direction as well, and then slowly wind down focus on the sounds from the previous direction as the wearer continues to look in the new direction. The winding down may be modulated as a function of how long the wearer looks in the new direction, so that a quick head glance may not cause a permanently wider aperture. In some embodiments, this behavior may be realized by an exponential moving average with a long timescale. In some embodiments, this behavior may be realized by combining 1. sounds from the new direction with full weight, and 2. sounds from the old direction processed with an exponential moving average.

Beamforming and Directional Patterns

As described above, in some embodiments, neural network circuitry (e.g., any of the neural network circuitry described herein) may be configured to receive multiple (i.e., at least two) audio signals (e.g., the audio signals 830), where at least two of the multiple audio signals each originate from a different one of two or more microphones and/or at least one of the multiple audio signals is a beamformed version of audio signals originating from the two or more microphones. With regards to beamforming, beamforming may generally include applying delays (which should be understood to include a delay of 0) to one or more audio signals originating from different microphones, and summing (which should be understood to include subtracting) the delayed signals together. Different delays may be applied to signals originating from different microphones. In embodiments including just two microphones, such as a front microphone (e.g., the front microphone 102*f*) and a back microphone (e.g., the back microphone 102*b*), beamforming may include applying a delay to the signal from one of the microphones and subtracting the delayed signal from the signal from the other microphone. The resulting signal may have a beamformed directional pattern that depends, at least in part, on the spacing between the front microphone and the back microphone as well as the delay applied; in other words, the weight of the resulting signal may vary as a function of angle from the microphones. Examples of beamformed directional patterns include dipoles, hypercardioids, supercardioids, and cardioids. Certain beamformed directional patterns, which may be referred to herein as "front-facing," may generally attenuate signals coming from behind the wearer more than signals coming from in front of the wearer. As will be described below, with a front and back microphone, a front-facing beamformed directional pattern may generally be created by applying a larger delay to the back microphone than to the front microphone and subtracting the back signal from the front signal. Certain beamformed directional patterns, which may be referred to herein as "back-facing," may generally attenuate signals coming from in front of the wearer more than signals coming from behind the wearer. As will be described below, with a front and back microphone, a back-facing beamformed directional pattern may generally be created by applying a larger delay to the front microphone than to the back microphone and subtracting the front signal from the back signal.

Figure 27:
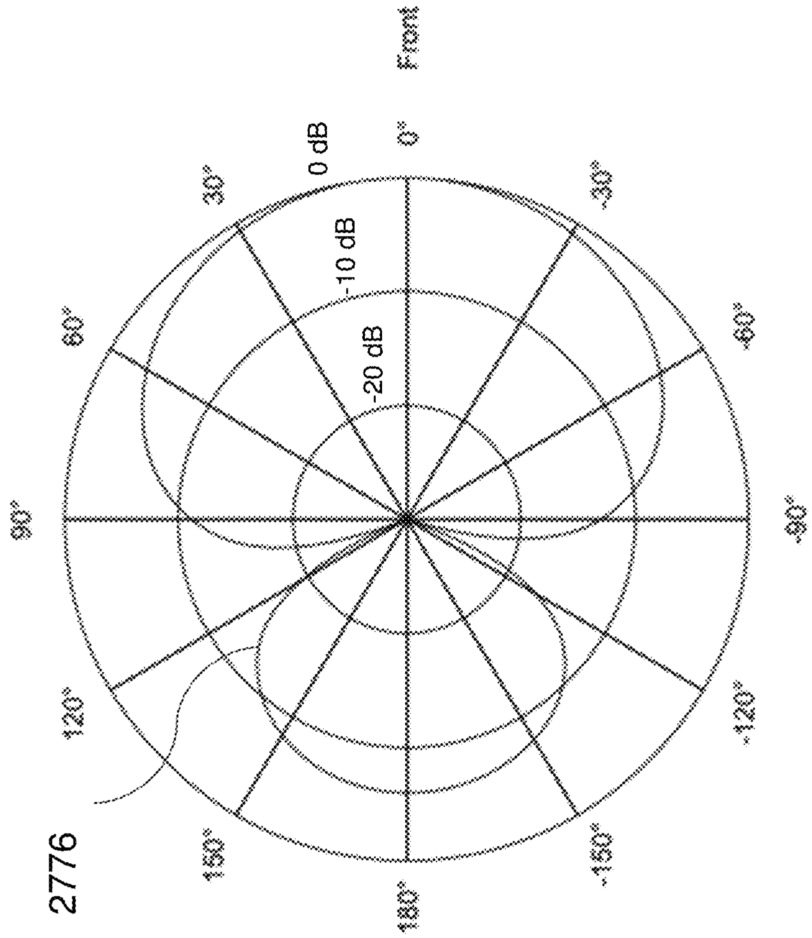
FIG. 27 illustrates a front-facing hypercardioid pattern, in accordance with certain embodiments described herein.
Figure 28:
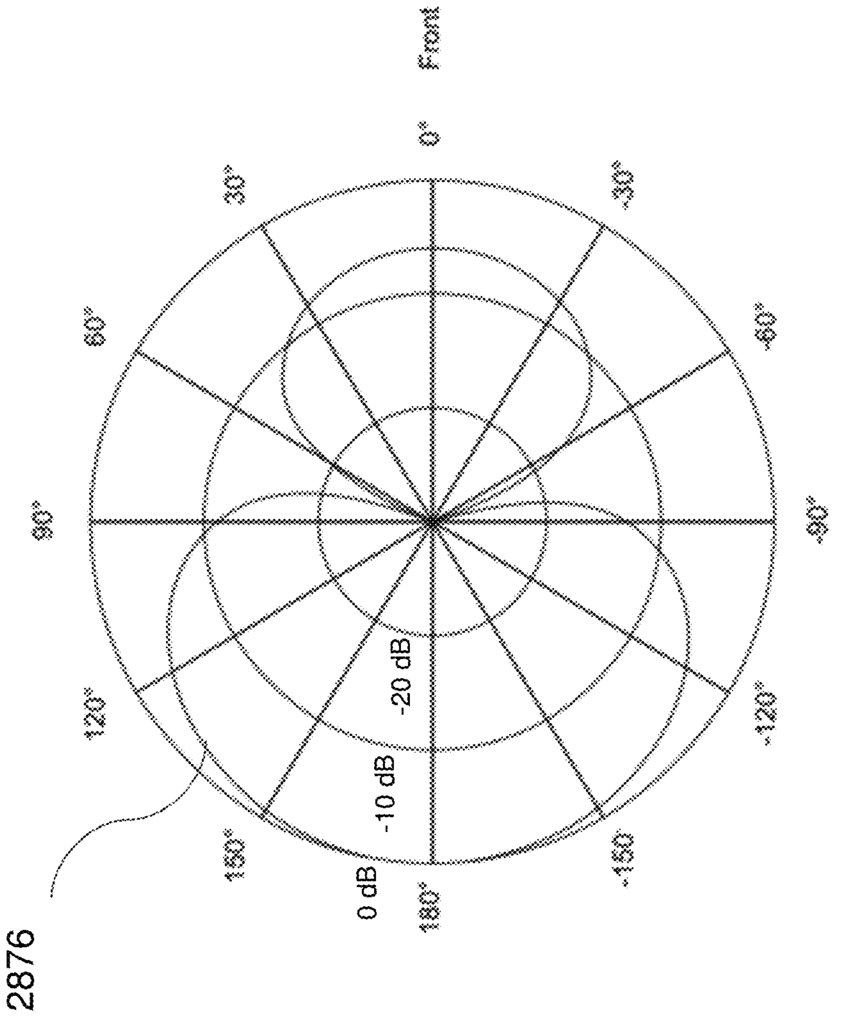
FIG. 28 illustrates a back-facing hypercardioid pattern, in accordance with certain embodiments described herein.
Figure 29:
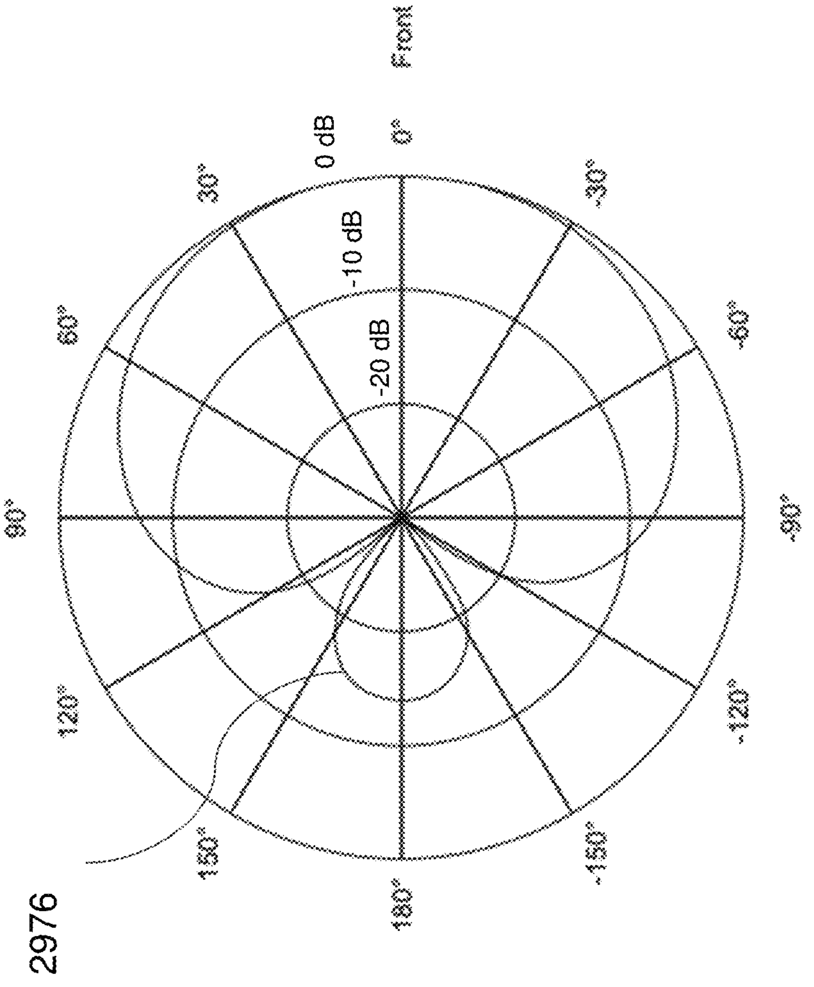
FIG. 29 illustrates a front-facing supercardioid pattern, in accordance with certain embodiments described herein.
Figure 30:
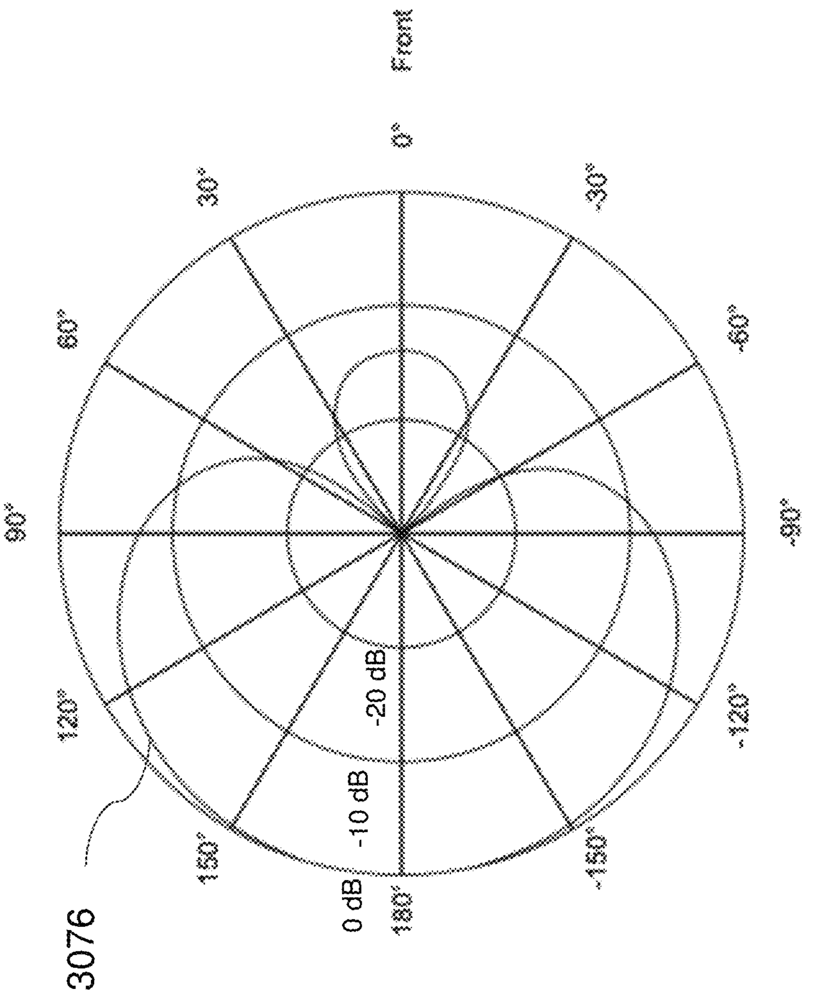
FIG. 30 illustrates a back-facing hypercardioid pattern, in accordance with certain embodiments described herein.
Figure 31:
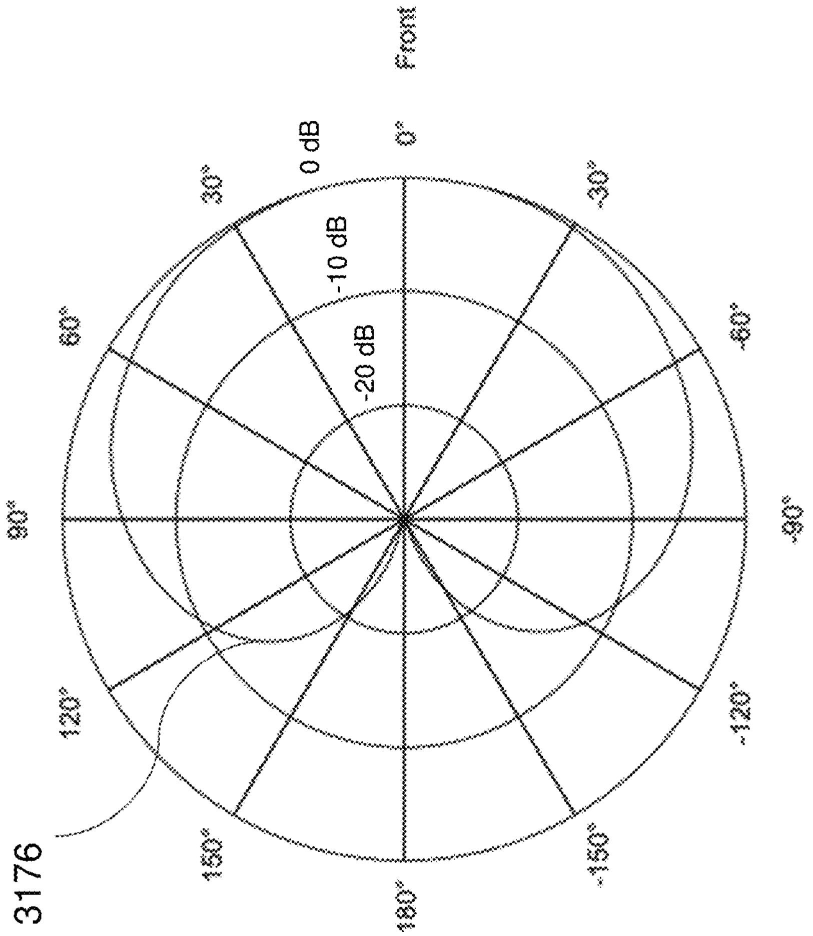
FIG. 31 illustrates a front-facing cardioid pattern, in accordance with certain embodiments described herein.
Figure 32:
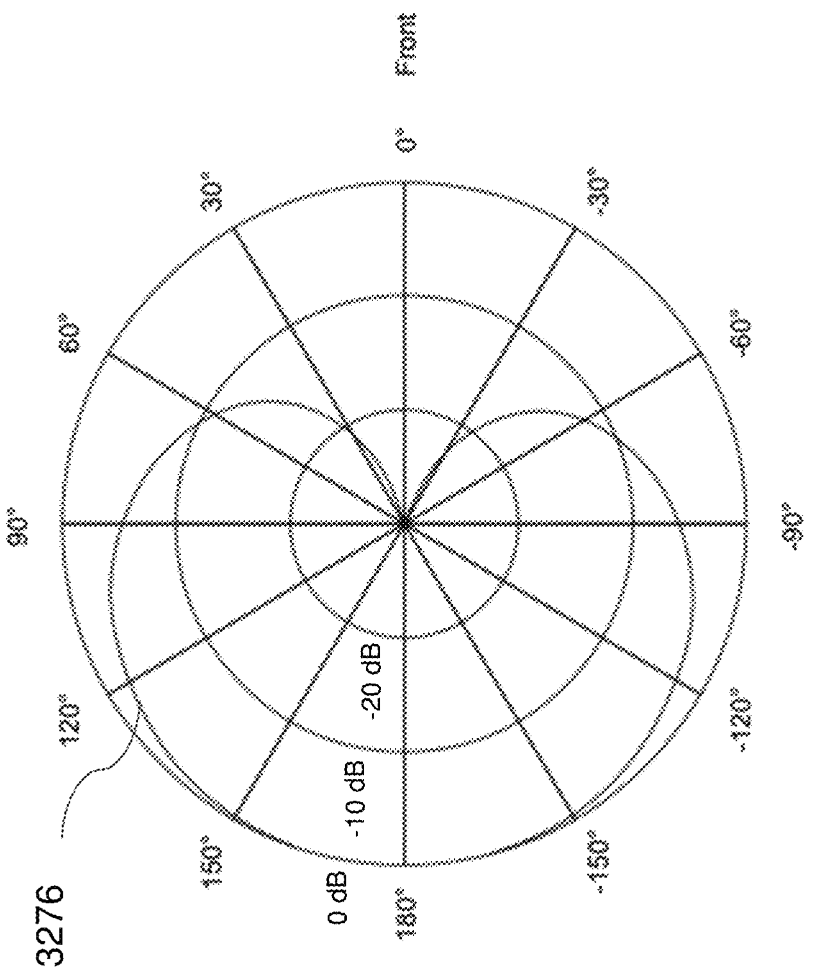
FIG. 32 illustrates a back-facing cardioid pattern, in accordance with certain embodiments described herein.
Figure 33:
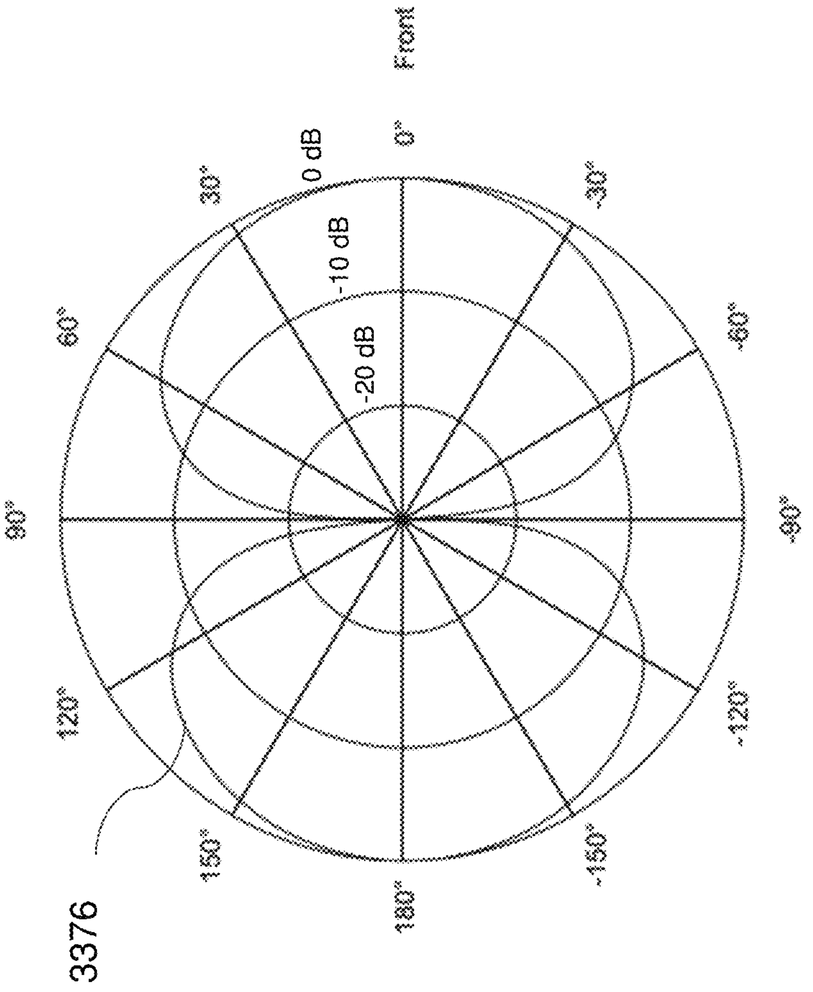
FIG. 33 illustrates a dipole pattern, in accordance with certain embodiments described herein.

FIG. 27 illustrates a front-facing hypercardioid pattern 2776, in accordance with certain embodiments described herein. A front-facing hypercardioid pattern may result from applying a delay of d/3c to the signal from the back microphone, where d is the spacing between the front microphone and the back microphone and c is the speed of sound. FIG. 28 illustrates a back-facing hypercardioid pattern 2876, in accordance with certain embodiments described herein. A back-facing hypercardioid pattern may result from applying a delay of d/3c to the signal from the front microphone. FIG. 29 illustrates a front-facing supercardioid pattern 2976, in accordance with certain embodiments described herein. A front-facing supercardioid pattern may result from applying a delay of 2d/3c to the signal from the back microphone. FIG. 30 illustrates a back-facing hypercardioid pattern 3076, in accordance with certain embodiments described herein. A back-facing supercardioid pattern may result from applying a delay of 2d/3c to the signal from the front microphone. FIG. 31 illustrates a front-facing cardioid pattern 3176, in accordance with certain embodiments described herein. A front-facing cardioid pattern may result from applying a delay of d/c to the signal from the back microphone. FIG. 32 illustrates a back-facing cardioid pattern 3276, in accordance with certain embodiments described herein. A back-facing cardioid pattern may result from applying a delay of d/c to the signal from the front microphone. FIG. 33 illustrates a dipole pattern 3376, in accordance with certain embodiments described herein. A dipole pattern may result from applying no delay to cither microphone. It should be appreciated that other patterns may be generated by applying different delays.

As described above, in some embodiments neural network circuitry may be configured to receive multiple audio signals (e.g., the audio signals 830) including at least one audio signal that is a beamformed version of audio signals originating from two or more microphones. In some embodiments, the multiple audio signals may include one beamformed signal. In some embodiments, the multiple audio signals may include two beamformed signals. In some embodiments, the multiple audio signals may include three beamformed signals. In some embodiments, the multiple audio signals may include more than three beamformed signals. In some embodiments, the multiple audio signals may include multiple beamformed signals, each having a different beamformed directional pattern. In some embodiments, the multiple audio signals may include a signal having a dipole pattern. In some embodiments, the multiple audio signals may include a beamformed signal having a front-facing supercardioid directional pattern. In some embodiments, the multiple audio signals may include a beamformed signal having a back-facing supercardioid directional pattern. In some embodiments, the multiple audio signals may include a beamformed signal having a front-facing cardioid pattern. In some embodiments, the multiple audio signals may include a beamformed signal having a back-facing cardioid pattern. In some embodiments, the multiple audio signals may include a beamformed signal having a front-facing supercardioid pattern and a beamformed signal having a back-facing supercardioid pattern. In some embodiments, the multiple audio signals may include a beamformed signal having a front-facing cardioid pattern and a beamformed signal having a back-facing cardioid pattern. In some embodiments, the multiple audio signals may include a beamformed signal having a front-facing supercardioid pattern, a beamformed signal having a back-facing supercardioid pattern, and a beamformed signal having a dipole pattern. In some embodiments, the multiple audio signals may include a beamformed signal having a front-facing cardioid pattern, a beamformed signal having a back-facing cardioid pattern, and a beamformed signal having a dipole pattern.

As described above, binaural communication may occur in a system of two hearing aids (e.g., two of the hearing aid 100), cochlear implants, or earphones that communicate with each other over a wireless communication link. Binaural communication may also occur in an ear-worn device such as eyeglasses with built-in hearing aids (e.g., the eyeglasses 300), in which a device in a portion of the eyeglasses near one ear can communicate with a device in a portion of the eyeglasses near the other ear over a wired communication link within the eyeglasses. In some embodiments, binaural communication may facilitate communication of spatial information. For example, a mask or a sound map may be communicated from one device to another. In some embodiments, the binaural communication may occur over a low-latency communication link such as a near-field magnetic induction communication (NFMI) link.

Any of the neutral network circuitry described herein (e.g., the neural network circuitry 526, 826, 926, 1026, 1126, 1726, and/or 2126) may include circuitry configured to perform operations necessary for computing the output of a neural network layer. One such operation may be a matrix-vector multiplication. In some embodiments, neural network circuitry may include multiple identical tiles each including multiple multiply-and-accumulate circuits configured to perform intermediate computations of a matrix-vector multiplication in parallel and then compute results of the intermediate computations into a final result. Each tile may additionally include memory configured to store neural network weights, registers configured to store input activation elements, and routing circuitry configured to facilitate communication of status and data between tiles. Other types of circuitry configured to perform processing described herein, such as any of the mask application and subtraction circuitry (e.g., the mask application and subtraction circuitry 832, 932, 1032, 1132, and/or 2132) mixing circuitry (e.g., the mixing circuitry 834, 1434, 1534, and/or 2134), and/or WDRC circuitry (e.g., the WDRC circuitry 1258 and/or 1458), may be implemented as digital processing circuitry. In some embodiments, such digital processing circuitry may use a SIMD (single instruction multiple data) architecture. Any of the ear-worn devices described herein (e.g., the hearing aid 100, the eyeglasses 300, the ear-worn device 400, and/or the ear-worn device 500) may include a chip implementing certain portions of circuitry. For example, any of the noise reduction circuitry described herein (in some embodiments, among other types of circuitry) may be implemented (in whole or in part) on a chip. Thus, the chip may include the tiles and digital processing circuitry described above. In some embodiments, for a model having up to 10 M 8-bit weights, and when operating at 100 GOPs/sec on time series data, the chip may achieve power efficiency of 4 GOPs/milliwatt, measured at 40 degrees Celsius, when the chip uses supply voltages between 0.5-1.8V, and when the chip is performing operations without idling. Further description of chips incorporating (in some embodiments, among other elements) neural network circuitry for use in ear-worn devices may be found in U.S. Pat. No. 11,886,974, entitled "Neural Network Chip for Ear-Worn Device," issued Jan. 30, 2024, which is incorporated by reference herein in its entirety. In some embodiments, in addition to such a chip including some or all of the noise reduction circuitry, any of the ear-worn devices described herein may include a digital signal processor configured to perform other operations, such as some or all of the processing performed by the processing circuitry 522 and/or processing circuitry 528.

EXAMPLES

Example 1 is directed to an ear-worn device, comprising two or more microphones and noise reduction circuitry comprising neural network circuitry, wherein the neural network circuitry is configured to: receive multiple audio signals wherein at least two of the multiple audio signals each originate from a different one of the two or more microphones and/or at least one of the multiple audio signals is a beamformed audio signal originating from the two or more microphones; and implement one or more neural network layers trained to perform background noise modification and spatial focusing based on the multiple audio signals, such that the neural network circuitry generates, based on the multiple audio signals, one or more neural network outputs, wherein the noise reduction circuitry is configured to output, based on the one or more neural network outputs, an output audio signal comprising a background noise-modified and spatially-focused version of a first audio signal of the multiple audio signals.

Example 2 is directed to the ear-worn device of example 1, wherein at least two of the multiple audio signals have different beamformed directional patterns.

Example 3 is directed to the ear-worn device of any of examples 1-2, wherein at least one of the multiple audio signals has a front-facing beamformed directional pattern and at least one of the multiple audio signals has a back-facing beamformed directional pattern.

Example 4 is directed to the ear-worn device of any of examples 1-3, wherein the output audio signal has a particular spatial focusing pattern, the particular spatial focusing pattern comprising different weights applied to speech in the first audio signal originating from different directions-of-arrival relative to the wearer of the ear-worn device.

Example 5 is directed to the ear-worn device of example 4, wherein the particular spatial focusing pattern comprises higher weights applied to speech originating from directions-of-arrival towards a front of the wearer of the ear-worn device than weights applied to speech originating from directions-of-arrival towards sides and a back of the wearer.

Example 6 is directed to the ear-worn device of any of examples 3-5, wherein the neural network circuitry is further configured to receive one or more spatial focusing control inputs indicating the particular spatial focusing pattern, and use the one or more spatial focusing control inputs to generate the one or more neural network outputs such that the output audio signal has the particular spatial focusing pattern.

Example 7 is directed to the ear-worn device of any of examples 3-6, further comprising communication circuitry configured to receive, from a processing device, an indication of a user selection of the particular spatial focusing pattern; and control circuitry configured to generate, based at least in part on the indication of the user selection of the particular spatial focusing pattern, the one or more spatial focusing control inputs indicating the particular spatial focusing pattern.

Example 8 is directed to a system comprising the ear-worn device of example 7 and the processing device in communication with the ear-worn device and configured to display a graphical user interface including options for different spatial focusing patterns; and receive the user selection of the particular spatial focusing pattern.

Example 9 is directed to the ear-worn device of any of examples 1-8, wherein the one or more neural network outputs comprise two or more neural network outputs; and the noise reduction circuitry is configured to generate, based on the two or more neural network outputs, an output audio signal comprising: a target speech signal comprising the background noise-modified and spatially-focused version of the first audio signal, wherein the target speech signal comprises a first spatially-focused version of a speech signal, and the speech signal comprises speech in the first audio signal; an interfering speech signal comprising a second spatially-focused version of the speech signal; and a background noise signal comprising background noise in the first audio signal; wherein the noise reduction circuitry is configured to generate the output audio signal such that, in the output audio signal: a change in volume of the background noise signal is different from a change in volume of the target speech signal by a first volume change difference amount; a change in volume of the interfering speech signal is different from the change in volume of the target speech signal by a second volume change difference amount; and the first volume change difference amount and the second volume change difference amount are independently controllable.

Example 10 is directed to the ear-worn device of example 9, wherein the interfering speech signal comprises a remainder when the target speech signal is subtracted from the speech signal.

Example 11 is directed to the ear-worn device of any of examples 9-10, wherein the neural network circuitry is configured to use a first subset of the one or more neural network layers to generate a first of the two or more neural network outputs; and a second subset of the one or more neural network layers to generate a second of the two or more neural network outputs; and the noise reduction circuitry is configured to obtain the speech signal and/or the background noise signal from the first of the two or more neural network outputs, and to obtain the target speech signal and/or the interfering speech signal from the second of the two or more neural network outputs.

Example 12 is directed to the ear-worn device of any of examples 9-11, wherein the two or more neural network outputs comprise two different masks.

Example 13 is directed to the ear-worn device of any of examples 9-12, further comprising: mixing circuitry configured to: generate the output audio signal by mixing a combination of audio signals; or generate the output audio signal by mixing a combination of masks; or wide dynamic range compression (WDRC) circuitry comprising multiple WDRC pipelines configured to generate the output audio signal by performing WDRC on the combination of audio signals.

Example 14 is directed to the ear-worn device of example 13, wherein the mixing circuitry is further configured to: receive a first volume change control input and a second volume change control input; and perform the mixing using the first volume change control input and the second volume change control input such that the first volume change difference amount is controlled, at least in part, by the first volume change control input and the second volume change difference amount is controlled, at least in part, by the second volume change control input.

Example 15 is directed to the ear-worn device of example 14 further comprising: communication circuitry configured to receive the first volume change control input and the second volume control change value from a processing device; memory configured to store the first volume change control input and the second volume change control input; and control circuitry configured to retrieve the first volume change control input and the second volume change control input from the memory and output the first volume change control input and the second volume change control input to the mixing circuitry.

Example 16 is directed to the ear-worn device of any of examples 1-12, further comprising mixing circuitry configured to mix two or more audio signals, such that the output audio signal comprises the background noise-modified and spatially-focused version of the first audio signal mixed with a second audio signal.

Example 17 is directed to the ear-worn device of example 16, wherein: the background noise-modified and spatially-focused version of the first audio signal comprises a target speech signal; the target speech signal comprises a first spatially-focused version of a speech signal; the speech signal comprises speech in the first audio signal; the second audio signal comprises: a background noise signal comprising background noise in the first audio signal; and an interfering speech signal comprising a second spatially-focused version of the speech signal; and the noise reduction circuitry is configured to generate the output audio signal such that in the output audio signal: a change in volume of the background noise signal is different from a change in volume of the target speech signal by a volume change difference amount; a change in volume of the interfering speech signal is different from the change in volume of the target speech signal by the volume change difference amount; and the volume change difference amount is controllable.

Example 18 is directed to the ear-worn device of example 17, wherein the mixing circuitry is configured to: receive a volume change control input; and perform the mixing using the volume change control input such that the volume change difference amount is controlled, at least in part, by the volume change control input.

Example 19 is directed to the ear-worn device of example 18, wherein the ear-worn device comprises: communication circuitry configured to receive the volume change control input from a processing device; memory configured to store the volume change control input; and control circuitry configured to retrieve the volume change control input and output the volume change control input to the mixing circuitry.

Example 20 is directed to the ear-worn device of any of examples 1-19, wherein the ear-worn device is further configured to receive a user selection to turn spatial focusing off.

Example 21 is directed to an ear-worn device, comprising two or more microphones and noise reduction circuitry comprising neural network circuitry, wherein the neural network circuitry is configured to: receive multiple audio signals wherein at least two of the multiple audio signals each originate from a different one of the two or more microphones and/or at at least one of the multiple audio signals is a beamformed audio signal originating from the two or more microphones; and implement one or more neural network layers trained to perform background noise modification and spatial focusing, such that the neural network circuitry generates, based on the multiple audio signals, two or more neural network outputs, wherein: the noise reduction circuitry is configured to generate an output audio signal comprising: a target speech signal comprising a first spatially-focused version of a speech signal, wherein the speech signal comprises speech in a first audio signal among the multiple audio signals; an interfering speech signal comprising a second spatially-focused version of the speech signal; and a background noise signal comprising background noise in the first audio signal; wherein the noise reduction circuitry is configured to generate the output audio signal such that, in the output audio signal: a change in volume of the background noise signal is different from a change in volume of the target speech signal by a first volume change difference amount; a change in volume of the interfering speech signal is different from the change in volume of the target speech signal by a second volume change difference amount; and the first volume change difference amount and the second volume change difference amount are independently controllable.

Example 22 is directed to the ear-worn device of example 21, wherein at least two of the multiple audio signals have different beamformed directional patterns.

Example 23 is directed to the ear-worn device of any of examples 21-22, wherein the target speech signal comprises the speech signal to which has been applied a particular spatial focusing pattern, the particular spatial focusing pattern comprising different weights applied to the speech originating from different directions-of-arrival relative to the wearer of the ear-worn device.

Example 24 is directed to the ear-worn device of example 23, wherein the particular spatial focusing pattern comprises higher weights applied to speech originating from directions-of-arrival towards a front of the wearer of the ear-worn device than weights applied to speech originating from directions-of-arrival towards sides and a back of the wearer.

Example 25 is directed to the ear-worn device of any of examples 23-24, wherein the neural network circuitry is further configured to receive one or more spatial focusing control inputs indicating the particular spatial focusing pattern; and use the one or more spatial focusing control inputs to generate the two or more neural network outputs such that the target speech signal comprises the speech signal to which has been applied the particular spatial focusing pattern.

Example 26 is directed to the ear-worn device of example 25, further comprising communication circuitry configured to receive, from a processing device, an indication of a user selection of the particular spatial focusing pattern; and control circuitry configured to generate, based at least in part on the indication of the user selection of the particular spatial focusing pattern, the one or more spatial focusing control inputs indicating the particular spatial focusing pattern.

Example 27 is directed to a system comprising: the ear-worn device of example 26; =and the processing device in communication with the ear-worn device and configured to display a graphical user interface including options for different spatial focusing patterns; and receive the user selection of the particular spatial focusing pattern.

Example 28 is directed to the ear-worn device of any of examples 21-27, wherein the interfering speech signal comprises a remainder when the target speech signal is subtracted from the speech signal.

Example 29 is directed to the ear-worn device of any of examples 21-28, wherein the neural network circuitry is configured to use: a first subset of the one or more neural network layers to generate a first of the two or more neural network outputs; and a second subset of the one or more neural network layers to generate a second of the two or more neural network outputs; and the noise reduction circuitry is configured to obtain the speech signal and/or the background noise signal from the first of the two or more neural network outputs, and to obtain the target speech signal and/or the interfering speech signal from the second of the two or more neural network outputs.

Example 30 is directed to the ear-worn device of any of examples 21-29, wherein the two or more neural network outputs comprise two different masks.

Example 31 is directed to the ear-worn device of any of examples 21-30, further comprising: mixing circuitry configured to: generate the output audio signal by mixing a combination of audio signals; or generate the output audio signal by mixing a combination of masks; or wide dynamic range compression (WDRC) circuitry comprising multiple WDRC pipelines configured to generate the output audio signal by performing WDRC on the combination of audio signals.

Example 32 is directed to the ear-worn device of example 31, wherein the mixing circuitry is further configured to receive a first volume change control input and a second volume change control input; and perform the mixing using the first volume change control input and the second volume change control input such that the first volume change difference amount is controlled, at least in part, by the first volume change control input and the second volume change difference amount is controlled, at least in part, by the second volume change control input.

Example 33 is directed to the ear-worn device of example 32, further comprising communication circuitry configured to receive the first volume change control input and the second volume control change value from a processing device: memory configured to store the first volume change control input and the second volume change control input; and control circuitry configured to retrieve the first volume change control input and the second volume change control input from the memory and output the first volume change control input and the second volume change control input to the mixing circuitry.

Example 34 is directed to the ear-worn device of any of examples 32-33, further comprising control circuitry configured to: generate the first volume change control input based on a level of background noise in the first audio signal; and generate the second volume change control input based on a level of interfering speech in the first audio signal.

Example 35 is directed to the ear-worn device of any of examples 21-34, wherein the ear-worn device is further configured to receive a user selection to turn spatial focusing off.

Example 36 is directed to the ear-worn device of any of examples 21-35, wherein at least one of the two or more neural network outputs comprise: the speech signal; a mask configured to generate the speech signal; the background noise signal; a mask configured to generate the background noise signal; the target speech signal; a mask configured to generate the target speech signal; the interfering speech signal; and a mask configured to generate the interfering speech signal.

Example 37 is directed to the ear-worn device of any of examples 21-36, wherein the background noise signal is not spatially-focused; and the interfering speech signal does not comprise a portion of the background noise in the first audio signal.

Example 38 is directed to the ear-worn device of any of examples 21-36, wherein the background noise signal comprises a first spatially-focused version of the background noise in the first audio signal; and the interfering speech signal comprises the second spatially-focused version of the speech signal plus a second spatially-focused version of the background noise in the first audio signal.

Example 39 is directed to the ear-worn device of any of examples 21-38, wherein the ear-worn device comprises a hearing aid.

Example 40 is directed to the ear-worn device of any of examples 21-39, wherein the noise reduction circuitry is implemented on a chip.

Example 41 is directed to an ear-worn device, comprising two or more microphones; and noise reduction circuitry comprising neural network circuitry, wherein the neural network circuitry is configured to: receive multiple audio signals wherein at least two of the multiple audio signals each originate from a different one of the two or more microphones and/or at at least one of the multiple audio signals is a beamformed audio signal originating from the two or more microphones; and implement one or more neural network layers trained to perform background noise modification and/or spatial focusing based on the multiple audio signals, such that the neural network circuitry generates, based on the multiple audio signals, one or more neural network outputs, wherein: the noise reduction circuitry is configured to output, based on the one or more neural network outputs, an output audio signal comprising a background noise-modified and/or spatially-focused version of a first audio signal of the multiple audio signals.

Example 42 is directed to the ear-worn device of example 41, wherein the one or more neural network layers are trained to perform background noise modification, and the output audio signal comprises a background noise-modified version of the first audio signal.

Example 43 is directed to the ear-worn device of example 41, wherein the one or more neural network layers are trained to perform spatial focusing, and the output audio signal comprises a spatially-focused version of the first audio signal.

Example 44 is directed to the ear-worn device of example 41, wherein the one or more neural network layers are trained to perform background noise modification and spatial focusing, and the output audio signal comprises a background noise-modified and spatially-focused version of the first audio signal.

Example 45 is directed to the ear-worn device of any of examples 43-44, wherein the output audio signal has a particular spatial focusing pattern, the particular spatial focusing pattern comprising different weights applied to the speech originating from different directions-of-arrival relative to the wearer of the ear-worn device.

Example 46 is directed to the ear-worn device of example 45, wherein the particular spatial focusing pattern comprises higher weights applied to speech originating from directions-of-arrival towards a front of the wearer of the ear-worn device than weights applied to speech originating from directions-of-arrival towards sides and a back of the wearer.

Example 47 is directed to the ear-worn device of any of examples 45-46, wherein the neural network circuitry is further configured to receive one or more spatial focusing control inputs indicating the particular spatial focusing pattern; and use the one or more spatial focusing control inputs to generate the one or more neural network outputs such that the output audio signal has the particular spatial focusing pattern.

Example 48 is directed to the ear-worn device of example 47, further comprising communication circuitry configured to receive, from a processing device, an indication of a user selection of the particular spatial focusing pattern; and control circuitry configured to generate, based at least in part on the indication of the user selection of the particular spatial focusing pattern, the one or more spatial focusing control inputs indicating the particular spatial focusing pattern.

Example 49 is directed to a system comprising the ear-worn device of example 48; and the processing device in communication with the ear-worn device and configured to: display a graphical user interface including options for different spatial focusing patterns; and receive the user selection of the particular spatial focusing pattern.

Example 50 is directed to the system of example 49, wherein the multiple options comprise four options.

Example 51 is directed to the system of any of examples 49-50, wherein the multiple options are graphical representations of the different spatial focusing patterns.

Example 52 is directed to the ear-worn device of example 47, further comprising sensing circuitry configured to generate one or more inputs based on movement of the ear-worn device; and control circuitry configured to: determine, based on the one or more inputs received from the one or more sensors, a degree of head movement; and generate, based on the degree of head movement, the one or more spatial focusing control inputs indicating the particular spatial focusing pattern.

Example 53 is directed to the ear-worn device of example 52, wherein the control circuitry is configured, when generating the one or more inputs indicating the spatial focusing pattern based on the degree of head movement, to: generate a first set of one or more spatial focusing control inputs indicating a first spatial focusing pattern with a first amount of spatial focusing based on a first degree of head movement; and generate a second set of one or more spatial focusing control inputs indicating a second spatial focusing pattern with a second amount of spatial focusing based on a second degree of head movement; wherein the first amount of spatial focusing is less than the second amount of spatial focusing, and the first degree of head movement is greater than the second degree of head movement.

Example 54 is directed to the ear-worn device of example 47, further comprising control circuitry configured to: determine a signal-to-noise ratio (SNR) of an acoustic environment; and generate, based on the SNR of the acoustic environment, the one or more spatial focusing control inputs indicating the spatial focusing pattern.

Example 55 is directed to the ear-worn device of any of examples 43-44, wherein the output audio signal comprises: a target speech signal comprising a first spatially-focused version of a speech signal, the speech signal comprising speech in the first audio signal; an interfering speech signal comprising a second spatially-focused version of the speech signal; and a background noise signal comprising background noise in the first audio signal.

Example 56 is directed to the ear-worn device of example 55, wherein the noise reduction circuitry is configured to generate the output audio signal such that: a change in volume of the background noise signal is different from a change in volume of the target speech signal by a first volume change difference amount; a change in volume of the interfering speech signal is different from the change in volume of the target speech signal by a second volume change difference amount; and the first volume change difference amount and the second volume change difference amount are different.

Example 57 is directed to the ear-worn device of any of examples 55-56, wherein the noise reduction circuitry is configured to generate the output audio signal such that: a change in volume of the background noise signal is different from a change in volume of the target speech signal by a first volume change difference amount; a change in volume of the interfering speech signal is different from the change in volume of the target speech signal by a second volume change difference amount; and the first volume change difference amount and the second volume change difference amount are independently controllable.

Example 58 is directed to the ear-worn device of any of examples 55-57, wherein the target speech signal comprises the speech signal to which has been applied a particular spatial focusing pattern, the particular spatial focusing pattern comprising different weights applied to the speech originating from different directions-of-arrival relative to the wearer of the ear-worn device.

Example 59 is directed to the ear-worn device of example 58, wherein the particular spatial focusing pattern comprises higher weights applied to speech originating from directions-of-arrival towards a front of the wearer of the ear-worn device than weights applied to speech originating from directions-of-arrival towards sides and a back of the wearer.

Example 60 is directed to the ear-worn device of any of examples 58-59, wherein the neural network circuitry is further configured to receive one or more spatial focusing control inputs indicating the particular spatial focusing pattern; and use the one or more spatial focusing control inputs to generate the two or more neural network outputs such that the target speech signal comprises the speech signal to which has been applied the particular spatial focusing pattern.

Example 61 is directed to the ear-worn device of example 60, further comprising: communication circuitry configured to receive, from a processing device, an indication of a user selection of the particular spatial focusing pattern; and control circuitry configured to generate, based at least in part on the indication of the user selection of the particular spatial focusing pattern, the one or more spatial focusing control inputs indicating the particular spatial focusing pattern.

Example 62 is directed to a system comprising the ear-worn device of example 61 and the processing device in communication with the ear-worn device and configured to display a graphical user interface including options for different spatial focusing patterns; and receive the user selection of the particular spatial focusing pattern.

Example 63 is directed to the system of example 62, wherein the multiple options comprise four options.

Example 64 is directed to the system of any of examples 62-63, wherein the multiple options are graphical representations of the different spatial focusing patterns.

Example 65 is directed to the ear-worn device of example 60, further comprising sensing circuitry configured to generate one or more inputs based on movement of the ear-worn device; and control circuitry configured to: determine, based on the one or more inputs received from the one or more sensors, a degree of head movement; and generate, based on the degree of head movement, the one or more spatial focusing control inputs indicating the particular spatial focusing pattern.

Example 66 is directed to the ear-worn device of example 65, wherein the control circuitry is configured, when generating the one or more inputs indicating the spatial focusing pattern based on the degree of head movement, to: generate a first set of one or more spatial focusing control inputs indicating a first spatial focusing pattern with a first amount of spatial focusing based on a first degree of head movement; and generate a second set of one or more spatial focusing control inputs indicating a second spatial focusing pattern with a second amount of spatial focusing based on a second degree of head movement; wherein the first amount of spatial focusing is less than the second amount of spatial focusing, and the first degree of head movement is greater than the second degree of head movement.

Example 67 is directed to the ear-worn device of example 60, further comprising: control circuitry configured to: determine a signal-to-noise ratio (SNR) of an acoustic environment; and generate, based on the SNR of the acoustic environment, the one or more spatial focusing control inputs indicating the spatial focusing pattern.

Example 68 is directed to the ear-worn device of any of examples 55-67, wherein the interfering speech signal comprises a remainder when the target speech signal is subtracted from the speech signal.

Example 69 is directed to the ear-worn device of any of examples 55-67, wherein the one or more neural network outputs comprise two or more neural network outputs.

Example 70 is directed to the ear-worn device of example 69, wherein the noise reduction circuitry is configured to obtain, based on the two or more neural network outputs: at least one of: a speech signal comprising speech in a first audio signal among the multiple audio signals; and a background noise signal comprising background noise in the first audio signal; and at least one of: a target speech signal comprising a first spatially-focused version of the speech signal; and an interfering speech signal comprising a second spatially-focused version of the speech signal.

Example 71 is directed to the ear-worn device of example 69, wherein the noise reduction circuitry is configured to obtain, based on the two or more neural network outputs: a target speech signal comprising a first spatially-focused version of the speech signal; and an interfering speech signal comprising a second spatially-focused version of the speech signal.

Example 72 is directed to the ear-worn device of any of examples 69-71, wherein the neural network circuitry is configured to use: a first subset of the one or more neural network layers to generate a first of the two or more neural network outputs; and a second subset of the one or more neural network layers to generate a second of the two or more neural network outputs; and the noise reduction circuitry is configured to obtain the speech signal and/or the background noise signal from the first of the two or more neural network outputs, and to obtain the target speech signal and/or the interfering speech signal from the second of the two or more neural network outputs.

Example 73 is directed to the ear-worn device of any of examples 69-72, wherein the two or more neural network outputs comprise two different masks.

Example 74 is directed to the ear-worn device of any of examples 69-73, wherein: at least one of the two or more neural network outputs comprise: the speech signal; a mask configured to generate the speech signal; the background noise signal; a mask configured to generate the background noise signal; the target speech signal; a mask configured to generate the target speech signal; the interfering speech signal; a mask configured to generate the interfering speech signal.

Example 75 is directed to the ear-worn device of any of examples 55-74, further comprising: mixing circuitry configured to: generate the output audio signal by mixing a combination of audio signals; or generate the output audio signal by mixing a combination of masks; or wide dynamic range compression (WDRC) circuitry comprising multiple WDRC pipelines configured to generate the output audio signal by performing WDRC on the combination of audio signals.

Example 76 is directed to the ear-worn device of example 75, wherein the mixing circuitry is further configured to: receive a first volume change control input and a second volume change control input; and perform the mixing using the first volume change control input and the second volume change control input such that the first volume change difference amount is controlled, at least in part, by the first volume change control input and the second volume change difference amount is controlled, at least in part, by the second volume change control input.

Example 77 is directed to the ear-worn device of example 76, further comprising: communication circuitry configured to receive the first volume change control input and the second volume control change value from a processing device; memory configured to store the first volume change control input and the second volume change control input; and control circuitry configured to retrieve the first volume change control input and the second volume change control input from the memory and output the first volume change control input and the second volume change control input to the mixing circuitry.

Example 78 is directed to the ear-worn device of any of examples 55-74, wherein the neural network circuitry is further configured to: receive a first volume change control input and a second volume change control input; and generate the one or more neural network outputs using the first volume change control input and the second volume change control input such that the first volume change difference amount is controlled, at least in part, by the first volume change control input and the second volume change difference amount is controlled, at least in part, by the second volume change control input.

Example 79 is directed to the ear-worn device of example 78, further comprising: communication circuitry configured to receive the first volume change control input and the second volume control change value from a processing device; memory configured to store the first volume change control input and the second volume change control input; and control circuitry configured to retrieve the first volume change control input and the second volume change control input from the memory and output the first volume change control input and the second volume change control input to the mixing circuitry.

Example 80 is directed to the ear-worn device of any of examples 76-79, further comprising: control circuitry configured to: generate the first volume change control input based on a level of background noise in the first audio signal; and generate the second volume change control input based on a level of interfering speech in the first audio signal.

Example 81 is directed to the ear-worn device of any of examples 55-80, wherein: the background noise signal is not spatially-focused; and the interfering speech signal does not comprise a portion of the background noise in the first audio signal.

Example 82 is directed to the ear-worn device of any of examples 55-80, wherein: the background noise signal comprises a first spatially-focused version of the background noise in the first audio signal; and the interfering speech signal comprises the second spatially-focused version of the speech signal plus a second spatially-focused version of the background noise in the first audio signal.

Example 83 The ear-worn device of any of examples 43-82, wherein the ear-worn device is further configured to receive a user selection to turn spatial focusing off.

Example 84 is directed to the ear-worn device of any of examples 41-83, wherein at least two of the multiple audio signals have different beamformed directional patterns.

Example 85 is directed to the ear-worn device of example 84, wherein the at least two of the multiple audio signals having different beamformed directional patterns include a beamformed signal having a dipole, hypercardioid, supercardioid, or cardioid directional pattern.

Example 86 is directed to the ear-worn device of any of examples 41-74 and 78-85, further comprising mixing circuitry configured to mix two or more audio signals, such that the output audio signal comprises the background noise-modified and/or spatially-focused version of the first audio signal mixed with a second audio signal.

Example 87 is directed to the ear-worn device of example 86, wherein: the background noise-modified and spatially-focused version of the first audio signal comprises a target speech signal; the target speech signal comprises a first spatially-focused version of a speech signal; the speech signal comprises speech in the first audio signal; the second audio signal comprises: a background noise signal comprising background noise in the first audio signal; and an interfering speech signal comprising a second spatially-focused version of the speech signal; and the noise reduction circuitry is configured to generate the output audio signal such that in the output audio signal: a change in volume of the background noise signal is different from a change in volume of the target speech signal by a volume change difference amount; a change in volume of the interfering speech signal is different from the change in volume of the target speech signal by the volume change difference amount; and the volume change difference amount is controllable.

Example 88 is directed to the ear-worn device of example 87, wherein: the mixing circuitry is configured to: receive a volume change control input; and perform the mixing using the volume change control input such that the volume change difference amount is controlled, at least in part, by the volume change control input; and the ear-worn device comprises: communication circuitry configured to receive the volume change control input from a processing device; memory configured to store the volume change control input; and control circuitry configured to retrieve the volume change control input and output the volume change control input to the mixing circuitry.

Example 89 is directed to the ear-worn device of any of examples 41-88, wherein the ear-worn device comprises a hearing aid.

Example 90 is directed to the ear-worn device of any of examples 41-89, wherein the noise reduction circuitry is implemented on a chip.

Example 91 is directed to an ear-worn device, comprising: two or more microphones; and noise reduction circuitry comprising neural network circuitry, wherein: the neural network circuitry is configured to: receive multiple audio signals wherein at least two of the multiple audio signals each originate from a different one of the two or more microphones and/or at least one of the multiple audio signals is a beamformed audio signal originating from the two or more microphones; and implement one or more neural network layers trained to perform, or to generate output for use in performing, background noise modification and spatial focusing based on the multiple audio signals, such that the neural network circuitry generates, based on the multiple audio signals, one or more neural network outputs, wherein: the noise reduction circuitry is configured to output, based on the one or more neural network outputs, an output audio signal comprising a background noise-modified and spatially-focused version of a first audio signal of the multiple audio signals.

Example 92 is directed to the ear-worn device of example 91, wherein at least two of the multiple audio signals have different beamformed directional patterns.

Example 93 is directed to the ear-worn device of any of examples 91-92, wherein at least one of the multiple audio signals has a front-facing beamformed directional pattern and at least one of the multiple audio signals has a back-facing beamformed directional pattern.

Example 94 is directed to the ear-worn device of any of examples 91-93, wherein: the output audio signal has a particular spatial focusing pattern, the particular spatial focusing pattern comprising different weights applied to speech in the first audio signal originating from different directions-of-arrival relative to the wearer of the ear-worn device.

Example 95 is directed to the ear-worn device of example 94, wherein the particular spatial focusing pattern comprises higher weights applied to speech originating from directions-of-arrival towards a front of the wearer of the ear-worn device than weights applied to speech originating from directions-of-arrival towards sides and a back of the wearer.

Example 96 is directed to the ear-worn device of any of examples 93-95, wherein the neural network circuitry is further configured to: receive one or more spatial focusing control inputs indicating the particular spatial focusing pattern; and use the one or more spatial focusing control inputs to generate the one or more neural network outputs such that the output audio signal has the particular spatial focusing pattern.

Example 97 is directed to the ear-worn device of any of examples 93-96, further comprising: communication circuitry configured to receive, from a processing device, an indication of a user selection of the particular spatial focusing pattern; and control circuitry configured to generate, based at least in part on the indication of the user selection of the particular spatial focusing pattern, the one or more spatial focusing control inputs indicating the particular spatial focusing pattern.

Example 98 is directed to a system comprising: the ear-worn device of example 97; and the processing device in communication with the ear-worn device and configured to: display a graphical user interface including options for different spatial focusing patterns; and receive the user selection of the particular spatial focusing pattern.

Example 99 is directed to the ear-worn device of any of examples 91-98, wherein: the one or more neural network outputs comprise two or more neural network outputs; and the noise reduction circuitry is configured to generate, based on the two or more neural network outputs, an output audio signal comprising: a target speech signal comprising the background noise-modified and spatially-focused version of the first audio signal, wherein the target speech signal comprises a first spatially-focused version of a speech signal, and the speech signal comprises speech in the first audio signal; an interfering speech signal comprising a second spatially-focused version of the speech signal; and a background noise signal comprising background noise in the first audio signal; wherein the noise reduction circuitry is configured to generate the output audio signal such that, in the output audio signal: a change in volume of the background noise signal is different from a change in volume of the target speech signal by a first volume change difference amount; a change in volume of the interfering speech signal is different from the change in volume of the target speech signal by a second volume change difference amount; and the first volume change difference amount and the second volume change difference amount are independently controllable.

Example 100 is directed to the ear-worn device of example 99, wherein the interfering speech signal comprises a remainder when the target speech signal is subtracted from the speech signal.

Example 101 is directed to the ear-worn device of any of examples 99-100, wherein: the neural network circuitry is configured to use: a first subset of the one or more neural network layers to generate a first of the two or more neural network outputs; and a second subset of the one or more neural network layers to generate a second of the two or more neural network outputs; and the noise reduction circuitry is configured to obtain the speech signal and/or the background noise signal from the first of the two or more neural network outputs, and to obtain the target speech signal and/or the interfering speech signal from the second of the two or more neural network Outputs.

Example 102 is directed to the ear-worn device of any of examples 99-101, wherein the two or more neural network outputs comprise two different masks.

Example 103 is directed to the ear-worn device of any of examples 99-102, further comprising: mixing circuitry configured to: generate the output audio signal by mixing a combination of audio signals; or generate the output audio signal by mixing a combination of masks; or wide dynamic range compression (WDRC) circuitry comprising multiple WDRC pipelines configured to generate the output audio signal by performing WDRC on the combination of audio signals.

Example 104 is directed to the ear-worn device of example 103, wherein the mixing circuitry is further configured to: receive a first volume change control input and a second volume change control input; and perform the mixing using the first volume change control input and the second volume change control input such that the first volume change difference amount is controlled, at least in part, by the first volume change control input and the second volume change difference amount is controlled, at least in part, by the second volume change control input.

Example 105 is directed to the ear-worn device of example 104 further comprising: communication circuitry configured to receive the first volume change control input and the second volume control change value from a processing device; memory configured to store the first volume change control input and the second volume change control input; and control circuitry configured to retrieve the first volume change control input and the second volume change control input from the memory and output the first volume change control input and the second volume change control input to the mixing circuitry.

Example 106 is directed to the ear-worn device of any of examples 91-102, further comprising mixing circuitry configured to mix two or more audio signals, such that the output audio signal comprises the background noise-modified and spatially-focused version of the first audio signal mixed with a second audio signal.

Example 107 is directed to the ear-worn device of example 106, wherein: the background noise-modified and spatially-focused version of the first audio signal comprises a target speech signal; the target speech signal comprises a first spatially-focused version of a speech signal; the speech signal comprises speech in the first audio signal; the second audio signal comprises: a background noise signal comprising background noise in the first audio signal; and an interfering speech signal comprising a second spatially-focused version of the speech signal; and the noise reduction circuitry is configured to generate the output audio signal such that in the output audio signal: a change in volume of the background noise signal is different from a change in volume of the target speech signal by a volume change difference amount; a change in volume of the interfering speech signal is different from the change in volume of the target speech signal by the volume change difference amount; and the volume change difference amount is controllable.

Example 108 is directed to the ear-worn device of example 107, wherein: the mixing circuitry is configured to: receive a volume change control input; and perform the mixing using the volume change control input such that the volume change difference amount is controlled, at least in part, by the volume change control input.

Example 109 is directed to the ear-worn device of example 108, wherein the ear-worn device comprises: communication circuitry configured to receive the volume change control input from a processing device; memory configured to store the volume change control input; and control circuitry configured to retrieve the volume change control input and output the volume change control input to the mixing circuitry.

Example 110 is directed to the ear-worn device of any of examples 91-109, wherein the ear-worn device is further configured to receive a user selection to turn spatial focusing off.

Example 111 is directed to an ear-worn device, comprising: two or more microphones; noise reduction circuitry comprising neural network circuitry, wherein: the neural network circuitry is configured to: receive multiple audio signals wherein at least two of the multiple audio signals each originate from a different one of the two or more microphones and/or at least one of the multiple audio signals is a beamformed audio signal originating from the two or more microphones; and implement one or more neural network layers trained to generate, based on the multiple audio signals, one or more neural network outputs, wherein: the one or more neural network outputs comprise an output audio signal comprising a background noise-modified and spatially-focused version of a first audio signal of the multiple audio signals; or the one or more neural network outputs are configured for use, by the noise reduction circuitry, in generating the output audio signal comprising the background noise-modified and spatially-focused version of the first audio signal.

Example 112 is directed to the ear-worn device of example 111, wherein at least two of the multiple audio signals have different beamformed directional patterns.

Example 113 is directed to the ear-worn device of any of examples 111-112, wherein at least one of the multiple audio signals has a front-facing beamformed directional pattern and at least one of the multiple audio signals has a back-facing beamformed directional pattern.

Example 114 is directed to the ear-worn device of any of examples 111-113, wherein: the output audio signal has a particular spatial focusing pattern, the particular spatial focusing pattern comprising different weights applied to speech in the first audio signal originating from different directions-of-arrival relative to the wearer of the ear-worn device.

Example 115 is directed to the ear-worn device of example 114, wherein the particular spatial focusing pattern comprises higher weights applied to speech originating from directions-of-arrival towards a front of the wearer of the ear-worn device than weights applied to speech originating from directions-of-arrival towards sides and a back of the wearer.

Example 116 is directed to the ear-worn device of any of examples 113-115, wherein the neural network circuitry is further configured to: receive one or more spatial focusing control inputs indicating the particular spatial focusing pattern; and use the one or more spatial focusing control inputs to generate the one or more neural network outputs such that the output audio signal has the particular spatial focusing pattern.

Example 117 is directed to the ear-worn device of any of examples 113-116, further comprising: communication circuitry configured to receive, from a processing device, an indication of a user selection of the particular spatial focusing pattern; and control circuitry configured to generate, based at least in part on the indication of the user selection of the particular spatial focusing pattern, the one or more spatial focusing control inputs indicating the particular spatial focusing pattern.

Example 118 is directed to a system comprising: the ear-worn device of example 117; and the processing device in communication with the ear-worn device and configured to: display a graphical user interface including options for different spatial focusing patterns; and receive the user selection of the particular spatial focusing pattern.

Example 119 is directed to the ear-worn device of any of examples 111-118, wherein: the one or more neural network outputs comprise two or more neural network outputs; and the noise reduction circuitry is configured to generate, based on the two or more neural network outputs, an output audio signal comprising: a target speech signal comprising the background noise-modified and spatially-focused version of the first audio signal, wherein the target speech signal comprises a first spatially-focused version of a speech signal, and the speech signal comprises speech in the first audio signal; an interfering speech signal comprising a second spatially-focused version of the speech signal; and a background noise signal comprising background noise in the first audio signal; wherein the noise reduction circuitry is configured to generate the output audio signal such that, in the output audio signal: a change in volume of the background noise signal is different from a change in volume of the target speech signal by a first volume change difference amount; a change in volume of the interfering speech signal is different from the change in volume of the target speech signal by a second volume change difference amount; and the first volume change difference amount and the second volume change difference amount are independently controllable.

Example 120 is directed to the ear-worn device of example 119, wherein the interfering speech signal comprises a remainder when the target speech signal is subtracted from the speech signal.

Example 121 is directed to the ear-worn device of any of examples 119-120, wherein: the neural network circuitry is configured to use: a first subset of the one or more neural network layers to generate a first of the two or more neural network outputs; and a second subset of the one or more neural network layers to generate a second of the two or more neural network outputs; and the noise reduction circuitry is configured to obtain the speech signal and/or the background noise signal from the first of the two or more neural network outputs, and to obtain the target speech signal and/or the interfering speech signal from the second of the two or more neural network outputs.

Example 122 is directed to the ear-worn device of any of examples 119-121, wherein the two or more neural network outputs comprise two different masks.

Example 123 is directed to the ear-worn device of any of examples 119-122, further comprising: mixing circuitry configured to: generate the output audio signal by mixing a combination of audio signals; or generate the output audio signal by mixing a combination of masks; or wide dynamic range compression (WDRC) circuitry comprising multiple WDRC pipelines configured to generate the output audio signal by performing WDRC on the combination of audio signals.

Example 124 is directed to the ear-worn device of example 123, wherein the mixing circuitry is further configured to: receive a first volume change control input and a second volume change control input; and perform the mixing using the first volume change control input and the second volume change control input such that the first volume change difference amount is controlled, at least in part, by the first volume change control input and the second volume change difference amount is controlled, at least in part, by the second volume change control input.

Example 125 is directed to the ear-worn device of example 124 further comprising: communication circuitry configured to receive the first volume change control input and the second volume control change value from a processing device; memory configured to store the first volume change control input and the second volume change control input; and control circuitry configured to retrieve the first volume change control input and the second volume change control input from the memory and output the first volume change control input and the second volume change control input to the mixing circuitry.

Example 126 is directed to the ear-worn device of any of examples 111-122, further comprising mixing circuitry configured to mix two or more audio signals, such that the output audio signal comprises the background noise-modified and spatially-focused version of the first audio signal mixed with a second audio signal.

Example 127 is directed to the ear-worn device of example 126, wherein: the background noise-modified and spatially-focused version of the first audio signal comprises a target speech signal; the target speech signal comprises a first spatially-focused version of a speech signal; the speech signal comprises speech in the first audio signal; the second audio signal comprises: a background noise signal comprising background noise in the first audio signal; and an interfering speech signal comprising a second spatially-focused version of the speech signal; and the noise reduction circuitry is configured to generate the output audio signal such that in the output audio signal: a change in volume of the background noise signal is different from a change in volume of the target speech signal by a volume change difference amount; a change in volume of the interfering speech signal is different from the change in volume of the target speech signal by the volume change difference amount; and the volume change difference amount is controllable.

Example 128 is directed to the ear-worn device of example 127, wherein: the mixing circuitry is configured to: receive a volume change control input; and perform the mixing using the volume change control input such that the volume change difference amount is controlled, at least in part, by the volume change control input.

Example 129 is directed to the ear-worn device of example 128, wherein the ear-worn device comprises: communication circuitry configured to receive the volume change control input from a processing device; memory configured to store the volume change control input; and control circuitry configured to retrieve the volume change control input and output the volume change control input to the mixing circuitry.

Example 130 is directed to the ear-worn device of any of examples 111-129, wherein the ear-worn device is further configured to receive a user selection to turn spatial focusing off.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

The invention claimed is:

1. An ear-worn device, comprising:

two or more microphones; and noise reduction circuitry comprising neural network circuitry, wherein the neural network circuitry is configured to:

receive multiple audio signals wherein at least two of the multiple audio signals each originate from a different one of the two or more microphones and/or at least one of the multiple audio signals is a beamformed audio signal originating from the two or more microphones; and implement one or more neural network layers trained to perform background noise modification and spatial focusing, such that the neural network circuitry generates, based on the multiple audio signals, two or more neural network outputs, wherein the noise reduction circuitry is configured to generate an output audio signal comprising:

a target speech signal comprising a first spatially-focused version of a speech signal, wherein the speech signal comprises speech in a first audio signal among the multiple audio signals;

an interfering speech signal comprising a second spatially-focused version of the speech signal; and a background noise signal comprising background noise in the first audio signal, wherein the noise reduction circuitry is further configured to generate the output audio signal such that, in the output audio signal:

a change in volume of the background noise signal is different from a change in volume of the target speech signal by a first volume change difference amount;

a change in volume of the interfering speech signal is different from the change in volume of the target speech signal by a second volume change difference amount; and the first volume change difference amount and the second volume change difference amount are independently controllable, wherein the neural network circuitry is further configured to use:

a first subset of the one or more neural network layers to generate a first of the two or more neural network outputs; and a second subset of the one or more neural network layers to generate a second of the two or more neural network outputs, and wherein the noise reduction circuitry is further configured to obtain the speech signal and/or the background noise signal from the first of the two or more neural network outputs, and to obtain the target speech signal and/or the interfering speech signal from the second of the two or more neural network outputs.

2. The ear-worn device of claim 1, wherein at least two of the multiple audio signals have different beamformed directional patterns.

3. The ear-worn device of claim 1, wherein the target speech signal comprises the speech signal to which has been applied a particular spatial focusing pattern, the particular spatial focusing pattern comprising different weights applied to the speech originating from different directions-of-arrival relative to a wearer of the ear-worn device.

4. The ear-worn device of claim 3, wherein the particular spatial focusing pattern comprises higher weights applied to speech originating from directions-of-arrival towards a front of the wearer of the car-worn device than weights applied to speech originating from directions-of-arrival towards sides and a back of the wearer.

5. The ear-worn device of claim 3, wherein the neural network circuitry is further configured to:

receive one or more spatial focusing control inputs indicating the particular spatial focusing pattern; and use the one or more spatial focusing control inputs to generate the two or more neural network outputs such that the target speech signal comprises the speech signal to which has been applied the particular spatial focusing pattern.

6. The ear-worn device of claim 5, further comprising:

communication circuitry configured to receive, from a processing device, an indication of a user selection of the particular spatial focusing pattern; and control circuitry configured to generate, based at least in part on the indication of the user selection of the particular spatial focusing pattern, the one or more spatial focusing control inputs indicating the particular spatial focusing pattern.

7. A system comprising:

the ear-worn device of claim 6; and the processing device in communication with the ear-worn device and configured to:

display a graphical user interface including options for different spatial focusing patterns; and receive the user selection of the particular spatial focusing pattern.

8. The ear-worn device of claim 1, wherein the interfering speech signal comprises a remainder when the target speech signal is subtracted from the speech signal.

9. The ear-worn device of claim 1, wherein the two or more neural network outputs comprise two different masks.

10. The ear-worn device of claim 1, further comprising:

mixing circuitry configured to:

generate the output audio signal by mixing a combination of audio signals; or generate the output audio signal by mixing a combination of masks; or wide dynamic range compression (WDRC) circuitry comprising multiple WDRC pipelines configured to generate the output audio signal by performing WDRC on the combination of audio signals.

11. The ear-worn device of claim 10, wherein the mixing circuitry is further configured to:

receive a first volume change control input and a second volume change control input; and perform the mixing using the first volume change control input and the second volume change control input such that the first volume change difference amount is controlled, at least in part, by the first volume change control input and the second volume change difference amount is controlled, at least in part, by the second volume change control input.

12. The ear-worn device of claim 11, further comprising:

communication circuitry configured to receive the first volume change control input and the second volume change control input from a processing device;

memory configured to store the first volume change control input and the second volume change control input; and control circuitry configured to retrieve the first volume change control input and the second volume change control input from the memory and output the first volume change control input and the second volume change control input to the mixing circuitry.

13. The ear-worn device of claim 11, further comprising:

control circuitry configured to:

generate the first volume change control input based on a level of background noise in the first audio signal; and generate the second volume change control input based on a level of interfering speech in the first audio signal.

14. The ear-worn device of claim 1, wherein the ear-worn device is further configured to receive a user selection to turn spatial focusing off.

15. The ear-worn device of claim 1, wherein at least one of the two or more neural network outputs comprises:

the speech signal;

a mask configured to generate the speech signal;

the background noise signal;

a mask configured to generate the background noise signal;

the target speech signal;

a mask configured to generate the target speech signal;

the interfering speech signal; or a mask configured to generate the interfering speech signal.

16. The ear-worn device of claim 1, wherein:

the background noise signal is not spatially-focused; and the interfering speech signal does not comprise a portion of the background noise in the first audio signal.

17. The ear-worn device of claim 1, wherein:

the background noise signal comprises a first spatially-focused version of the background noise in the first audio signal; and the interfering speech signal comprises the second spatially-focused version of the speech signal plus a second spatially-focused version of the background noise in the first audio signal.

18. The ear-worn device of claim 1, wherein the ear-worn device comprises a hearing aid.

19. The ear-worn device of claim 1, wherein the noise reduction circuitry is implemented on a chip.

* * * * *